(12) United States Patent
Woytowitz

(10) Patent No.: US 12,029,173 B2
(45) Date of Patent: Jul. 9, 2024

(54) DECODER SYSTEMS AND METHODS FOR IRRIGATION CONTROL

(71) Applicant: Hunter Industries, Inc., San Marcos, CA (US)

(72) Inventor: Peter John Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 18/455,530

(22) Filed: Aug. 24, 2023

(65) Prior Publication Data

US 2023/0397552 A1 Dec. 14, 2023

Related U.S. Application Data

(63) Continuation of application No. 17/578,754, filed on Jan. 19, 2022, now Pat. No. 11,771,024, which is a
(Continued)

(51) Int. Cl.
*A01G 25/16* (2006.01)
*A01G 25/02* (2006.01)
(Continued)

(52) U.S. Cl.
CPC .......... *A01G 25/165* (2013.01); *A01G 25/02* (2013.01); *A01G 25/162* (2013.01);
(Continued)

(58) Field of Classification Search
CPC .. A01G 25/165; A01G 25/02; G05B 19/0423; G05B 2219/2625; G05F 1/445
See application file for complete search history.

(56) References Cited

U.S. PATENT DOCUMENTS

| 5,909,429 A | 6/1999 | Satyanarayana et al. |
| 5,947,587 A | 9/1999 | Keuper et al. |

(Continued)

FOREIGN PATENT DOCUMENTS

| CN | 1832651 A | 9/2006 |
| CN | 101112126 A | 1/2008 |

(Continued)

OTHER PUBLICATIONS

First Office Action and Chinese Search Report for Application No. 2012800347177 dated Sep. 30, 2014, 8 pages.
(Continued)

*Primary Examiner* — Daniel Cavallari
(74) *Attorney, Agent, or Firm* — Knobbe, Martens, Olson & Bear, LLP

(57) ABSTRACT

An irrigation system comprises an irrigation controller that receives user input and provides a power signal and command and message data to an encoder. The encoder encodes the command and message data onto the power signal to provide a data encoded power waveform that is sent over a two-wire path. The irrigation system further comprises one or more decoders in communication with the two-wire path to receive the data encoded power waveform and one or more irrigation valves in communication with the one or more decoders. The data encoded power waveform provides power to the decoders and the decoders decode the command and message data from the data encoded power waveform to control the irrigation valves according to the user input.

20 Claims, 37 Drawing Sheets

Related U.S. Application Data continuation of application No. 17/160,997, filed on Jan. 28, 2021, now Pat. No. 11,229,168, which is a continuation of application No. 16/014,323, filed on Jun. 21, 2018, now Pat. No. 10,918,030, which is a continuation-in-part of application No. 15/163,505, filed on May 24, 2016, now Pat. No. 10,228,711.

(60) Provisional application No. 62/215,960, filed on Sep. 9, 2015, provisional application No. 62/166,330, filed on May 26, 2015.

(51) Int. Cl.
  G05B 19/042 (2006.01)
  G05F 1/12 (2006.01)
  G05F 1/445 (2006.01)

(52) U.S. Cl.
  CPC ........ *G05B 19/0423* (2013.01); *G05F 1/12* (2013.01); *G05F 1/445* (2013.01); *G05B 2219/25132* (2013.01); *G05B 2219/2625* (2013.01)

(56) References Cited

U.S. PATENT DOCUMENTS

| | | |
|---|---|---|
| 6,013,988 A | 1/2000 | Bucks et al. |
| 6,016,038 A | 1/2000 | Mueller et al. |
| 6,069,457 A | 5/2000 | Bogdan |
| 6,094,014 A | 7/2000 | Bucks et al. |
| 6,127,783 A | 10/2000 | Pashley et al. |
| 6,147,458 A | 11/2000 | Bucks et al. |
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,225,759 B1 | 5/2001 | Bogdan |
| 6,234,648 B1 | 5/2001 | Börner et al. |
| 6,246,594 B1 | 6/2001 | Matsuda et al. |
| 6,249,088 B1 | 6/2001 | Chang |
| 6,250,774 B1 | 6/2001 | Begemann et al. |
| 6,292,901 B1 | 9/2001 | Lys et al. |
| 6,304,464 B1 | 10/2001 | Jacobs et al. |
| 6,340,864 B1 | 1/2002 | Wacyk |
| 6,340,868 B1 | 1/2002 | Lys et al. |
| 6,384,545 B1 | 5/2002 | Lau |
| 6,388,399 B1 | 5/2002 | Eckel |
| 6,411,046 B1 | 6/2002 | Muthu |
| 6,445,139 B1 | 9/2002 | Marshall et al. |
| 6,459,919 B1 | 10/2002 | Lys et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,777,891 B2 | 8/2004 | Lys et al. |
| 6,788,011 B2 | 9/2004 | Mueller et al. |
| 6,796,680 B1 | 9/2004 | Showers et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,965,205 B2 | 11/2005 | Piepgras et al. |
| 6,969,954 B2 | 11/2005 | Lys |
| 6,992,803 B2 | 1/2006 | Chang |
| 6,998,594 B2 | 2/2006 | Gaines et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,071,762 B2 | 7/2006 | Xu et al. |
| 7,118,248 B2 | 10/2006 | Wynne Willson |
| 7,132,804 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,300,192 B2 | 11/2007 | Mueller et al. |
| 7,308,296 B2 | 12/2007 | Lys et al. |
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,344,279 B2 | 3/2008 | Mueller et al. |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,391,168 B1 | 6/2008 | Dernovseck |
| 7,394,210 B2 | 7/2008 | Ashdown |
| 7,420,335 B2 | 9/2008 | Robinson et al. |
| 7,423,387 B2 | 9/2008 | Robinson et al. |
| 7,432,668 B2 | 10/2008 | Zwanenburg et al. |
| 7,443,209 B2 | 10/2008 | Chang |
| 7,449,847 B2 | 11/2008 | Schanberger et al. |
| 7,453,217 B2 | 11/2008 | Lys et al. |
| 7,459,864 B2 | 12/2008 | Lys |
| 7,462,997 B2 | 12/2008 | Mueller et al. |
| 7,463,070 B2 | 12/2008 | Wessels |
| 7,482,565 B2 | 1/2009 | Morgan et al. |
| 7,482,760 B2 | 1/2009 | Jungwirth et al. |

(56) References Cited

U.S. PATENT DOCUMENTS

| | | |
|---|---|---|
| 7,490,953 B2 | 2/2009 | Holten et al. |
| 7,495,671 B2 | 2/2009 | Chemel et al. |
| 7,502,034 B2 | 3/2009 | Chemel et al. |
| 7,511,436 B2 | 3/2009 | Xu |
| 7,511,437 B2 | 3/2009 | Lys et al. |
| 7,520,634 B2 | 4/2009 | Ducharme et al. |
| 7,521,872 B2 | 4/2009 | Bruning |
| 7,525,254 B2 | 4/2009 | Lys et al. |
| 7,538,499 B2 | 5/2009 | Ashdown |
| 7,542,257 B2 | 6/2009 | McCormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,573,209 B2 | 8/2009 | Ashdown et al. |
| 7,573,210 B2 | 8/2009 | Ashdown et al. |
| 7,573,729 B2 | 8/2009 | Elferich et al. |
| 7,589,701 B2 | 9/2009 | Sempel |
| 7,598,681 B2 | 10/2009 | Lys et al. |
| 7,598,684 B2 | 10/2009 | Lys et al. |
| 7,598,686 B2 | 10/2009 | Lys et al. |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,665,883 B2 | 2/2010 | Matherson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,703,951 B2 | 4/2010 | Piepgras et al. |
| 7,710,369 B2 | 5/2010 | Dowling |
| 7,712,926 B2 | 5/2010 | Matheson |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,764,026 B2 | 7/2010 | Dowling et al. |
| 7,766,489 B2 | 8/2010 | Duine et al. |
| 7,766,518 B2 | 8/2010 | Piepgras et al. |
| 7,777,427 B2 | 8/2010 | Stalker, III |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,828,465 B2 | 11/2010 | Roberge et al. |
| 7,845,823 B2 | 12/2010 | Mueller et al. |
| 7,850,347 B2 | 12/2010 | Speier et al. |
| 8,278,845 B1 | 10/2012 | Woytowitz |
| 8,578,081 B1 | 11/2013 | Fils |
| 8,710,770 B2 | 4/2014 | Woytowitz |
| 8,988,599 B2 | 3/2015 | Debevec |
| 9,521,725 B2 | 12/2016 | Woytowitz |
| 9,609,720 B2 | 3/2017 | Woytowitz et al. |
| 10,228,711 B2 | 3/2019 | Woytowitz |
| 10,375,793 B2 | 8/2019 | Woytowitz |
| 10,918,030 B2 | 2/2021 | Woytowitz |
| 2003/0132721 A1 | 7/2003 | Jacobs et al. |
| 2003/0133292 A1 | 7/2003 | Mueller et al. |
| 2004/0052076 A1 | 3/2004 | Mueller et al. |
| 2005/0004715 A1 | 1/2005 | Christiansen |
| 2005/0041161 A1 | 2/2005 | Dowling et al. |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0076908 A1 | 4/2006 | Morgan et al. |
| 2006/0114201 A1 | 6/2006 | Chang |
| 2006/0119287 A1 | 6/2006 | Campbell et al. |
| 2006/0126617 A1 | 6/2006 | Cregg et al. |
| 2006/0200967 A1 | 9/2006 | Adams et al. |
| 2006/0232219 A1 | 10/2006 | Xu |
| 2006/0262521 A1 | 11/2006 | Piepgras et al. |
| 2007/0145915 A1 | 6/2007 | Roberge et al. |
| 2007/0153514 A1 | 7/2007 | Dowling et al. |
| 2007/0230159 A1 | 10/2007 | Cortenraad et al. |
| 2008/0043464 A1 | 2/2008 | Ashdown |
| 2008/0089060 A1 | 4/2008 | Kondo et al. |
| 2008/0094005 A1 | 4/2008 | Rabiner et al. |
| 2008/0136334 A1 | 6/2008 | Robinson et al. |
| 2008/0136350 A1 | 6/2008 | Tripathi et al. |
| 2008/0140231 A1 | 6/2008 | Blackwell et al. |
| 2008/0164826 A1 | 7/2008 | Lys |
| 2008/0164827 A1 | 7/2008 | Lys |
| 2008/0164854 A1 | 7/2008 | Lys |
| 2008/0167734 A1 | 7/2008 | Robinson et al. |
| 2008/0183081 A1 | 7/2008 | Lys et al. |
| 2008/0203928 A1 | 8/2008 | Frumau et al. |
| 2008/0211419 A1 | 9/2008 | Garrity |
| 2008/0239675 A1 | 10/2008 | Speier |
| 2008/0253119 A1 | 10/2008 | Paulussen et al. |
| 2008/0265797 A1 | 10/2008 | Van Doorn |
| 2008/0272743 A1 | 11/2008 | Ackermann et al. |
| 2008/0278092 A1 | 11/2008 | Lys et al. |
| 2008/0278941 A1 | 11/2008 | Logan et al. |
| 2008/0298054 A1 | 12/2008 | Paulussen et al. |
| 2009/0002981 A1 | 1/2009 | Knibbe |
| 2009/0021175 A1 | 1/2009 | Wendt et al. |
| 2009/0021182 A1 | 1/2009 | Sauerlaender |
| 2009/0072761 A1 | 3/2009 | Wessels |
| 2009/0128059 A1 | 5/2009 | Joosen et al. |
| 2009/0134817 A1 | 5/2009 | Jurngwirth et al. |
| 2009/0168415 A1 | 7/2009 | Franciscus Deurenberg et al. |
| 2009/0179587 A1 | 7/2009 | Van Der Veen et al. |
| 2009/0179596 A1 | 7/2009 | Willaert et al. |
| 2009/0189448 A1 | 7/2009 | Verschueren |
| 2009/0195063 A1 | 8/2009 | Joseph et al. |
| 2009/0195064 A1 | 8/2009 | Joseph et al. |
| 2009/0224695 A1 | 9/2009 | Van Erp et al. |
| 2009/0230884 A1 | 9/2009 | Van Doorn |
| 2009/0231878 A1 | 9/2009 | Van Duijneveldt |
| 2009/0243517 A1 | 10/2009 | Verfuerth et al. |
| 2009/0278473 A1 | 11/2009 | Van Erp |
| 2009/0284174 A1 | 11/2009 | Sauerlander et al. |
| 2009/0303467 A1 | 12/2009 | Ashdown et al. |
| 2009/0315485 A1 | 12/2009 | Verfuerth et al. |
| 2009/0321666 A1 | 12/2009 | Hilgers |
| 2010/0007600 A1 | 1/2010 | Deurenberg et al. |
| 2010/0026191 A1 | 2/2010 | Radermacher et al. |
| 2010/0045478 A1 | 2/2010 | Schulz et al. |
| 2010/0053198 A1 | 3/2010 | Vinkenvleugel et al. |
| 2010/0072901 A1 | 3/2010 | De Rijck et al. |
| 2010/0072902 A1 | 3/2010 | Wendt et al. |
| 2010/0079085 A1 | 4/2010 | Wendt et al. |
| 2010/0079091 A1 | 4/2010 | Deixler et al. |
| 2010/0084985 A1 | 4/2010 | Woytowitz |
| 2010/0084986 A1 | 4/2010 | Longhino |
| 2010/0084995 A1 | 4/2010 | Baaijens et al. |
| 2010/0091488 A1 | 4/2010 | Ijzerman et al. |
| 2010/0094439 A1 | 4/2010 | Van De Meulenhof et al. |
| 2010/0096967 A1 | 4/2010 | Marinus et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |
| 2010/0134041 A1 | 6/2010 | Radermacher et al. |
| 2010/0134042 A1 | 6/2010 | Willaert |
| 2010/0148689 A1 | 6/2010 | Morgan et al. |
| 2010/0158061 A1 | 6/2010 | Schulz et al. |
| 2010/0165618 A1 | 7/2010 | Vissenberg et al. |
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |
| 2010/0244707 A1 | 9/2010 | Gaines et al. |
| 2010/0244734 A1 | 9/2010 | Van Herpen et al. |
| 2010/0264834 A1 | 10/2010 | Gaines et al. |
| 2010/0271843 A1 | 10/2010 | Holten et al. |

(56) References Cited

U.S. PATENT DOCUMENTS

| | | |
|---|---|---|
| 2010/0289532 A1 | 11/2010 | Wendt et al. |
| 2010/0301780 A1 | 12/2010 | Vinkenvleugel |
| 2010/0308745 A1 | 12/2010 | Delnoij |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0163680 A1 | 7/2011 | Welten |
| 2011/0175553 A1 | 7/2011 | Samspell |
| 2011/0187290 A1 | 8/2011 | Krause |
| 2012/0086701 A1 | 4/2012 | Vaananen et al. |
| 2013/0038234 A1 | 2/2013 | Van der Veen et al. |
| 2013/0049634 A1 | 2/2013 | Neudorf |
| 2013/0134891 A1 | 5/2013 | Woytowitz |
| 2013/0249429 A1 | 9/2013 | Woytowitz |
| 2013/0289750 A1 | 10/2013 | Souvay et al. |
| 2015/0237700 A1 | 8/2015 | Woytowitz |
| 2016/0349765 A1 | 12/2016 | Woytowitz |
| 2017/0127493 A1 | 5/2017 | Woytowitz |
| 2018/0295796 A1 | 10/2018 | Woytowitz |
| 2019/0069370 A1 | 2/2019 | Woytowitz |
| 2019/0313503 A1 | 10/2019 | Woytowitz |
| 2021/0144940 A1 | 5/2021 | Woytowitz |

FOREIGN PATENT DOCUMENTS

| | | |
|---|---|---|
| DE | 20 2012 100 843 U1 | 4/2012 |
| WO | WO 99/38363 A1 | 7/1999 |
| WO | WO 2014/116364 | 7/2014 |

OTHER PUBLICATIONS

Fraisee, Stephane "Define PWM duty cycle to stabilize light emission", Nov. 2007.

International Search Report dated Jul. 26, 2016 in corresponding Application No. PCT/US2016/027918.

PCT International Preliminary Report on Patentability for Application No. PCT/US2013/075169 dated Jul. 28, 2015, 6 pages.

PCT International Search Report and Written Opinion for PCT/US2012/048202, dated Nov. 27, 2012.

Title: Using Isolated RS-485 in DMX512 Lighting Applications, Date: Nov. 2009, Author: Hein Marais, p. 1-3 (Year: 2009).

Hunter® RIGO® beta

ADMINISTRATOR
dwayne.domi@hunterindustries.com

| TEST | FOLDER COMMANDS | FOLDER NON-WATER WINDOWS | FOLDER SETTINGS | COMMUNICATION HISTORY | COMMUNICATION QUEUE |

COMMUNICATION HISTORY - TEST

| | DATETIME | TIME | TYPE | COMMAND | |
|---|---|---|---|---|---|
| ◇ | 2015-04-26 3:58:41 PM | 1 SECONDS | SCHEDULED | CORRAL POST | SCHEDULED SOLAR SYNC RETRIEVAL (FOLDER) ˅ |
| ◇ | 2015-04-25 3:59:41 PM | 0 SECONDS | SCHEDULED | CORRAL POST | SCHEDULED SOLAR SYNC RETRIEVAL (FOLDER) ˅ |
| ◇ | 2015-04-24 4:00:41 PM | 0 SECONDS | SCHEDULED | CORRAL POST | SCHEDULED SOLAR SYNC RETRIEVAL (FOLDER) ˅ |
| ◇ | 2015-04-24 10:50:11 PM | 0 SECONDS | MANUAL | CORRAL POST | COMM CHECK ˅ |
| ◇ | 2015-04-23 9:00:21 PM | 0 SECONDS | SCHEDULED | WIFIKIT SITE 01 | REPORT FLOW ACCUMULATOR ˅ |
| ◇ | 2015-04-23 8:00:20 PM | 1 SECONDS | SCHEDULED | WIFIKIT SITE 01 | REPORT FLOW ACCUMULATOR ˅ |
| ◇ | 2015-04-23 7:00:20 PM | 0 SECONDS | SCHEDULED | WIFIKIT SITE 01 | REPORT FLOW ACCUMULATOR ˅ |
| ◇ | 2015-04-23 6:00:20 PM | 0 SECONDS | SCHEDULED | WIFIKIT SITE 01 | REPORT FLOW ACCUMULATOR ˅ |
| ◇ | 2015-04-23 5:00:19 PM | 1 SECONDS | SCHEDULED | CORRAL POST | SCHEDULED SOLAR SYNC RETRIEVAL (FOLDER) ˅ |
| ◇ | 2015-04-23 4:01:40 PM | 3 SECONDS | SCHEDULED | WIFIKIT SITE 01 | REPORT FLOW ACCUMULATOR ˅ |
| ◇ | 2015-04-23 4:00:18 PM | 1 SECONDS | SCHEDULED | WIFIKIT SITE 01 | REPORT FLOW ACCUMULATOR ˅ |

Encoder Power Supply Circuit (NSP-DC INPUT)

Topology for Buck Switching Regulator

Decoder Driver Circuit (NSP)

Decoder Communication Interface Circuit (NSP/SP)

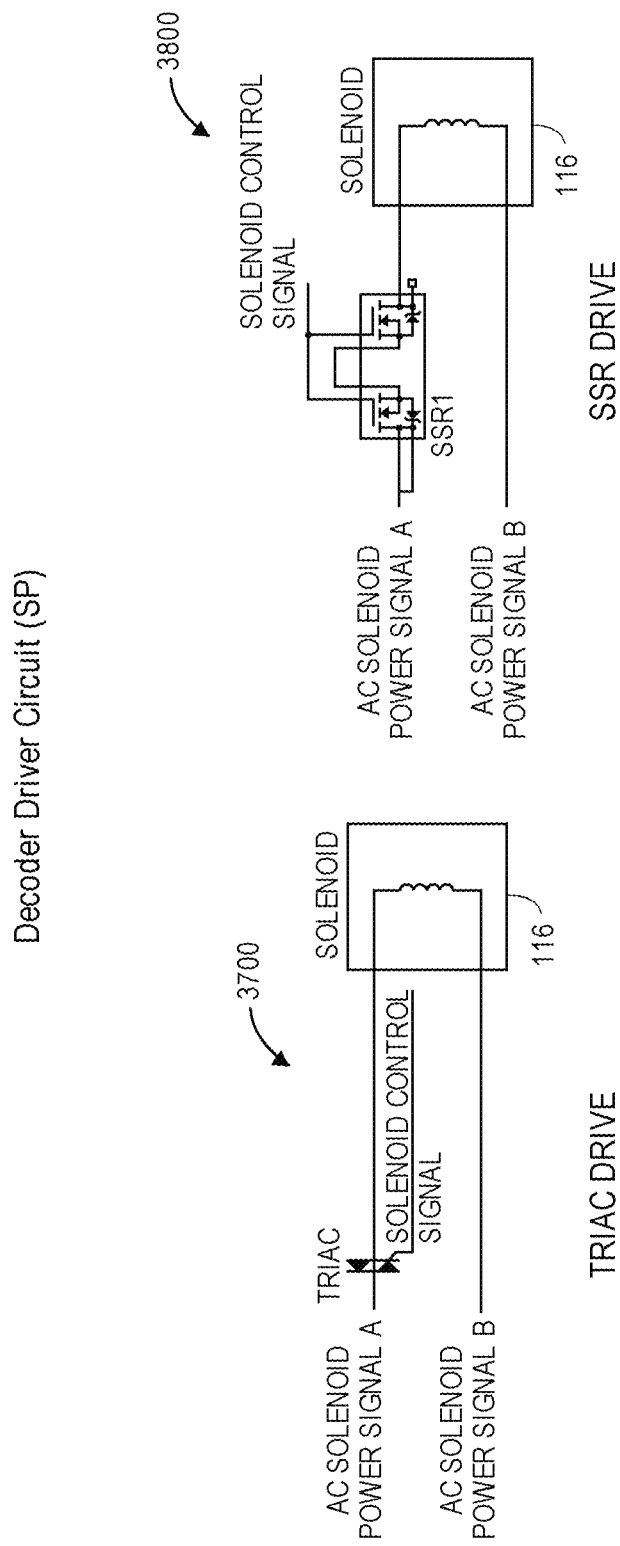

DECODER SYSTEMS AND METHODS FOR IRRIGATION CONTROL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Irrigation systems comprise an irrigation controller and a plurality of irrigation valves. Traditionally, each valve is wired individually to the irrigation controller and a user enters a watering program by manually switching switches and turning dials located on the front panel of the controller. The irrigation controller enables each valve according to the watering program, which permits water to flow through the valve to irrigate the landscape. For large irrigation systems, the complexity and cost of running individual wires between each valve and the irrigation controller can be prohibitive. In addition, the signal attenuation over the large lengths of individual wires may prevent the valves from actuating, which in turn limits the size of the irrigation system.

SUMMARY

In accordance with some aspects, the present disclosure relates to an irrigation controller implemented to power and selectively energize a plurality of solenoid-actuated valves connected to corresponding decoders along a two-wire communication network using data encoded power waveforms. Each decoder is serially addressable over the two-wire communication network and configured to energize its corresponding solenoid-actuated valves. The irrigation controller comprises a user input device configured to accept user input from a user and to output information responsive to the user input; a processor in communication with the user input device and configured to generate a control signal responsive to the information, the control signal having a first state and a second state; a transformer configured to receive an input power signal and provide AC power signal, wherein the AC power signal is approximately sinusoidal; and a bridge circuit communicating with the transformer to receive the AC power signal and the processor to receive the control signal and configured to output the data encoded power waveforms to control the plurality of solenoid-actuated valves.

In certain aspects, the bridge circuit comprises a plurality of solid-state relays, where at least one of the plurality of solid-state relays is enabled when the control signal is in the first state to pass the AC power signal approximately in-phase, and at least one of others of the plurality of solid-state relays is enabled when the control signal is in the second state to shift a phase of the AC power signal by approximately 180 degrees. The bridge circuit outputs the approximately in-phase AC power signal on the two-wire communication network when the control signal is in the first state and outputs the phase-shifted AC power signal on the two-wire communication network when the control signal is in the second state.

In an embodiment, each solid-state relay of the plurality of solid-state relays comprises two MOSFETs coupled in series. In another embodiment, the plurality of solid-state relays comprises four solid-state relays. In a further embodiment, the four solid-state relays are configured in the bridge circuit as a first diagonal pair of solid-state relays and a second diagonal pair of solid-state relays. In an embodiment, the first diagonal pair of solid-state relays is enabled when the control signal is in the first state to apply the approximately in-phase AC power signal to an output of the bridge circuit. In another embodiment, the second diagonal pair of solid-state relays is enabled when the control signal is in the second state to apply the phase-shifted AC power signal to an output of the bridge circuit.

In an embodiment, the data encoded power waveform comprises a sinusoidal waveform between zero-crossings. In another embodiment, the processor is further configured to receive sensor information from one or more sensors, where the sensor information comprises one or more of flow rate, rain event, temperature, solar radiation, wind speed, relative humidity, motion, voltage, current, and soil moisture. In a further embodiment, the irrigation controller further comprises a detachable face plate that includes the user input and the processor.

In accordance with some aspects, the present disclosure relates to an irrigation system implemented to power and selectively energize a plurality of solenoid-actuated valves connected to corresponding decoders along a two-wire communication network using data encoded power waveforms. The irrigation system comprises an irrigation controller comprising a user input device configured to provide information responsive to the user input, and a transformer configured to receive an input power signal and provide an AC power signal, where the AC power signal is approximately sinusoidal, and an encoder comprising a processor configured to generate a control signal responsive to the information. The control signal has a first state and a second state. The encoder further comprises a bridge circuit communicating with the transformer to receive the AC power signal, where the bridge circuit comprises a plurality of solid-state relays. At least one of the plurality of solid-state relays is enabled when the control signal is in the first state to pass the AC power signal approximately in-phase, and at least one of others of the plurality of solid-state relays is enabled when the control signal is in the second state to shift a phase of the AC power signal by approximately 180 degrees. The bridge circuit outputs the data encoded power waveform responsive to the AC power signal being approximately in-phase when the control signal is in the first state and responsive to the AC power signal being phase-shifted when the control signal is in the second state.

In certain aspects, the irrigation system further comprises a two-wire communication network in communication with the irrigation controller to receive the data encoded power waveform from the bridge circuit; and at least one decoder in communication with the two-wire communication network and at least one solenoid-actuated valve, where the at least one decoder is addressable over the two-wire communication network and configured to receive the data encoded power waveform and control the at least one solenoid actuated valve in response to the data encoded power waveform.

In an embodiment, the at least one solenoid-actuated valve comprises a DC latching solenoid. In another embodiment, the at least one decoder includes drive circuitry for the DC latching solenoid. In a further embodiment, the at least one decoder includes an LED for optical communication of diagnostic data. In an embodiment, the at least one decoder circuit includes a current sensing circuit that senses a current of a solenoid associated with the at least one solenoid-actuated valve, where the communicated diagnostic data is responsive at least in part to the sensed current. In another embodiment, the irrigation system further comprises at least one two-wire path repeater circuit in communication with the two-wire communication network and at least one decoder not in communication with the two-wire communication network.

In accordance with some aspects, the present disclosure relates to a method to power and selectively energize a plurality of solenoid-actuated valves connected to corresponding decoder circuits along a two-wire communication network using data encoded power waveforms, where each decoder circuit is serially addressable over the two-wire communication network and configured to energize its corresponding solenoid-actuated valves. The method comprises receiving user input entered by a user on a user input device; providing information responsive to the user input; generating a control signal responsive to the information, the control signal having a first state and a second state; transforming an input power signal to an AC power signal, wherein the AC power signal is approximately sinusoidal; enabling at least one of a plurality of solid-state relays when the control signal is in the first state to pass the AC power signal approximately in-phase; enabling at least one of others of the plurality of solid-state relays when the control signal is in the second state to shift a phase of the AC power signal by approximately 180 degrees; and outputting, on the two-wire communication network, the data encoded power waveform responsive to the AC power signal being approximately in-phase when the control signal is in the first state and responsive to the AC power signal being phase-shifted when the control signal is in the second state.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments and not to limit the scope of the disclosure.

FIG. 11 is a screen shot illustrating communication history, according to certain embodiments.

FIG. 13 is a screen shot illustrating a folder page, according to certain embodiments.

FIG. 18 is a screen shot illustrating a data collection page, according to certain embodiments.

FIG. 37 illustrates exemplary driver circuitry for a decoder receiving a sinusoidal input signal from the two-wire path, according to certain embodiments.

FIG. 38 illustrates other exemplary driver circuitry for a decoder receiving a sinusoidal input signal from the two-wire path, according to certain embodiments.

DETAILED DESCRIPTION

Cloud-Based Control Systems

The features of the inventive systems and methods will now be described with reference to the drawings summarized above.

Figure 1:
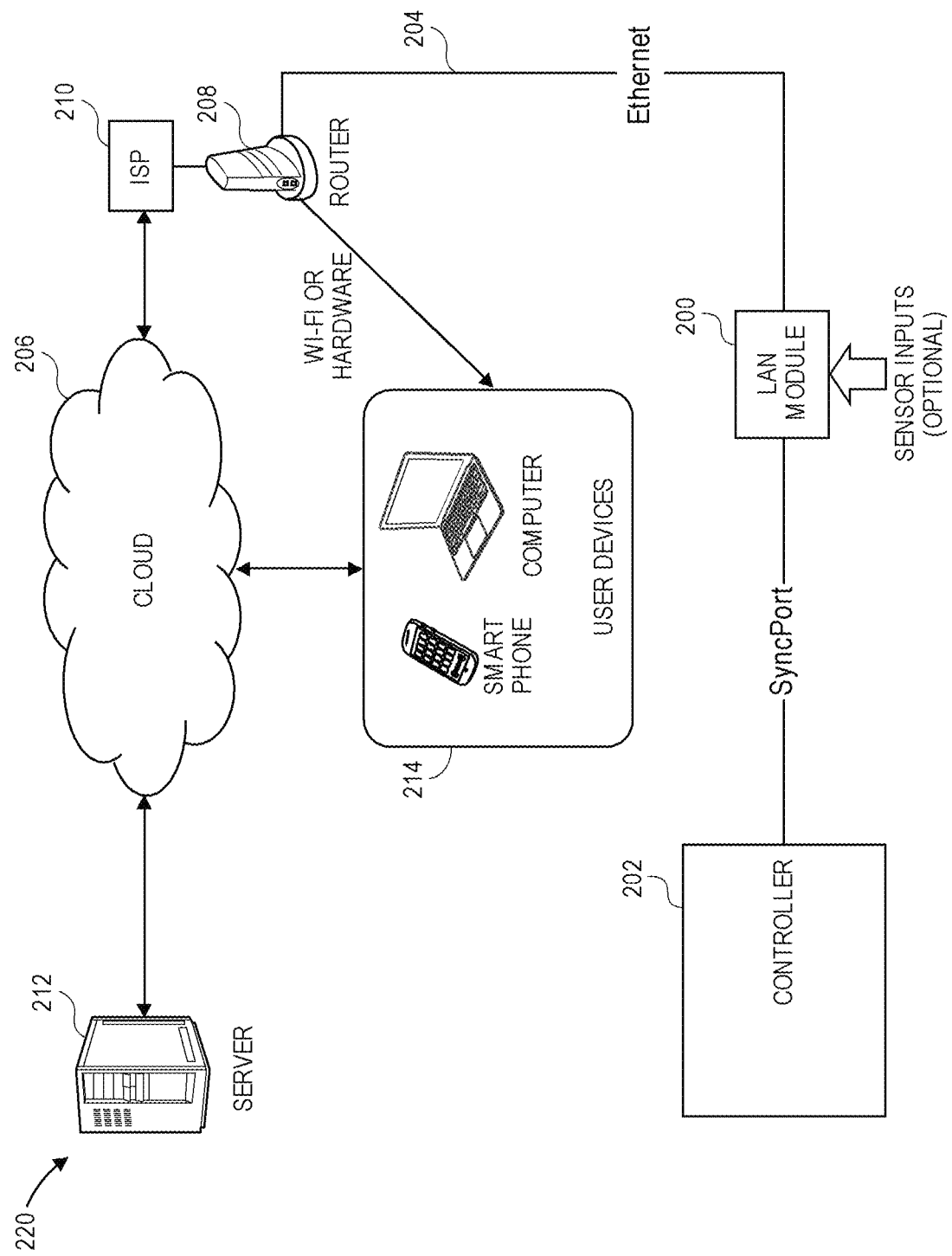
FIG. 1 illustrates a first system to remotely control a landscape controller, according to certain embodiments.

FIG. 1 illustrates a cloud-based control system 220, which comprises a server 212 communicating through the cloud or Internet 206 to various Internet-connected devices 214 including tablets, smart phones, computers, and the like, and a router 208, which provides communications between the devices 214 and a controller 202. The server 212 can serve up a web page that is accessible by the variety of Internet-connected devices 214. This allows a user who is able to connect to the Internet with a compatible device the ability to control a landscape system from a remote location without having specific software installed on the device. In an embodiment, the controller 202 comprises an irrigation controller configured to control irrigation valves. In another embodiment, the controller 202 comprises a lighting controller configured to control lighting fixtures. In a further embodiment, the controller 202 comprises a landscape controller configured to control sprinkler valves and lighting fixtures.

This service benefits property owners by permitting the property owners to manage their property remotely. Additionally, it is beneficial to a provider of irrigation, lighting, or landscape services to manage multiple accounts from a remote location. In an embodiment, different information is available to a single user than is available to a group user. In another embodiment, different information is available to a homeowner than is available to a professional maintenance person.

The server 212 receives information, such as schedule changes, alarms, and the like, from the controller 202. In an embodiment, the server 212 comprises a cloud-based server. In an embodiment, the server 212 retrieves weather and soil information, for example, from one or more of the interconnected devices. This information may come from the controller 202, from a weather station controller, or from a communications module. One common method for sharing information among multiple devices residing on the internet is Message Queuing Telemetry Transport or MQTT. MQTT is well documented and uses a broker with a publisher/subscriber model to share data.

The server 212 receives commands from the user through the connected device, such as for example, change programming, shut down, provide status information, and the like. The server 212 provides information to the controller 202, such as, for example, schedule changes, and commands, such as manual start, resume normal operations, shut down, and the like.

In an embodiment, the server 212 provides information to the user via the served up web page, such as, for example, map locations of the property or properties being managed, alarm reports, current schedules, and other pertinent information that is useful to the user.

Embodiments disclose systems and methods to connect controllers to server-based central control software packages, which allowing remote control and monitoring via Internet enabled devices. Other embodiments disclose systems and methods to connect the controller to an existing network, which has Internet access.

Landscape System with LAN Module for Cloud-Based Central Control

FIG. 1 illustrates the system 220 to remotely control the controller 202, according to an embodiment. The system 220 comprises the controller 202 connecting to a local area network (LAN) module 200 via a hardwire connection. The controller 202 can be an irrigation controller such as the Pro-C® irrigation controller manufactured by Hunter Industries, Inc. An embodiment of an irrigation controller is described in U.S. Pat. No. 6,721,630 to Woytowitz, issued Apr. 13, 2014, which is incorporated by reference in its entirety herein and forms a part of this disclosure. The LAN module 200 connects to an Ethernet cable 204, which is connected to a local area network (LAN) that has Internet access. In FIG. 1, the Internet or cloud 206 is accessed via the router 208 that is connected to an Internet Service Provider (ISP) 210. The cloud-based server 212 hosts an application that provides an end user with control and monitoring capability of the controller 202 from the web-enabled user device 214 via its web browser, custom software, or a dedicated application. Although one controller 202 is illustrated in FIG. 1, in other embodiments multiple controllers 202 with multiple LAN modules 200 connect to a single LAN 200. In a further embodiment, when the connection between the LAN module 200 and the controller 202 supports a multi-drop network, multiple controllers 202 may be serviced by a single LAN module 200.

The LAN module 200 optionally comprises sensor input capability, and thereby shares the sensor status with one or more of the controller 200 and the server 212. This information may include, but is not limited to, flow rate, rain event, temperature, solar radiation, wind speed, relative humidity, motion, voltage, current, and soil moisture. In a further embodiment, the controller 202 comprises the sensor inputs and shares the sensor information with the server 212.

Communication between the controller 202 and the LAN module 200 may use a standard interface or a proprietary interface. Standard interfaces include, but are not limited to, RS232, RS485, Controller Area Network (CAN), USB, I2C, SPI, and the like. Proprietary interfaces include, but are not limited to, the SyncPort™ standard developed by Hunter Industries, Inc. In an embodiment, the LAN module 200 is located in proximity to the controller 202. In other embodiment, the LAN module 200 can be located far from the controller 202. The SyncPort™ is an optically isolated, balanced pair interface, which permits hundreds of feet of wire to connect the controller 202 with the LAN module 200. Other standards, such as RS485, permit thousands of feet of wire to connect the controller 202 with the LAN module 200.

In an embodiment, the controller 202 comprises the LAN module 200. In another embodiment, the LAN module circuitry is on the same printed circuit board as other controller circuitry and located within the controller 202. In an embodiment, power for the LAN module 200 is derived from the controller 202 via the SyncPort™. Power may also be supplied to the LAN module 200 by a separate power supply. In a further embodiment, the LAN module 200 may be powered using Power-over-Ethernet, which comprises a group of standards that allow an Ethernet connection to supply power as well as communications.

Figure 2:
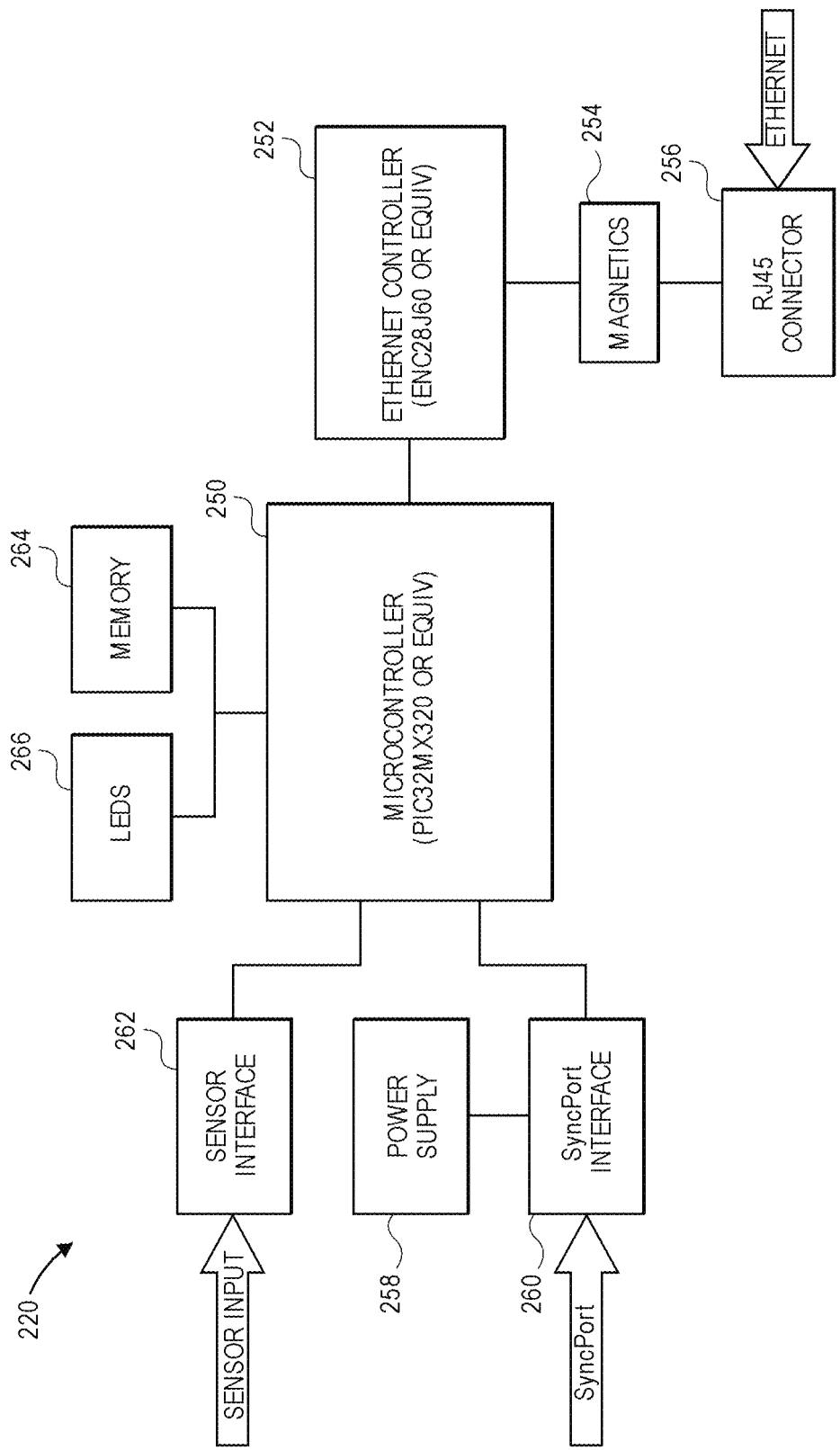
FIG. 2 is a block diagram of a LAN module shown in FIG. 1, according to certain embodiments.

FIG. 2 illustrates an embodiment of the LAN module 200 comprising a microcontroller 250, an Ethernet controller 252, transformer/magnetics 254, and a connector 256. The microcontroller 250 can be, for example, a PIC32MX320, manufactured by Microchip Technology of Chandler Arizona or the like, and the Ethernet controller 252 can be, for example, an ENC28J60, manufactured by Microchip Technology of Chandler Arizona, or the like. The microcontroller 250 serves as a host and is in communication with the Ethernet controller 252. The Ethernet controller 252 communicates with the Local Area Network via a set of transformers or magnetics 254, which provide isolation, and the connector 256. In an embodiment, the connector 256 comprises a standard RJ45 connector.

The LAN module 200 further comprises a power supply 258, SyncPort™ interface circuitry 260, and sensor interface circuitry 262. The SyncPort™ supplies power to the LAN module 200. The SyncPort™ standard uses separate wires for power and communication. In an embodiment, a cable interfacing the SyncPort™ with the SyncPort™ interface circuitry 260 comprises the power wires and the communication wires. The power supply 258 regulates the unregulated "raw" voltage from the SyncPort™ power wires for use by the LAN module's logic circuitry, the SyncPort™ interface circuitry 260, and the sensor interface circuitry 262. In an embodiment, the logic supply voltage is approximately 3.3V, and the sensor interface circuitry 262 is powered by approximately 20-24 volts.

The SyncPort™ interface circuitry 260 receives the SyncPort™ communication signals, and interfaces them to the microcontroller 250. In an embodiment, the SyncPort™ interface circuitry 260 converts the SyncPort™ communication signals from differential signals to single ended signals, while also providing optical isolation.

The LAN module 250 further comprises memory 264. In an embodiment, the memory 264 comprises serial EEPROM and/or serial SPI Flash integrated circuits. In another embodiment, the microcontroller 250 comprises the memory 264. This memory 264, in an embodiment, is non-volatile and may serve several uses. For instance, if the firmware for the host microcontroller 250 inside the LAN module 200 needs to be updated (for instance from the server 212), then the updated firmware could first be loaded into the memory 264 and validated via checksum or the like, before being used to reprogram the host microcontroller 250.

The memory 264 could store sensor data. In an embodiment, the sensor interface circuitry 262 comprises a flow sensor interface, and for instance, the amount of water flowing during each minute of the day could be stored and later retrieved by the server 212. In another embodiment, the sensor interface circuitry 262 comprises a temperature sensor interface and, for example, temperature data could be stored in the memory 264. In yet another embodiment, the memory 264 could hold a webpage that could be served by the host microcontroller 250. This may be useful for commissioning (initial setup/registration) or diagnostics purposes.

The LAN module 200 further comprises one or more LEDs 266, which can provide status information. For instance, one LED 266 could reflect the connection status between the LAN module 200 and the controller 202. Another LED 266 could reflect the status of the connection between the LAN module 200 and the LAN. A third LED 266 could be used to reflect the status of the LAN's connection to the Internet 206 or the server 212. Such feedback could provide invaluable trouble-shooting assistance in the event the system 100 fails.

It should be noted that in the embodiment presented, a host microcontroller 250 was used inside the LAN module 200 because of the limited processing capability of the microcontrollers 250 typically found inside irrigation/lighting/landscape controllers 202. In most cases, the controller's microcontroller does not have the processing power or memory to host the TCP/IP stack to interface to the LAN. However, in further embodiments, the microcontroller associated with the controller 202 would perform the additional functions and the LAN module 200 would comprise the Ethernet controller 252 for Ethernet communications.

Furthermore, other embodiments of the microcontroller 250 may comprise an Ethernet controller 252, which would eliminate the need for a separate integrated circuit. In yet further embodiments, the controller's microcontroller may comprise a built-in Ethernet controller 252 for a totally integrated solution.

Additionally, while the magnetics 254 and RJ45 connector 256 are shown in FIG. 2 as separate devices, the magnetics 254 may be housed inside the RJ45 connector shell.

Landscape System with Wi-Fi Module for Cloud-Based Central Control

Figure 3:
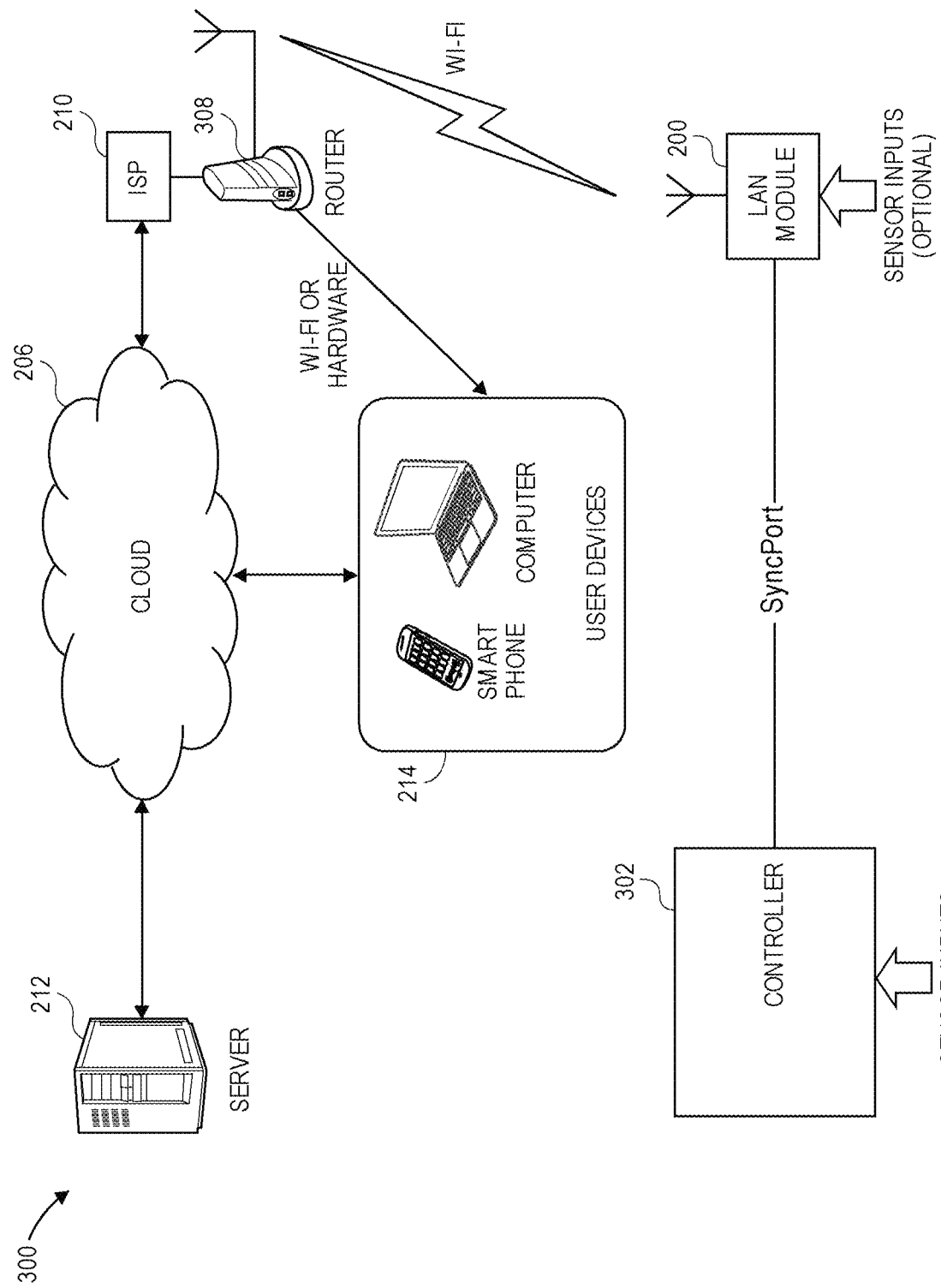
FIG. 3 illustrates a second system to remotely control a landscape controller, according to certain embodiments.

FIG. 3 illustrates a system 300 to remotely control a controller 302, according to another embodiment. The system 300 comprises the controller 302 and a Wi-Fi module 304, which connects the controller 302 to the LAN via a Wi-Fi connection. In an embodiment, the controller 302 comprises an irrigation controller configured to control irrigation valves. In another embodiment, the controller 302 comprises a lighting controller configured to control lighting fixtures. In a further embodiment, the controller 302 comprises a landscape controller configured to control sprinkler valves and lighting fixtures. The Internet or cloud 206 is accessed via a router 308 that is connected to the Internet Service Provider (ISP) 210. The cloud-based server 212 hosts an application that provides an end user with control and monitoring capability of the controller 302 from the web-enabled user device 214 via its web browser, custom software, or a dedicated application.

In an embodiment, multiple controllers 302 with multiple Wi-Fi modules 304 connect to a single LAN. In a further embodiment, multiple controllers 302 may be serviced by a single Wi-Fi module 304.

The Wi-Fi module 304 optionally comprises a sensor input capability, and thereby shares the sensor status with one or more of the controller 302 and the server 212. This information may include, but is not limited to, flow rate, rain event, temperature, solar radiation, wind speed, relative humidity, motion, voltage, current, and soil moisture.

Communication between the controller 302 and the Wi-Fi module 304 may use a standard interface or a proprietary interface. Standard interfaces include, but are not limited to RS232, RS485, Controller Area Network (CAN), USB, I2C, SPI, and the like. Proprietary interfaces include, but are not limited to the SyncPort™ standard developed by Hunter Industries. In an embodiment, the Wi-Fi module 304 is located in proximity to the controller 302. In other embodiment, the Wi-Fi module 304 can be located far from the controller 302. In another embodiment, the Wi-Fi module circuitry is on the same printed circuit board as other controller circuitry and located within the controller 302. In an embodiment, power for the Wi-Fi module 304 is derived from the controller 302 via the SyncPort™ Power may also be supplied to the Wi-Fi module 304 by a separate power supply.

Landscape Systems Using Power Line Communication for Cloud-Based Central Control FIGS. 4-10 relate to embodiments of a landscape system using power line communication for cloud-based central control. The systems illustrated in FIGS. 4, 6-10 use power line communication techniques to use existing AC wiring to communicate with an Ethernet to power line adapter. The Ethernet to power line adapter, via an Ethernet cable, operationally connects to a local area network (LAN) that has Internet access. The Internet (cloud) 206 is accessed via a router that is connected to the Internet Service Provider (ISP) 210. The cloud based server 212 hosts an application that provides an end user with control and monitoring capability of the controller, from any web-enabled user device via its web browser, custom software, or a dedicated application.

In an embodiment, the controllers in FIGS. 4, 6-10 comprise irrigation controllers configured to one or more control irrigation valves. In another embodiment, the controllers in FIGS. 4, 6-10 comprise lighting controllers configured to control one or more lighting fixtures. In a further embodiment, the controllers in FIGS. 4, 6-10 comprise landscape controllers configured to control one or more sprinkler valves and/or one or more lighting fixtures.

Figure 4:
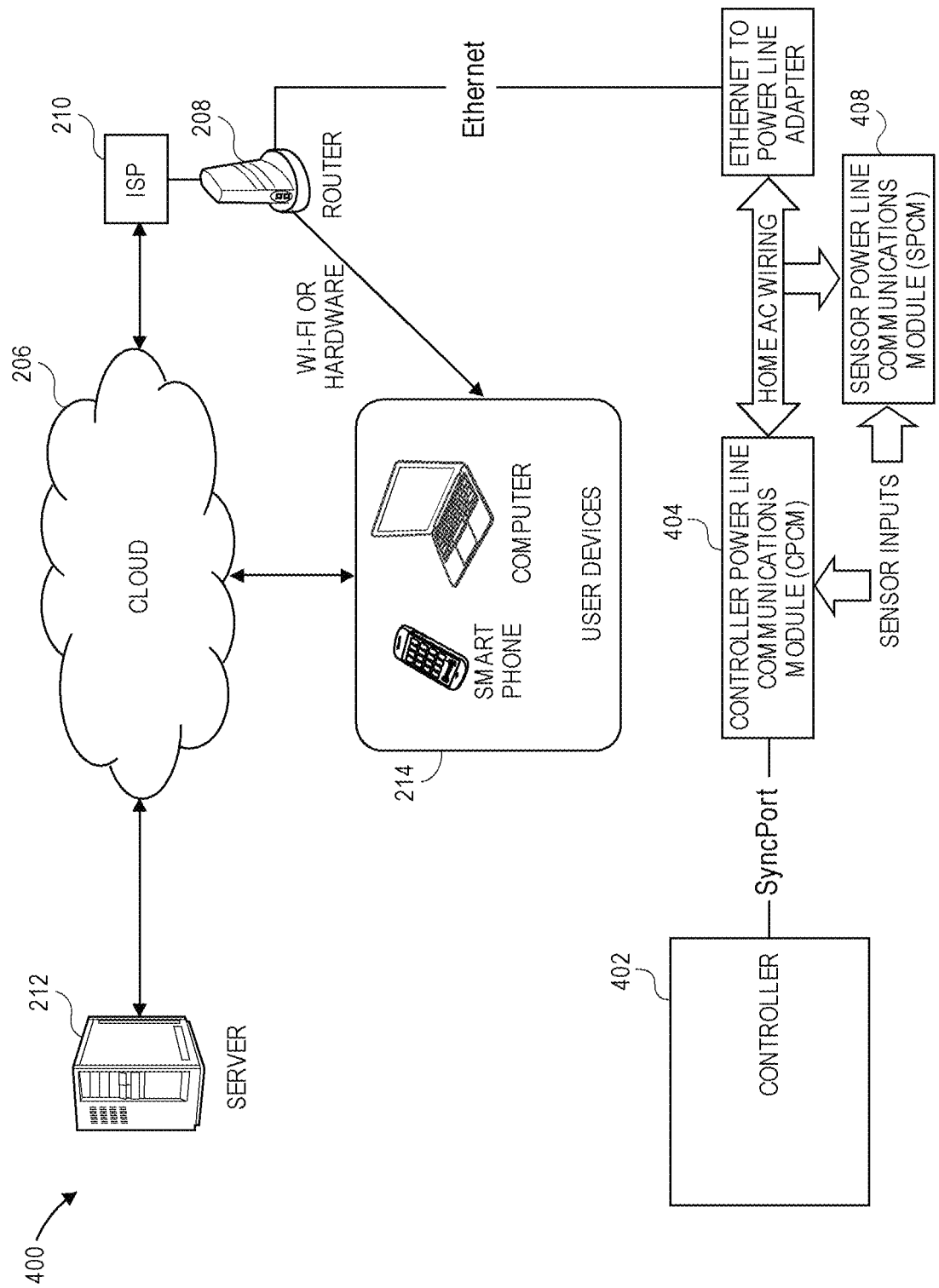
FIG. 4 illustrates an embodiment of a landscape system using power line communication to remotely control a landscape controller.

FIG. 4 illustrates an embodiment of a landscape system 400 using power line communications to remotely control a controller 402. The system 400 comprises the controller 402, a Controller Power Line Communication Module (CPCM) 404, and the Ethernet to power line adapter 406. In an embodiment, the controller 402 comprises an irrigation controller, such as the Pro-C® irrigation controller manufactured by Hunter Industries, Inc. The structure of an irrigation controller is further described in FIGS. 39-41. The controller 402 connects to the CPCM 404 via a hardwire connection. The CPCM 404 uses power line communication techniques to use existing AC wiring to communicate with the Ethernet to power line adapter 406. In an embodiment, the controller 402 comprises the CPCM 404.

Although only one controller 402 is shown in FIG. 4, other embodiments of the system 400 comprise multiple controllers 402 with multiple CPCM's 404 connecting to a single or multiple Ethernet to power line adapters 406. In further embodiments, where the connection methods between the CPCM 404 and the controller 402 support a multi-drop network, multiple controllers 402 may be serviced by a single CPCM 404.

The CPCM 404 may optionally comprise sensor input capability, and thereby share sensor status with either the controller 402 or the server 212. The sensors comprise one or more of an evapotranspiration (ET) system, Solar Sync system, rain sensor, temperature sensor, soil moisture sensor, wind sensor, humidity sensor, ambient light sensor, or the like, in any combination. Furthermore, in another embodiment, the controller 402 comprises the sensor inputs and shares the sensor information with the server 212.

The system 400 of FIG. 4 further comprises one or more sensor power line communications modules (SPCM) 408. Sensors may operationally connect to the one or more SPCMs 408, which would share sensor information with the other power line communication devices. Advantageously, the SPCM 408 can be located close to the sensor, which may not be close to the controller 402 or to the CPCM 404. In an embodiment, the sensors may be connected to one or more of the sensor power line communications module (SPCM) 408, the controller power line communication module (CPCM) 404, and the controller 402.

An advantage to using power line communication techniques is that no special wiring needs to be run to any of the devices. In an embodiment, the controller 402 comprises the CPCM 404. Because the controllers utilize AC power, they inherently have access to the signals used for the power line communication. This provides a "seamless" installation where the installer simply connects the controller 402 to AC power as is normally done, and the connection to the power line network instantly exists.

Power line communications can take on many forms. This section is intended to give background information on this subject, and is not intended to describe the "only" way to accomplish power line communications.

Typically, power line communication systems superimpose a high frequency carrier signal onto a standard utility power signal. The high frequency carrier signal is a low-level signal when compared to the high-level power signal. The carrier signal may have a frequency ranging from approximately 20 kHz-30 kHz to over 1 MHz, which is significantly higher than the power line frequency of approximately 50 Hz or 60 Hz. Many of the devices to be powered are expecting a sinusoidal power signal of approximately 120 VAC or 230 VAC at approximately 50 Hz-60 Hz, depending on the power standards of the geographic area. Superimposing the high frequency carrier signal onto the power signal leaves the power signal essentially intact, and the devices operate normally. Typically, the communication signal is coupled onto the AC power line by capacitively coupling the output of a high-frequency isolation transformer to the AC power line. The power line communication network is bi-directional, and can transmit as well as receive a power line encoded message. In addition to providing isolation, the high-frequency isolation transformer provides some selectivity to accept signals in the frequency range of the carrier signal while rejecting signals having other frequencies, especially the 50 Hz or 60 Hz power signal.

Various modulation techniques can be used to encode data onto the high-frequency carrier signal. Some modulation techniques include, but are not limited to Amplitude Modulation (AM), Amplitude Shift Keying (ASK), Frequency Modulation (FM), Frequency Shift Keying (FSK), Spread Frequency Shift Keying (SFSK), Binary Phase Shift Keying (BPSK), Quadrature Amplitude Modulation (QAM), Phase Shift Keying (PSK) and Orthogonal Frequency Division Multiplexing (OFDM). The carrier frequency and modulation technique that is used depends on the type of communication needed. In general, higher-frequency carriers allow faster data rates at the expense of not traveling as far on a pair of conductors. While low-frequency carriers travel farther, but support slower data rates. Similarly, simple modulation techniques such as ASK and FSK are easier to implement since they do not require much computational effort, but do not perform as well in the presence of interference. More complex modulation schemes, such as OFDM, for example, require greater processing power, but perform admirably in the presence of interference.

Figure 5:
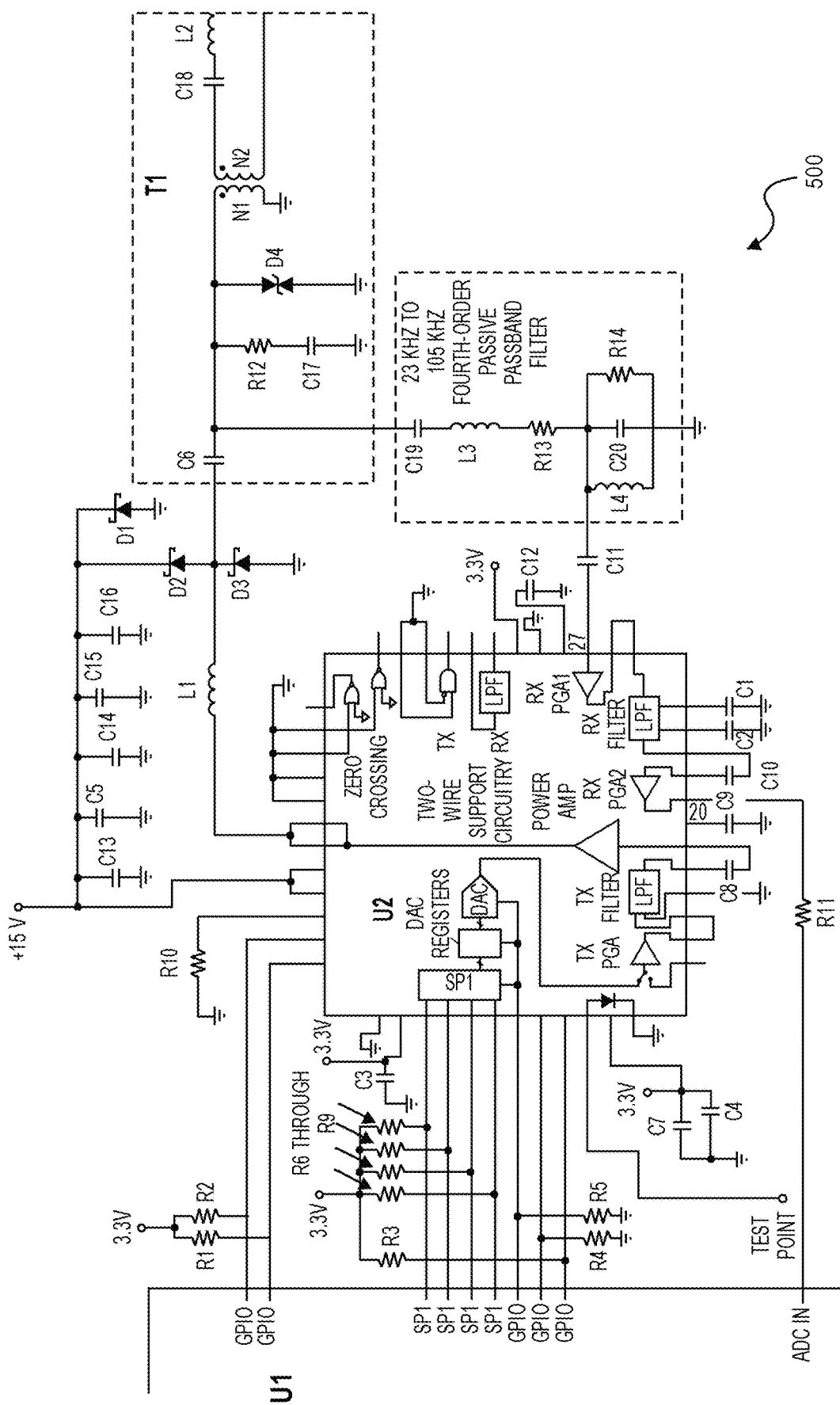
FIG. 5 is a schematic diagram of an exemplary power line communication circuit, according to certain embodiments.

FIG. 5 illustrates a schematic diagram for an embodiment of a power line communication circuit (PLCC) 500 configured to receive power line communication signals, demodulate the embedded or inserted data from the received signals, transmit power line communication signals, and modulate data onto the transmitted signals. In other embodiments, other approaches to power line communications and other integrated circuits from other manufacturers could be used.

In an embodiment, the PLCC 500 comprises a microcontroller U1, an analog front-end device (AFE) U2, diodes D1-D4, resistors R1-R14, capacitors C1-C20, and inductors L1-L3. In an embodiment the controller powerline communications module (CPCM) 404 comprises the power line communication circuit (PLCC) 500.

In some embodiments, the PLCC 500 electrically couples to the 120 VAC power line and further comprises a transformer T1. Beginning at the power line input, inductor L2 and coupling capacitor C18 provide a first stage of low frequency rejection, while blocking imbalances (direct current signals) on either side of the circuit. Next, the signal is coupled to the transformer T1. In an embodiment, transformer T1 has approximately a 1.5:1 turn's ratio. Transformer T1 provides additional selectivity (filtering) and provides isolation from the power line for safety reasons. A suitable device for transformer T1 is PN 70P7282 available from Vitec Inc., or the like.

In an embodiment, the PLCC 500 electrically couples to an output of the 24 VAC transformer found in the controller 402. The 24 VAC transformer provides isolation from the power line for safety reasons and transformer T1 is not needed for isolation. In an embodiment, transformer T1 can be omitted when the 24 VAC transformer is providing the isolation from the power line.

The signal then enters the analog front-end device (AFE) U2. A suitable part for U2 is PN AFE031 available from Texas Instruments, or the like. Note that the signal enters AFE U2 on more than one pin. Pin 27 serves as the receive input and is where the carrier signal coming from the power line enters the receive chain. There is an additional band pass filter between transformer T1 and AFE U2 pin 27, comprising capacitor C19, inductor L3, resistor R13, resistor R14, capacitor C20, and inductor L4. The signal out of transformer T1 is also coupled to AFE U2 pins 42 and 43. This is the transmit path and two pins are used due to high current leaving AFE U2 in order to drive the carrier signal onto the power line.

The functions provided by AFE U2 and the associated surrounding circuitry can be summed up as follows. The receive chain provides additional low-pass filtering and amplification before outputting the signal on AFE U2 pin 20. The transmit chain generates the transmit signal via an integrated digital to analog converter (DAC) and provides filtering and power amplification of the signal. AFE U2 is then coupled to microcontroller U1, which provides modulation and demodulation.

In an embodiment, the microcontroller U1 comprises a TMS320F28X available from Texas Instruments, or the like. In other implementations, portions of the AFE U2 may be integrated into the same IC as the microcontroller U1. In yet other implementations, the AFE U2 may be replaced by discrete circuitry.

Figure 6:
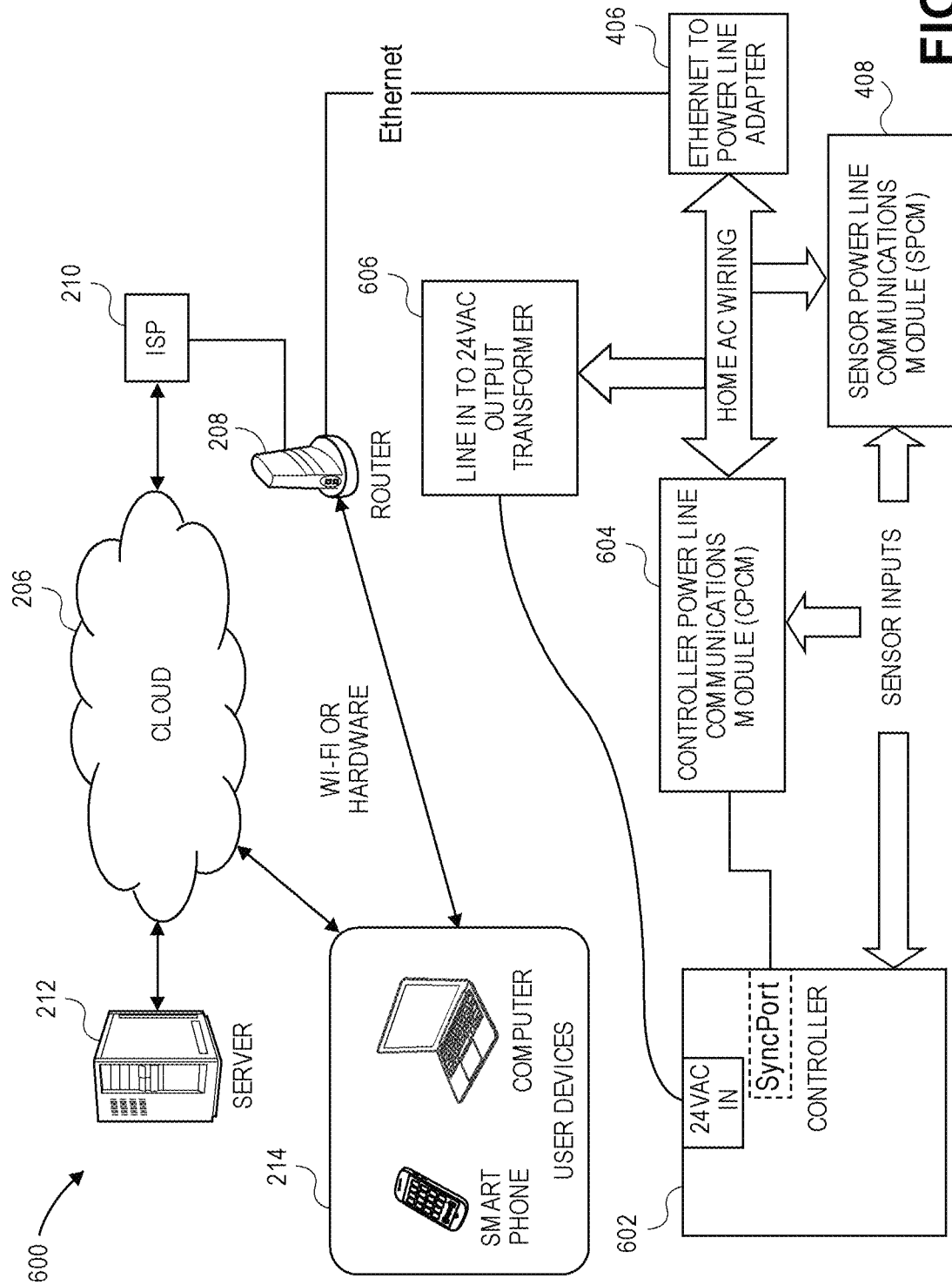
FIG. 6 illustrates another embodiment of a landscape system using power line communication to remotely control a landscape controller.

FIG. 6 illustrates another embodiment of a landscape system 600 using power line communications to remotely control a controller 602. The system 600 comprises the controller 602, the Controller Power Line Communication Module (CPCM) 604, and the Ethernet to power line adapter 406.

The controller 602 comprises the SyncPort™, a 24 VAC input and one or more sensor inputs. The controller 602 connects to the CPCM 604 via a hardwire connection to the SyncPort™ and the CPCM 604 electrically couples to the power line. The CPCM 604 uses power line communication techniques to use existing AC wiring to communicate with the Ethernet to power line adapter 406 as described above. The CPCM 604 communicates the decoded data from the power line to the controller 602 via the SyncPort™. In an embodiment, the CPCM 604 comprises the PLCC 500. In another embodiment, the controller 602 comprises the CPCM 604.

The system 600 further comprises one or more sensor power line communications modules (SPCM) 408 as described above with respect to FIG. 3. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of the sensor power line communications module (SPCM) 408, the controller power line communication module (CPCM) 604, and the controller 602.

The system 600 of FIG. 6 further comprises a transformer 606 such that the power line input to 24 VAC is handled in a separate transformer and connected separately to the controller 602. The transformer 606 comprises a power line input to 24 VAC output transformer configured to receive the power line input and provide approximately 24 VAC to the controller 602.

Figure 7A:
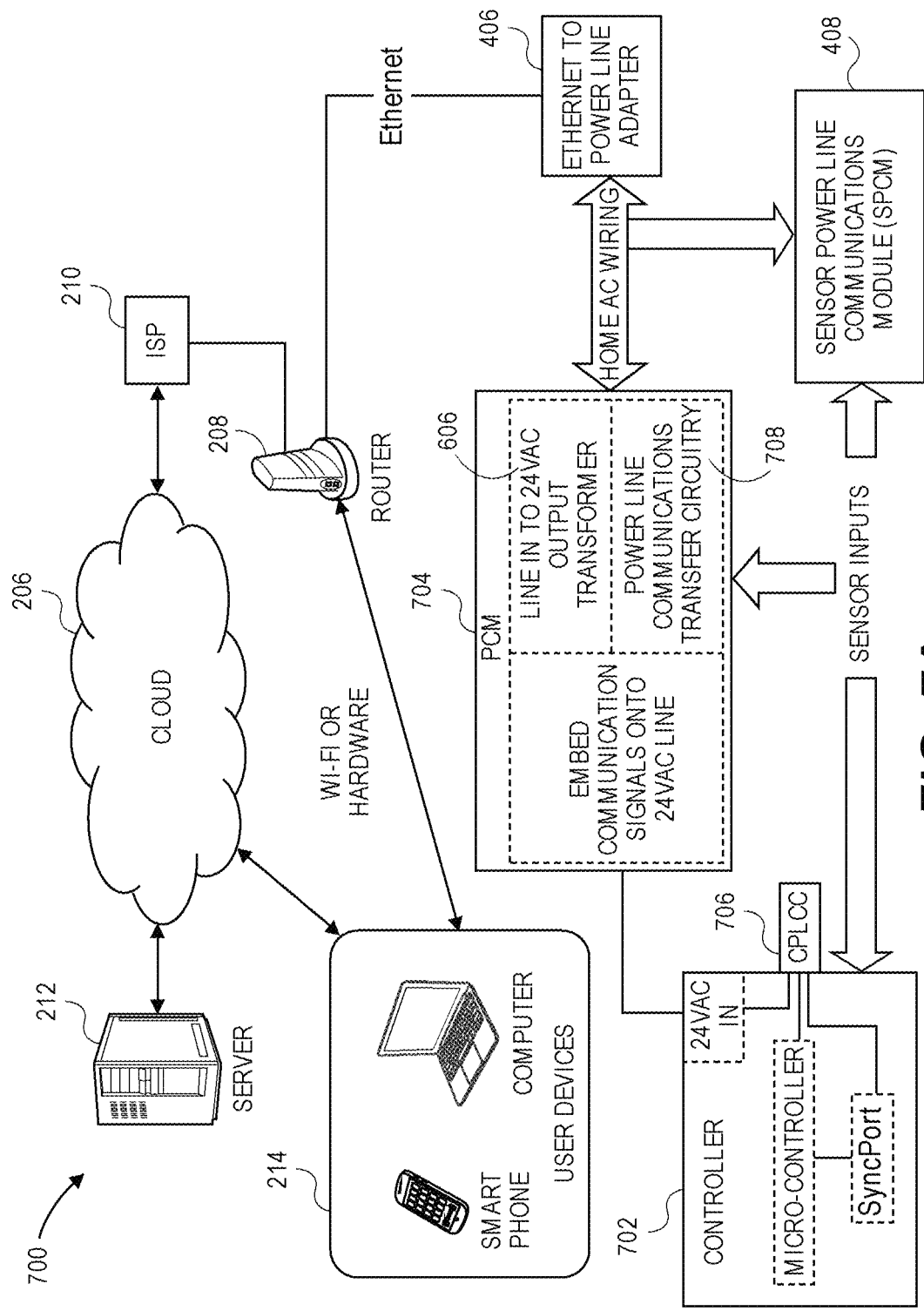
FIGS. 7A and 7B illustrate other embodiments of a landscape system using power line communications to remotely control a landscape controller.

FIG. 7A illustrates another embodiment of a landscape system 700 using power line communications to remotely control a controller 702. The system 700 comprises the controller 702, a Power and Communication Module (PCM) 704, and the Ethernet to power line adapter 406.

The controller 702 comprises a 24 VAC input, a processor or microcontroller, and the SyncPort™. The controller 702 is associated with Communications Power Line Communication Circuitry (CPLCC) 706, which may be a module attached to the outside of the controller 702, as illustrated in FIG. 7A. In another embodiment, the CPLCC 706 may be embedded into the controller 702 or a module attached inside the controller housing, as illustrated in a system 750 of FIG. 7B.

The Power and Communication Module (PCM) 704 comprises a transformer, such as the power line input to 24 VAC transformer 606, and circuitry to embed or insert communication signals onto the 24 VAC signal. The PCM 704 uses power line communication techniques to use existing AC wiring to communicate with the Ethernet to power line adapter 406 as described above.

Figure 7B:
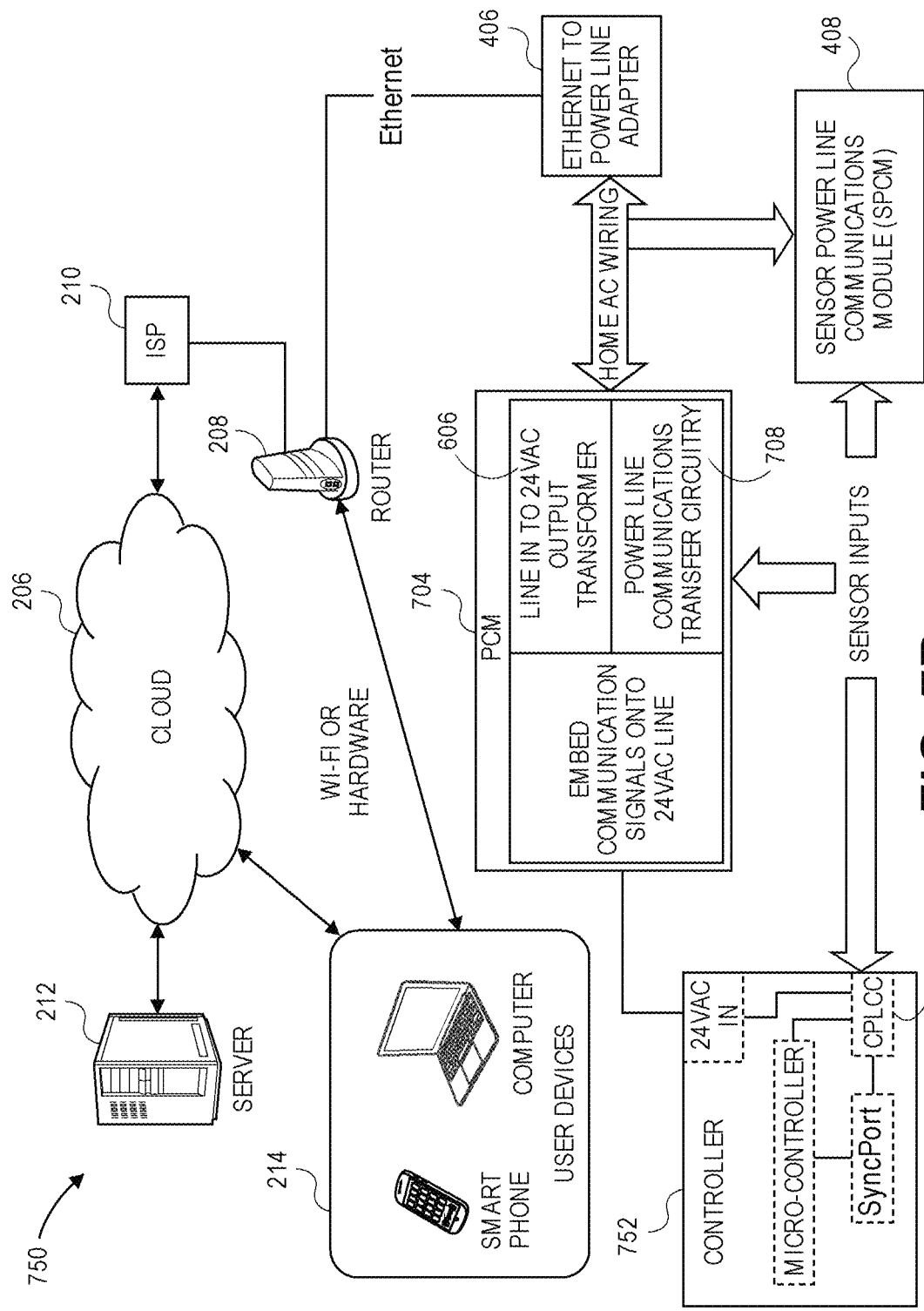

In the landscape systems 700, 750 illustrated in FIGS. 7A and 7B, respectively, communication signals are transferred from the incoming power line and embedded onto the 24 VAC signal. In an embodiment, the voltage of the incoming power line is reduced to approximately 24 VAC at the transformer 606. Communication signals on the incoming line voltage are embedded onto the 24 VAC signal after the transformer 606.

In an embodiment, the 24 VAC transformer 606 couples the carrier signal(s) and embedded data used by the power line communication system. If the transformer 606 comprises a high inductance, for example, it would represent a high impedance to the power line carrier, and it may be difficult for the transformer to drive the carrier onto the 24 VAC signal. In such a case, the power and communications module 704 further comprises power line communications transfer circuitry 708 to allow the carrier to by-pass the transformer 606.

In an embodiment, the power line communications transfer circuitry 708 comprises one or more capacitors linking the primary and secondary coils of the transformer 606. The CPLCC 706 extracts the carrier signal and decodes the embedded data from the 24 VAC signal or embeds the data on to carrier signal and inserts the carrier signal onto the 24 VAC signal while isolating the rest of the controller 702, 752 from the high frequency carrier.

If the controller load were, for example, capacitive, then it would likely attenuate the carrier signal to a level that would preclude communication. In an embodiment, an inductor between the output of the CPLCC 706 and the rest of the controller 702, 752 provides the isolation. The value of the inductor is selected so that it appears to be a virtual "open" circuit to the carrier frequency of the power line communication system.

In an embodiment, the 24 VAC signal, the CPLCC 706, the SyncPort™ and the microcontroller are electrically connected within the controller housing. In an embodiment, the CPLCC 706 communicates the decoded data from the 24 VAC signal to the controller 702, 752 via the SyncPort™. In other embodiments, the CPLCC 706 communicates the decoded data directly with the microcontroller without using the SyncPort™. In a further embodiment, the power and communications module 704 comprises an integral unit that plugs into a wall outlet. In a yet further embodiment, the power and communications module 704 comprises conduit with line voltage connected to the power and communications module 704 and attached to the controller 702, 752. In another embodiment, the power and communications module 704 comprises a stand-alone module located between the incoming power line voltage and the controller 702, 752.

The systems 700, 750 of FIGS. 7A and 7B, respectively, further include one or more sensor power line communications modules (SPCM) 408 as described above. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of a sensor power line communications module (SPCM) 408, the power and communication module 704, and the controller 702, 752.

Figure 8:
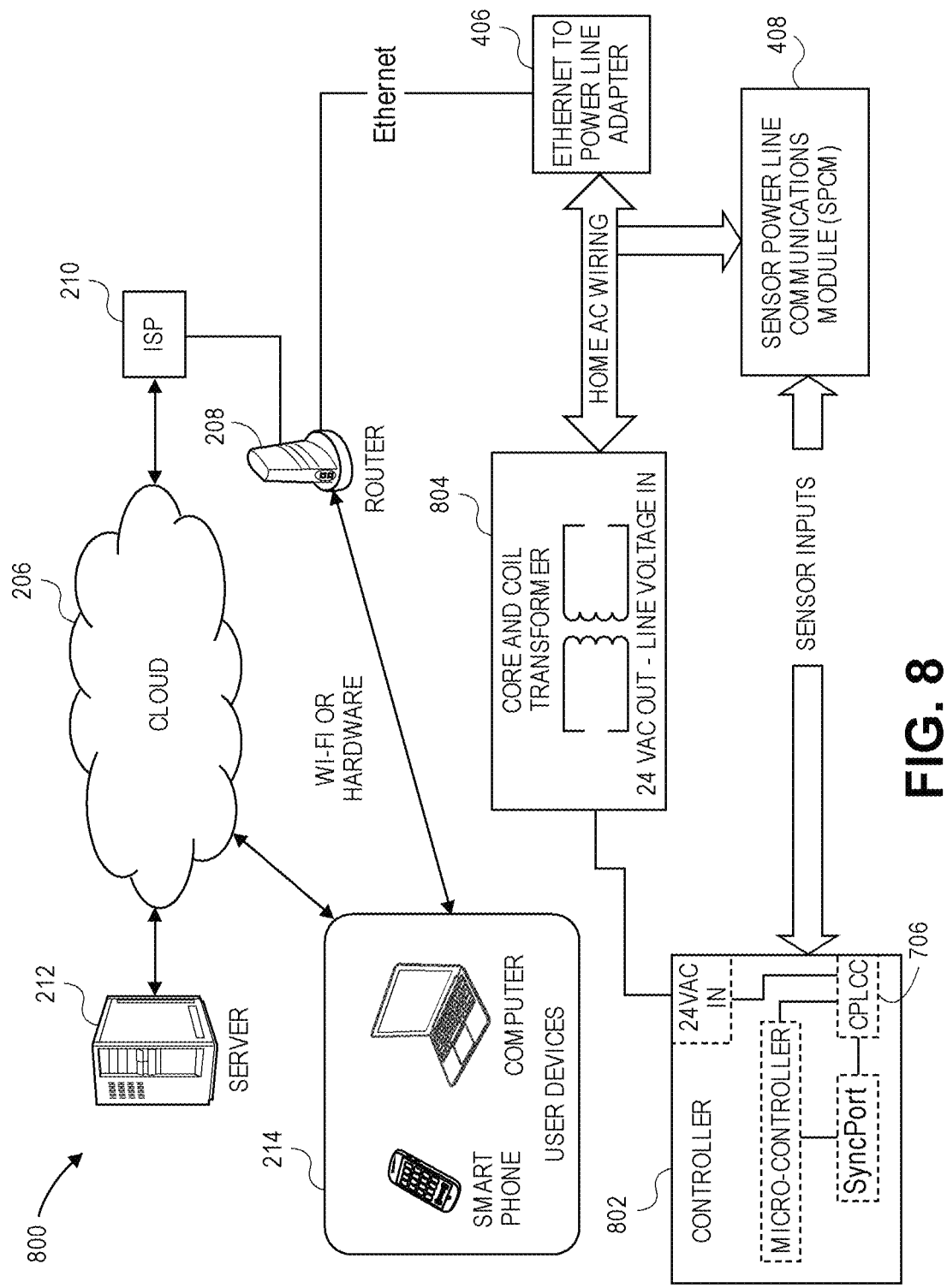
FIG. 8 illustrates another embodiment of a landscape system using power line communication to remotely control a landscape controller.

FIG. 8 illustrates another embodiment of a landscape system 800 using power line communication to remotely control a controller 802. The system 800 comprises the controller 802, a transformer 804, and the Ethernet to power line adapter 406. The controller 802 comprises a 24 VAC input, a processor or microcontroller, the SyncPort™, and the Communications Power Line Communication Circuitry (CPLCC) 706.

The transformer 804 comprises a core and coil transformer that receives line voltage and provides approximately 24 VAC. The controller 802 receives the 24 VAC signal from the transformer 804. Communications that are embedded in the incoming line voltage are transferred through the core and coil transformer. 24 VAC wiring connects to the controller 802 and the controller 802 receives the 24 VAC signal with the embedded communications.

In an embodiment, the CPLCC 706 is embedded into the controller 802. In another embodiment, the CPLCC 706 is attached to the controller 802 and connected to the SyncPort™ and to the 24 VAC input of the controller 802. In a further embodiment, the CPLCC 706 is mounted inside the controller 802. In another embodiment, the CPLCC 706 is mounted to the outside of the controller 802.

In an embodiment, the 24 VAC signal, the CPLCC 706, the SyncPort™ and the microcontroller are electrically connected within the controller housing. In an embodiment, the CPLCC 706 communicates the decoded data from the 24 VAC signal to the microcontroller via the SyncPort™. In other embodiments, the CPLCC 706 communicates directly with the microcontroller without using the SyncPort™. In an embodiment, the transformer 804 electrically connects to the 24 VAC input of the controller 802.

The system 800 further includes one or more sensor power line communications modules (SPCM) 408 as described above. The sensors comprise one or more of ET system, Solar Sync, rain, temperature, soil moisture, wind, humidity, or the like, in any combination. The sensors may be connected to one or more of a sensor power line communications module (SPCM) and the controller.

Figure 9:
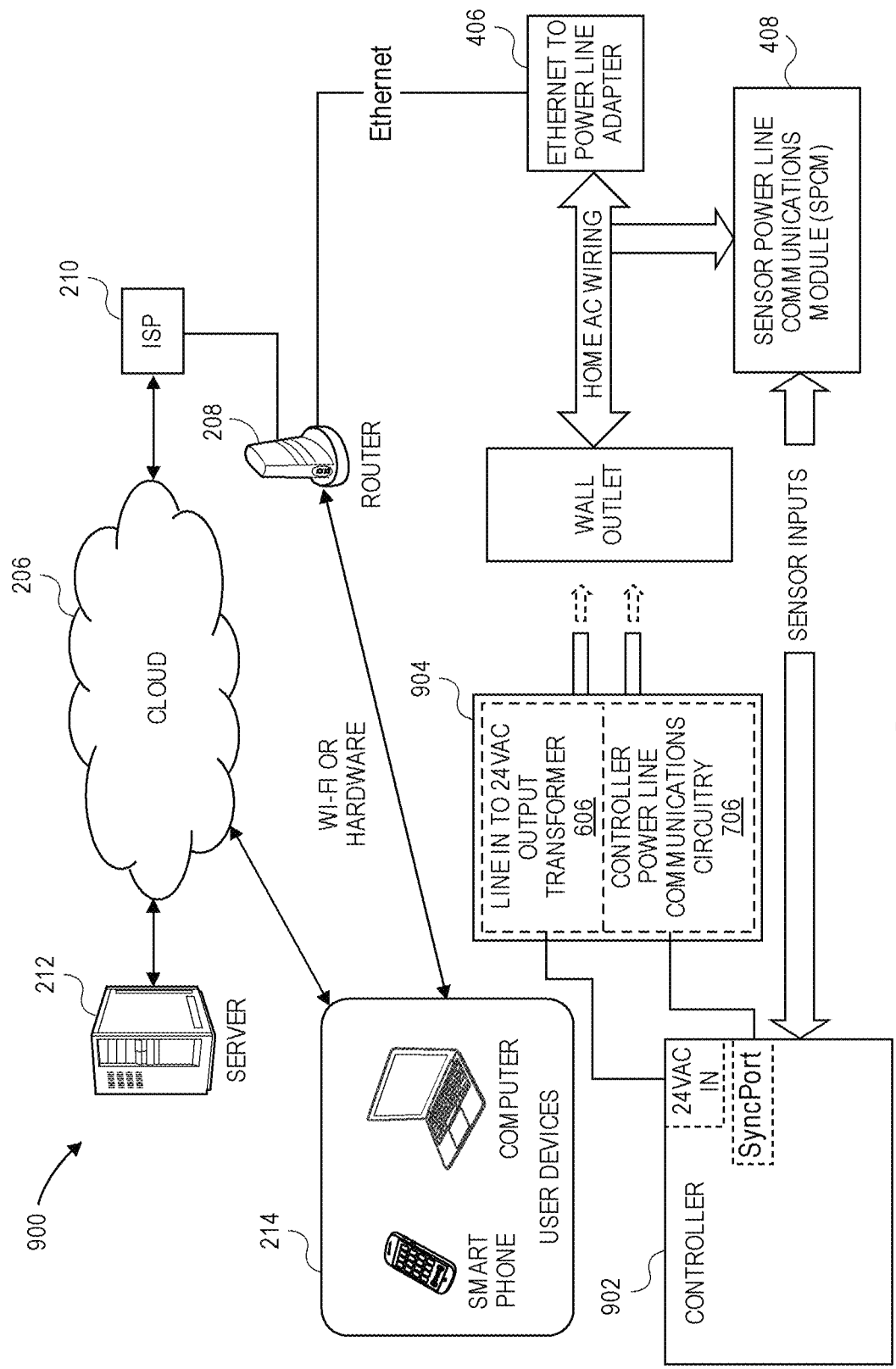
FIG. 9 illustrates another embodiment of a landscape system using power line communication to remotely control a landscape controller.

FIG. 9 illustrates another embodiment of a landscape system 900 using power line communication to remotely control a controller 902. The system 900 comprises the controller 902, a power puck 904, and the Ethernet to power line adapter 406. The controller 902 comprises a 24 VAC input, the SyncPort™. The power puck 804 comprises a line-in-to-24 VAC output transformer 606 and the Controller Power Line Communications Circuitry (CPLCC) 706 and is configured to plug into a line voltage wall outlet. In an embodiment, the power puck 904 electrically connects to the line voltage in proximity to the controller 902. The power line in to 24 VAC output transformer 606 electrically couples to the 24 VAC input and the CPLCC 706 electrically couples to the SyncPort™.

Incoming line voltage is received at the power puck 904, converted to 24 VAC by the line-in-to-24 VAC output transformer 606 and routed to the controller 902. In an embodiment, the line-in-to-24 VAC output transformer 606 comprises a core and coil transformer. The CPLCC 706 comprises an embodiment of the PLCC and is electrically coupled to the SyncPort™. In an embodiment, the power puck 904 further comprises an embedded cable, embedded cables, or one or more connectors with one or more separate cables that connect the power puck 904 to the controller 902. In another embodiment, the power puck 904 further comprises an embedded power cord for transmission of the 24 VAC and a plug to connect to a communications cable that attaches to the SyncPort™.

The system 900 further includes one or more sensor power line communications modules (SPCM) 408 as described above. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of a sensor power line communications module (SPCM) and the controller.

Figure 10:
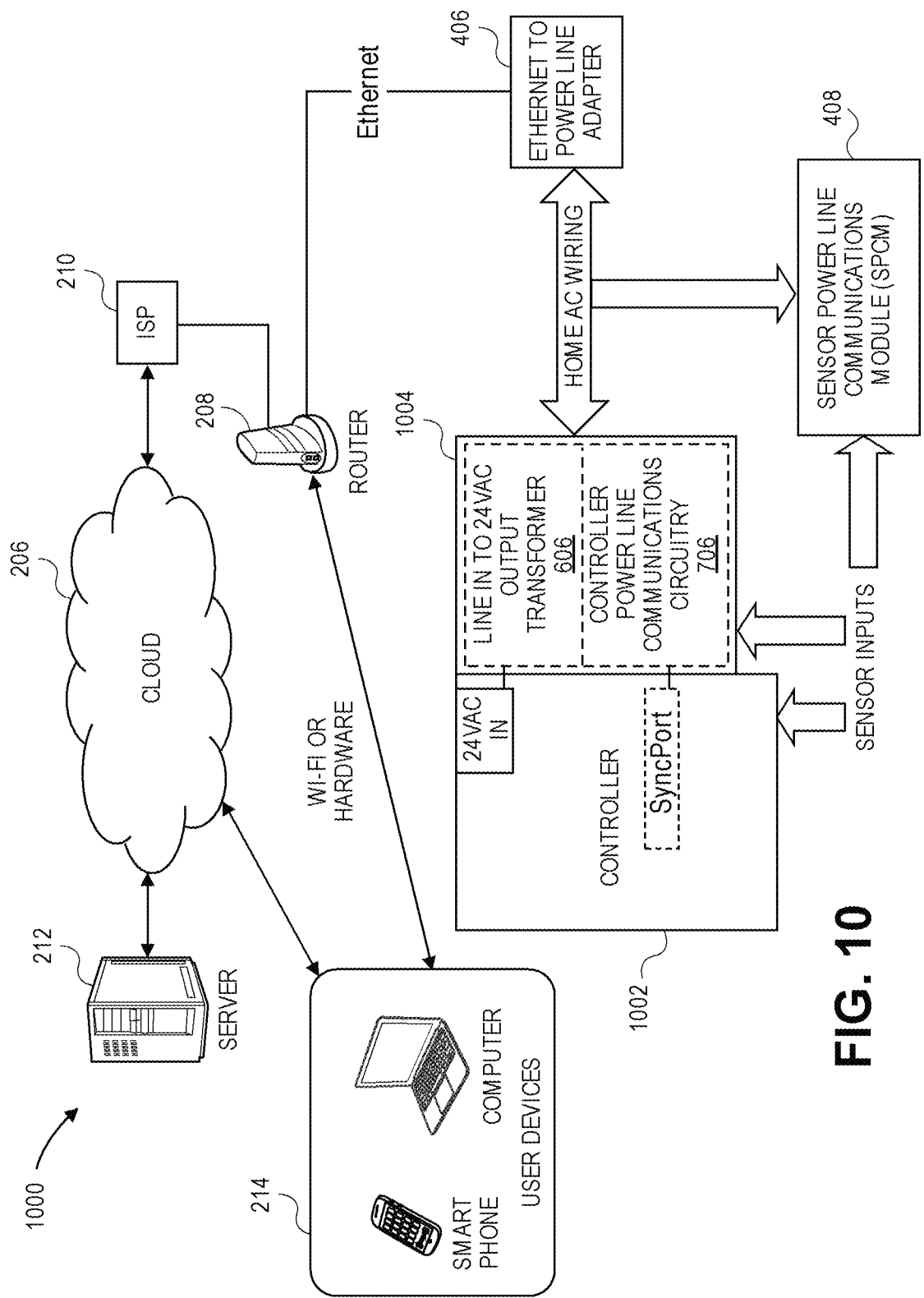
FIG. 10 illustrates another embodiment of a landscape system using power line communication to remotely control a landscape controller.

FIG. 10 illustrates another embodiment of a landscape system 1000 using power line communication to remotely control a controller 1002. The system 1000 comprises the controller 1002, a power box 1004, and the Ethernet to power line adapter 406. The controller 1002 comprises a 24 VAC input, and the SyncPort™. The power box 1004 comprises a line-in-to-24 VAC output transformer 606 and the Controller Power Line Communications Circuitry (CPLCC) 706. In an embodiment, the line-in-to-24 VAC output transformer 606 comprises an incoming 120/208/230 VAC to 24 VAC core and coil transformer. The Controller Power Line Communications Circuitry (CPLCC) 706 comprises an embodiment of the PLCC 500 and is electrically coupled to the SyncPort™. The line-in-to-24 VAC output transformer 606 electrically couples to the 24 VAC input and the CPLCC 706 electrically couples to the SyncPort™. In an embodiment, the power box 1004 electrically connects to the line voltage and is configured for indoor or outdoor use.

In an embodiment, the power box 1004 comprises an embedded cable, embedded cables, or one or more connectors with one or more separate cables that connect the power box 1004 to the controller 1002. In another embodiment, the power box 1004 is configured to be approximately water tight to protect the wiring and circuitry when it is mounted to a controller that is installed outdoors.

The system 1000 further includes one or more sensor power line communications modules (SPCM) 408 as described above. The sensors comprise one or more of an ET system, a Solar Sync system, rain sensors, temperature sensors, soil moisture sensors, wind sensors, humidity sensors, ambient light sensors, or the like, in any combination. The sensors may be connected to one or more of a sensor power line communications module (SPCM), the power box, and the controller.

Sensor Inputs

As described above, FIGS. 1, 3, 4, 6-10 illustrate sensor inputs. A variety of sensors can be connected to the systems 220, 300, 400, 600, 700, 750, 800, 900, 1000. The server 212 may provide sensor data to one or more of the irrigation controller, lighting controller, or landscape controller 202, 302, 402, 602, 702, 752, 802, 902, 1002, LAN module 200, CPCM 404, 604, 704, 904, 1004, SPCM 408, and Wi-Fi module 304. One or more of the irrigation controller, lighting controller, or landscape controller 202, 302, 402, 602, 702, 752, 802, 902, 1002, LAN module 200, CPCM 404, 604, 704, 904 1004, SPCM 408, and Wi-Fi module 304 may comprise the sensor inputs and provide the sensor data. Thus, any combination of the server 212, controller 202, 302, 402, 602, 702, 752, 802, 902, 1002, LAN module 200, CPCM 404, 604, 704, 904 1004, SPCM 408, and Wi-Fi module 304 can poll one another to acquire the sensor data as required to perform a given task.

User Displays

The user devices illustrated in the systems described herein comprise a display screen. The user devices permit the user to enter commands to the systems and receive data from the systems. FIGS. 11-18 comprise exemplary screen shots of some of the functionality that can be displayed to the user. In other embodiments, other functionalities can be displayed.

FIG. 11 is a screen shot 1100 illustrating an exemplary history log of the communications from the server. In an embodiment, this screen displays a history log of the communications that transpire from the server to the controller and modules at the irrigation/lighting/landscape site.

Figure 12:
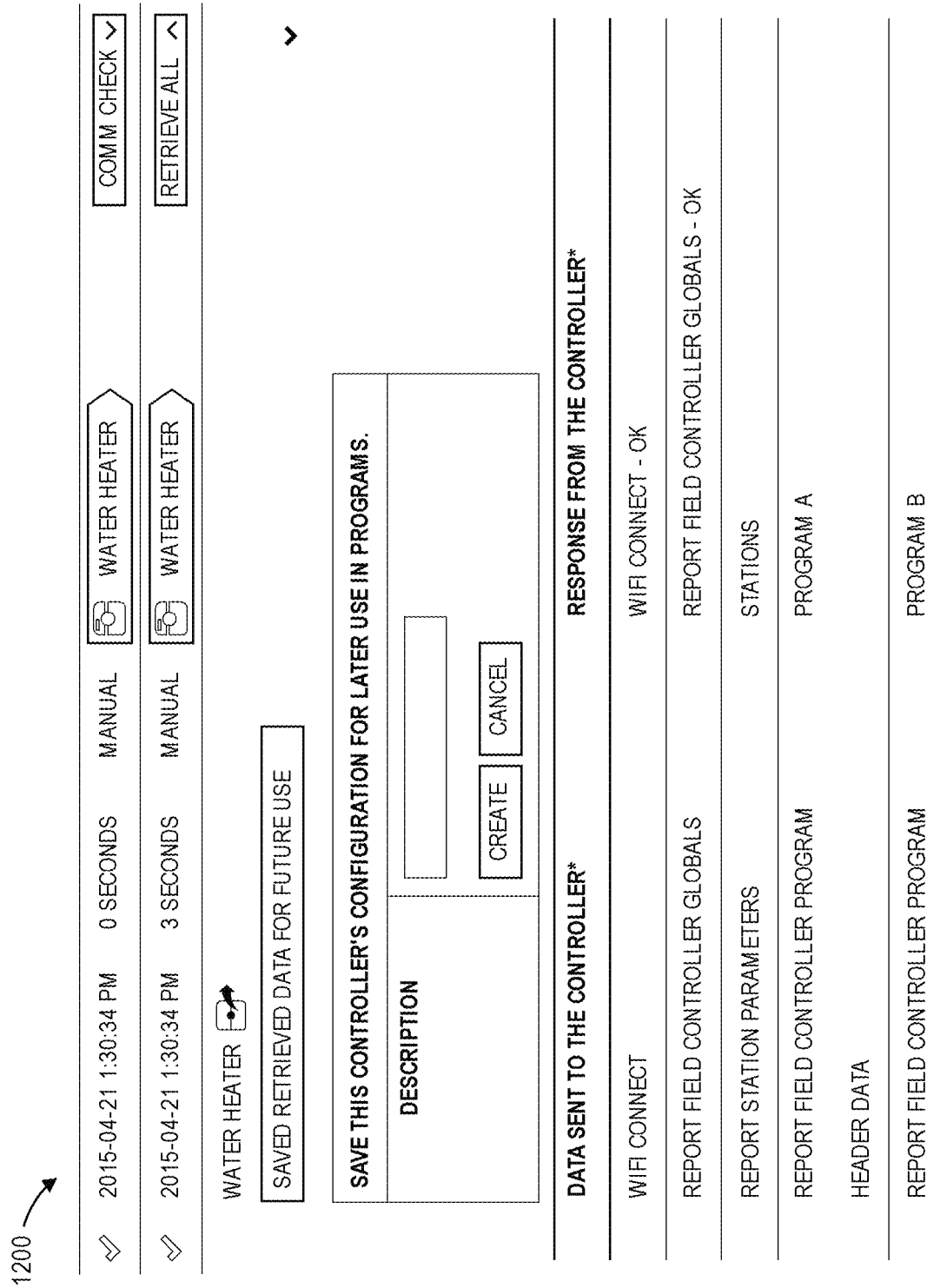
FIG. 12 is a screen shot illustrating irrigation programs stored at the server, according to certain embodiments.

FIG. 12 is an exemplary screen shot 1200 illustrating programs stored at the server. In an embodiment, one or more programs are uploaded to the server from a controller and stored in the server for later retrieval. In an embodiment, a program uploaded from a first controller can be downloaded to a second controller.

Figure 13:
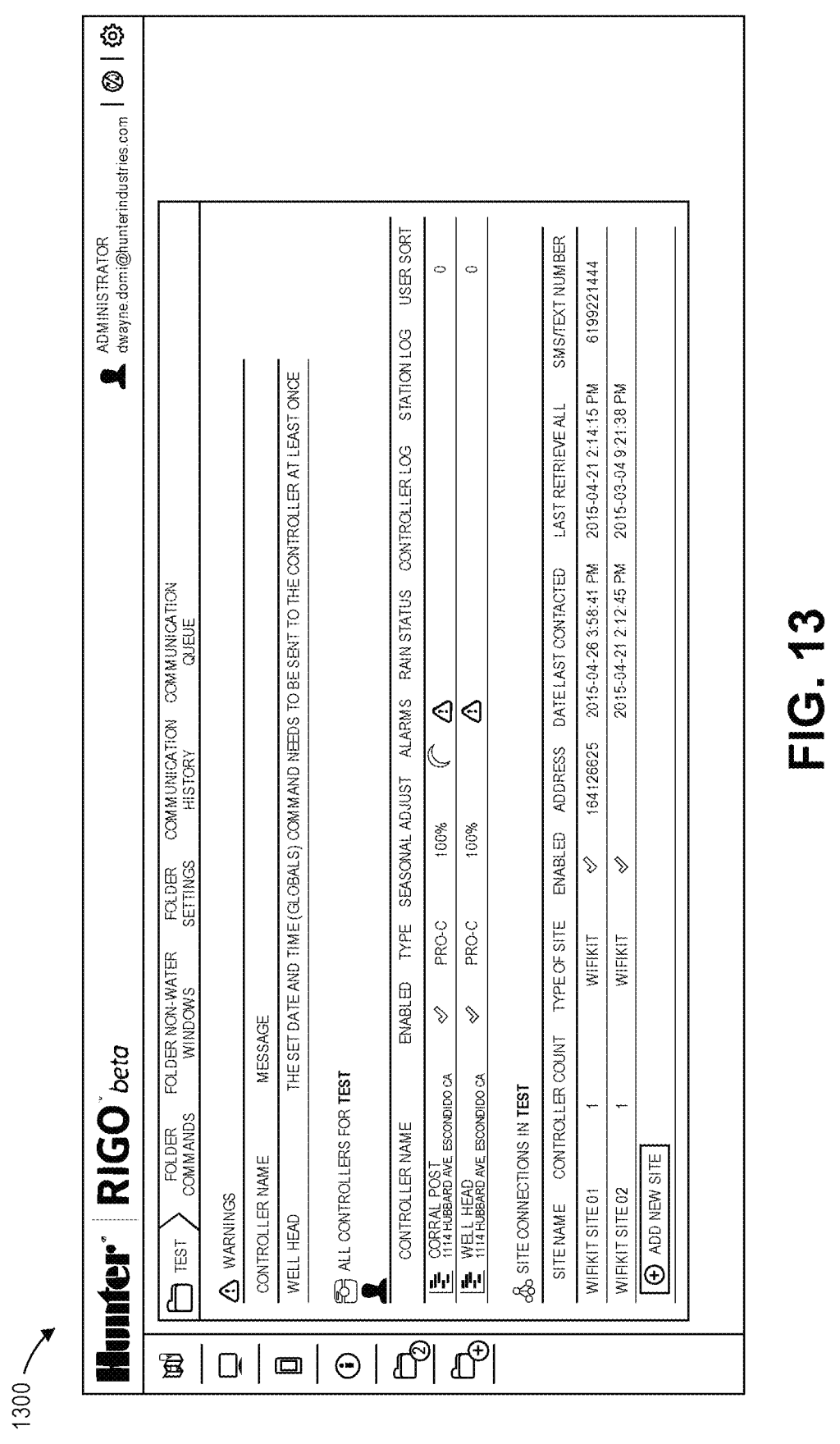

FIG. 13 is a screen shot 1300 illustrating an exemplary folder page. In an embodiment, the controllers are managed in a specific folder. For example, the folder may comprise one or more sites, a data collection for the one or more sites, or the like. The folder may comprise information associated with one or more controllers at a site, one or more controller at multiple sites, or the like.

Figure 14:
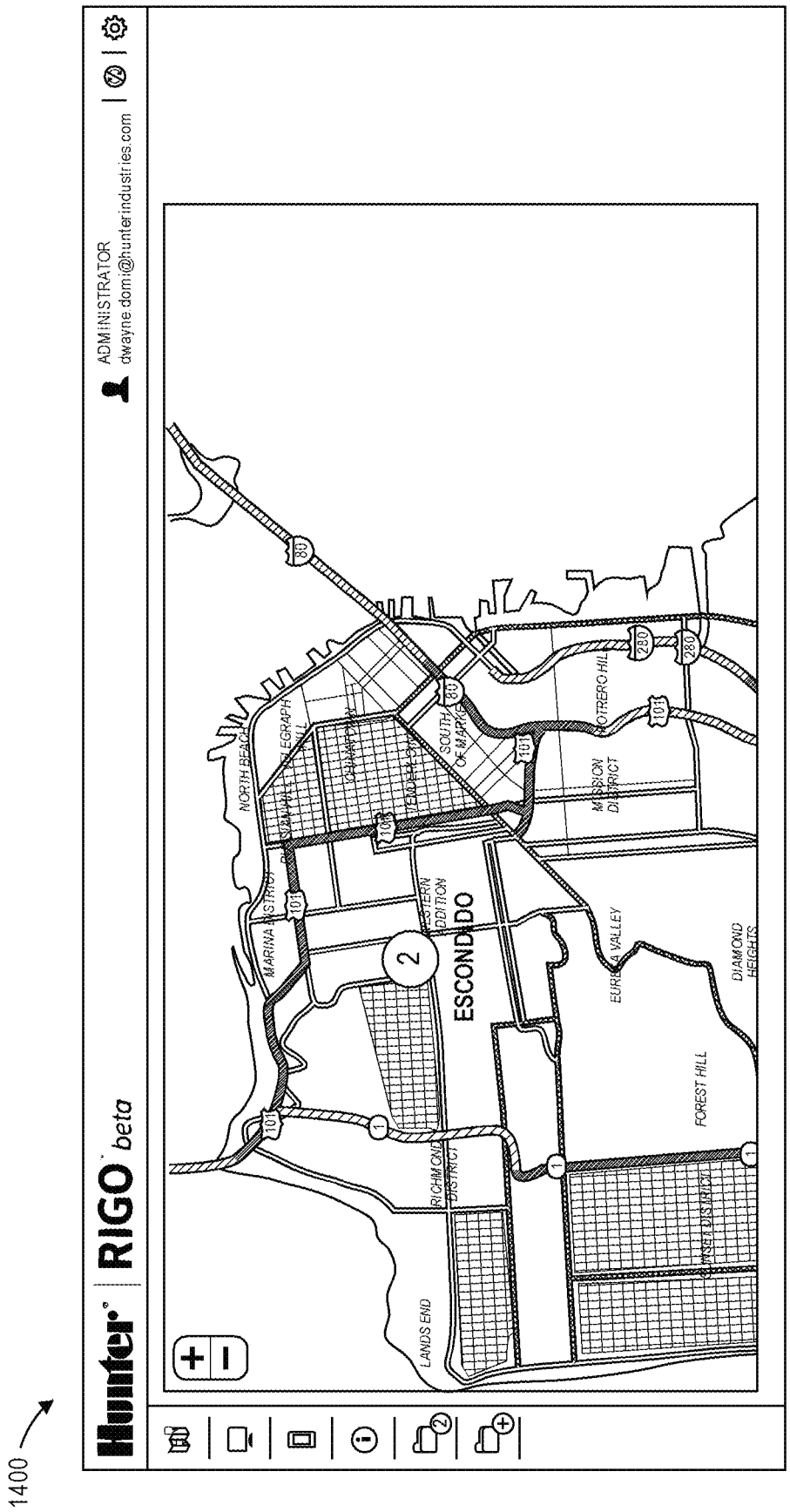
FIG. 14 is a screen shot illustrating the geographical location of the managed irrigation controller, according to certain embodiments.

FIG. 14 is an exemplary screen shot 1400 illustrating a map of the geographical location of the managed controllers. In an embodiment, the location map is interactive. For example, the user can zoom in to provide more detailed location placements of the controllers or the user can zoom out to provide fewer balloons with a number in each balloon indicating how many controllers are near the location of the balloon on the map. In another embodiment, when the user selects or clicks on a balloon, the program displays information associated with the selected site.

Figure 15:
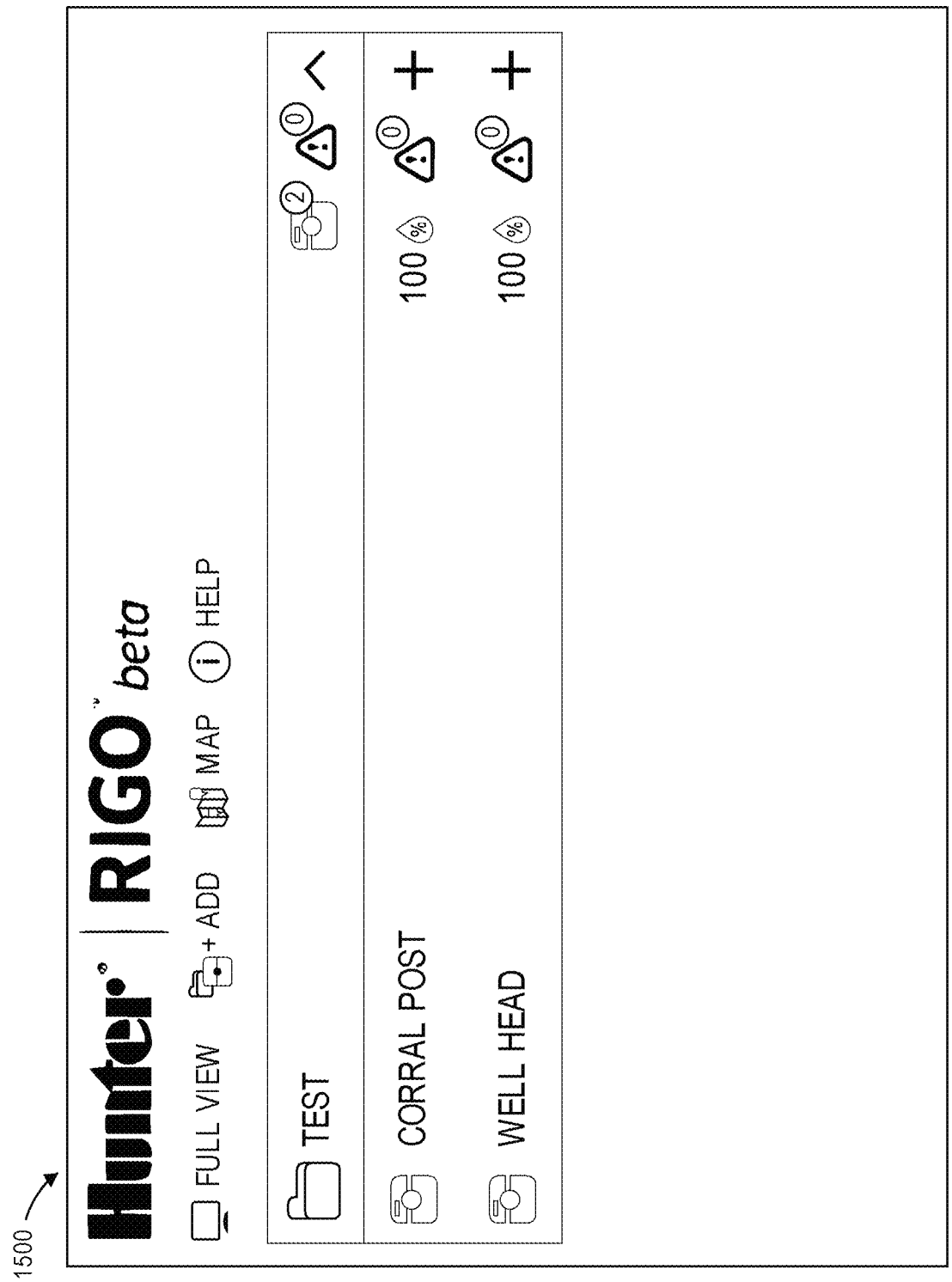
FIG. 15 is a mobile view screen illustrating the status of the managed controllers, according to certain embodiments.

FIG. 15 is an exemplary mobile view screen 1500 illustrating the status of the managed controllers.

Figure 16:
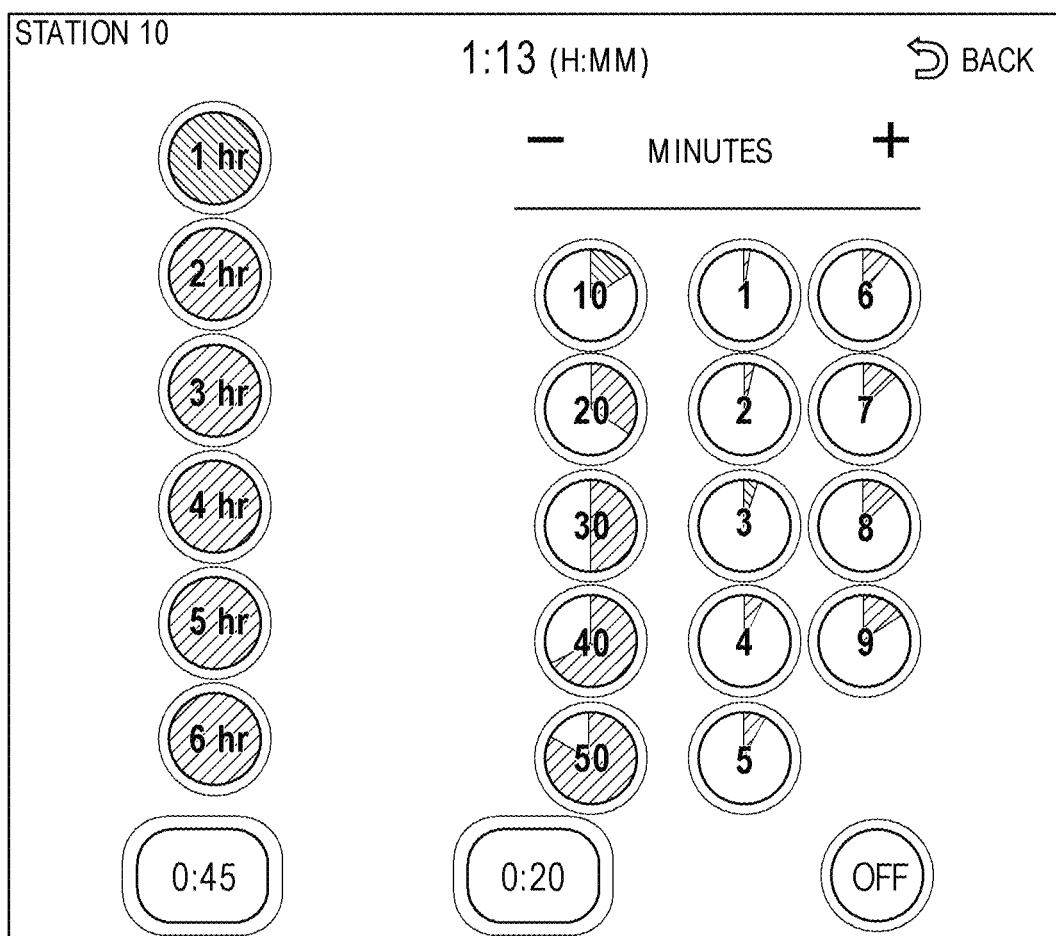
FIG. 16 is a mobile view screen illustrating the station scheduling of an irrigation controller, according to certain embodiments.

FIG. 16 is an exemplary mobile view screen 1600 illustrating station scheduling of an irrigation controller.

Figure 17:
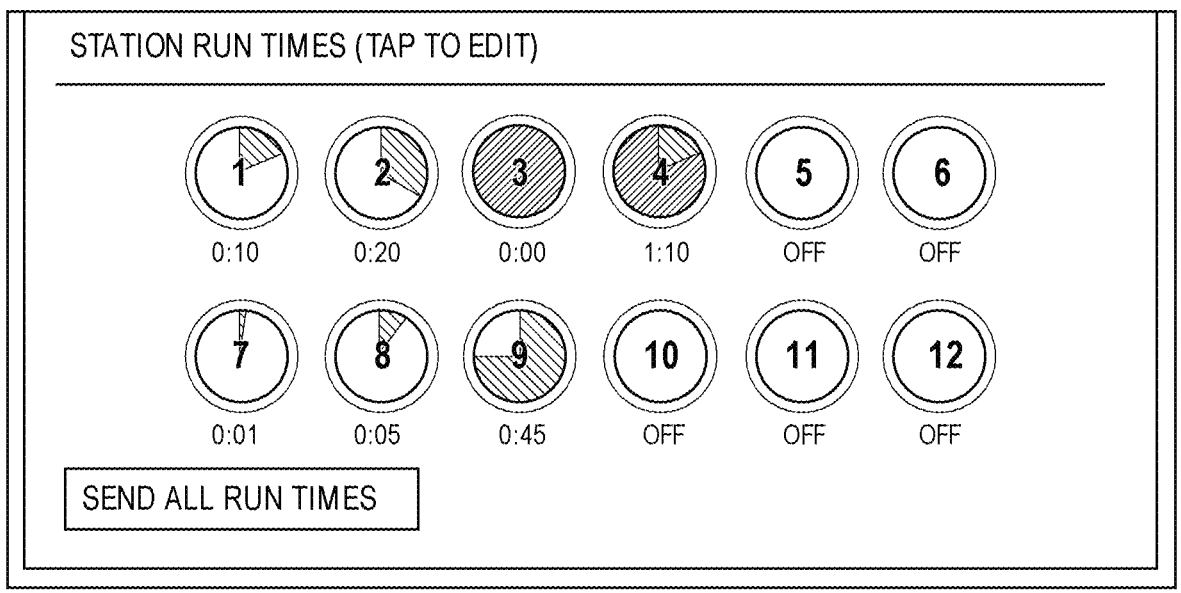
FIG. 17 is a mobile view screen illustrating an overview of station run times, according to certain embodiments.

FIG. 17 is an exemplary mobile view screen 1700 illustrating an overview of station run times. For example, the mobile view screen comprises graphics and text showing the programed run times of the irrigation stations associated with the managed irrigation controller. In an embodiment, the dial representing that station run time changes color at 1 hour of run time. In another embodiment, the dial changes to different colors for multiple hours of run time.

Figure 18:
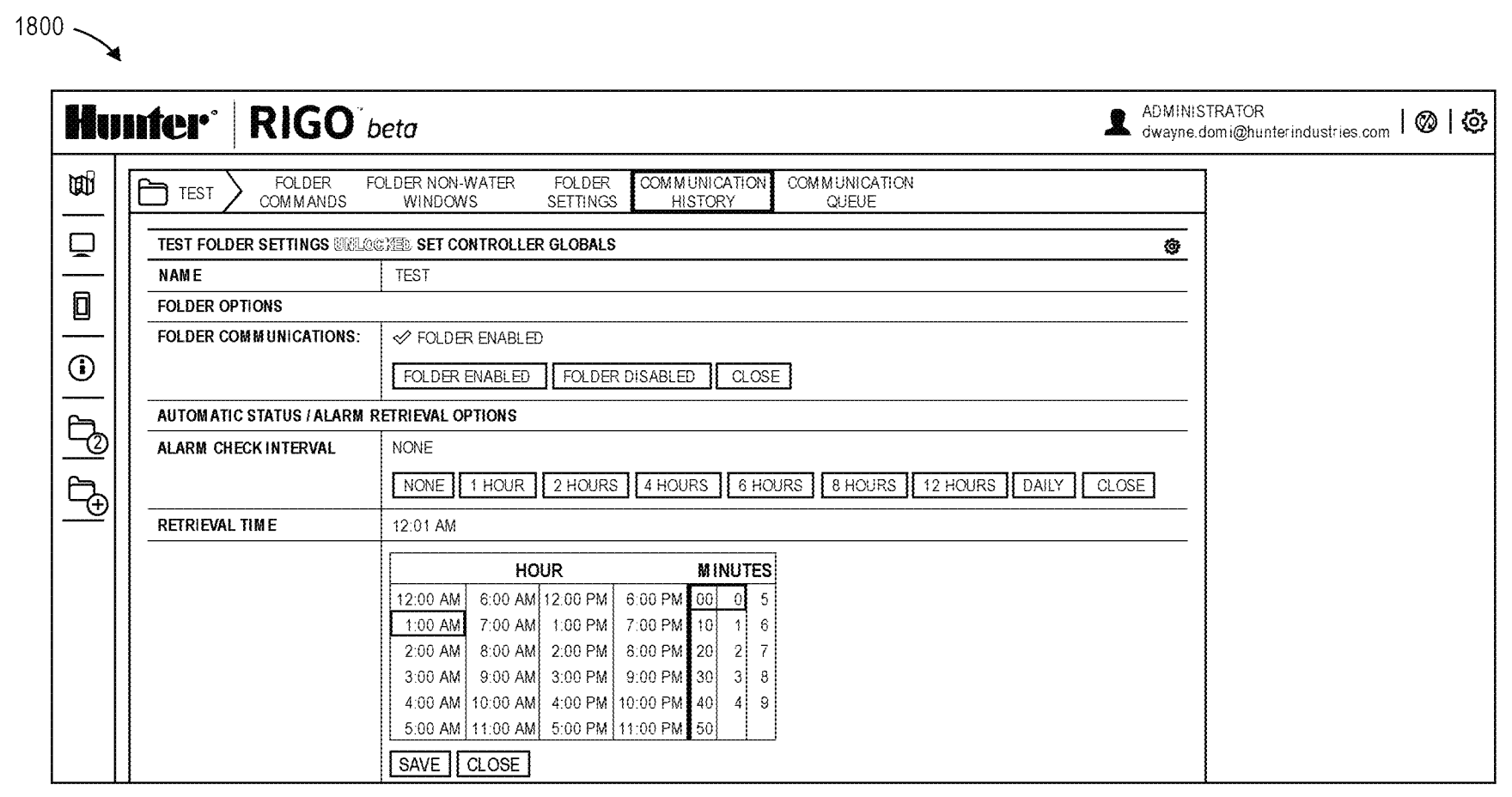

FIG. 18 is an exemplary screen shot 1800 illustrating a data collection page. In an embodiment, the user uses the data collection page to instruct the server to collect data from the controller hourly, daily, weekly, or the like.

Additional Embodiments

Figure 19:
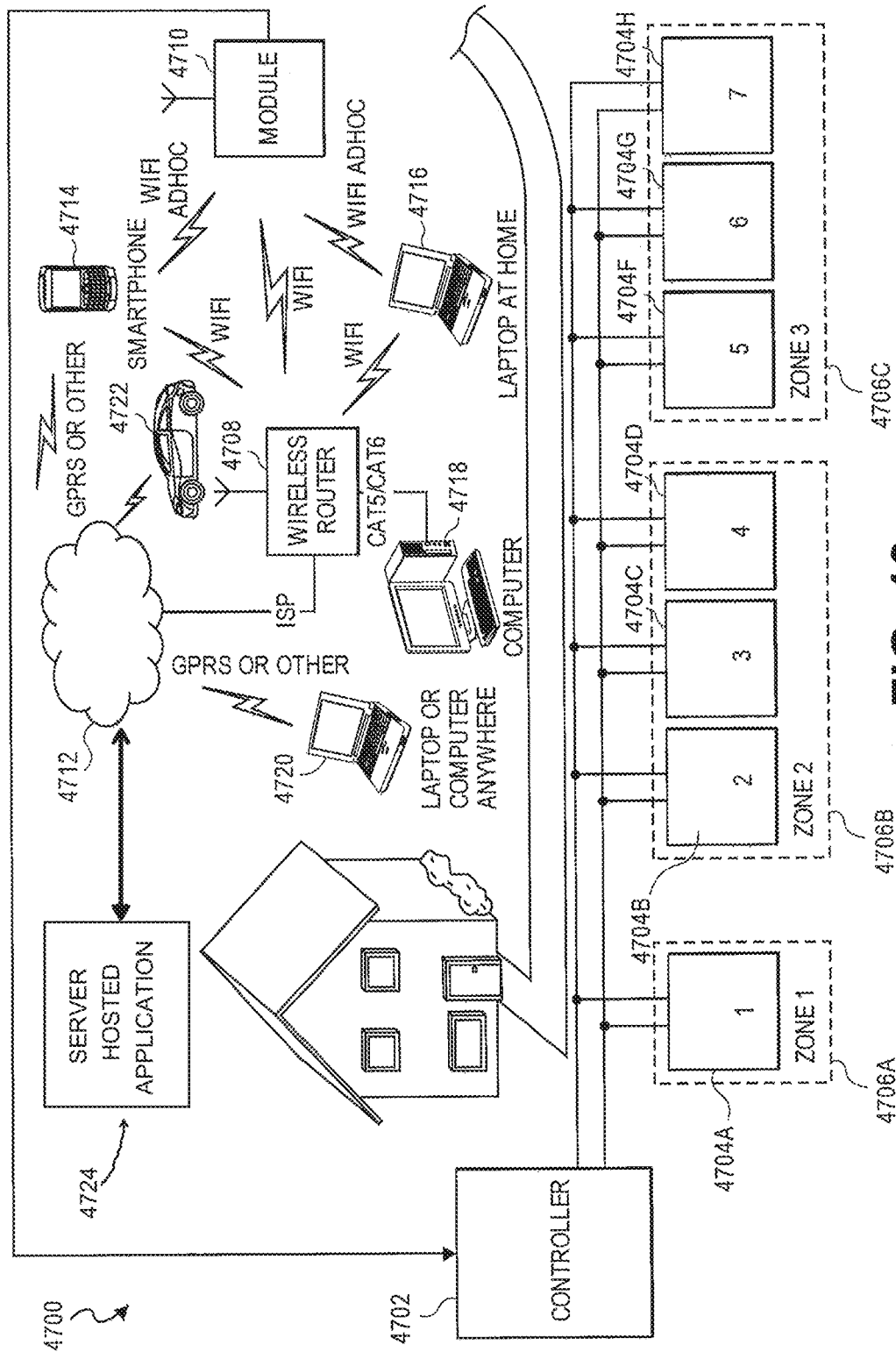
FIG. 19 illustrates an exemplary landscape system controlled remotely, according to certain embodiments.

FIG. 19 illustrates an exemplary landscape system 4700 controlled remotely, according to an embodiment. The system 4700 comprises a controller 4702, and a plurality of modules 4704 configured into a plurality of zones 4706. In the illustrated embodiment, zone 1 4706a comprises one module 4704a; zone 2 4706b comprises three modules 4704b, 4704c, 4704d, and zone 3 4706c comprises three modules 4704f, 4704g, 4704h. The controller 4702 comprises a power supply and an operator interface. The controller 4702 sends the data encoded power waveform to the plurality of modules 4704 on the two-wire path.

Figure 39:
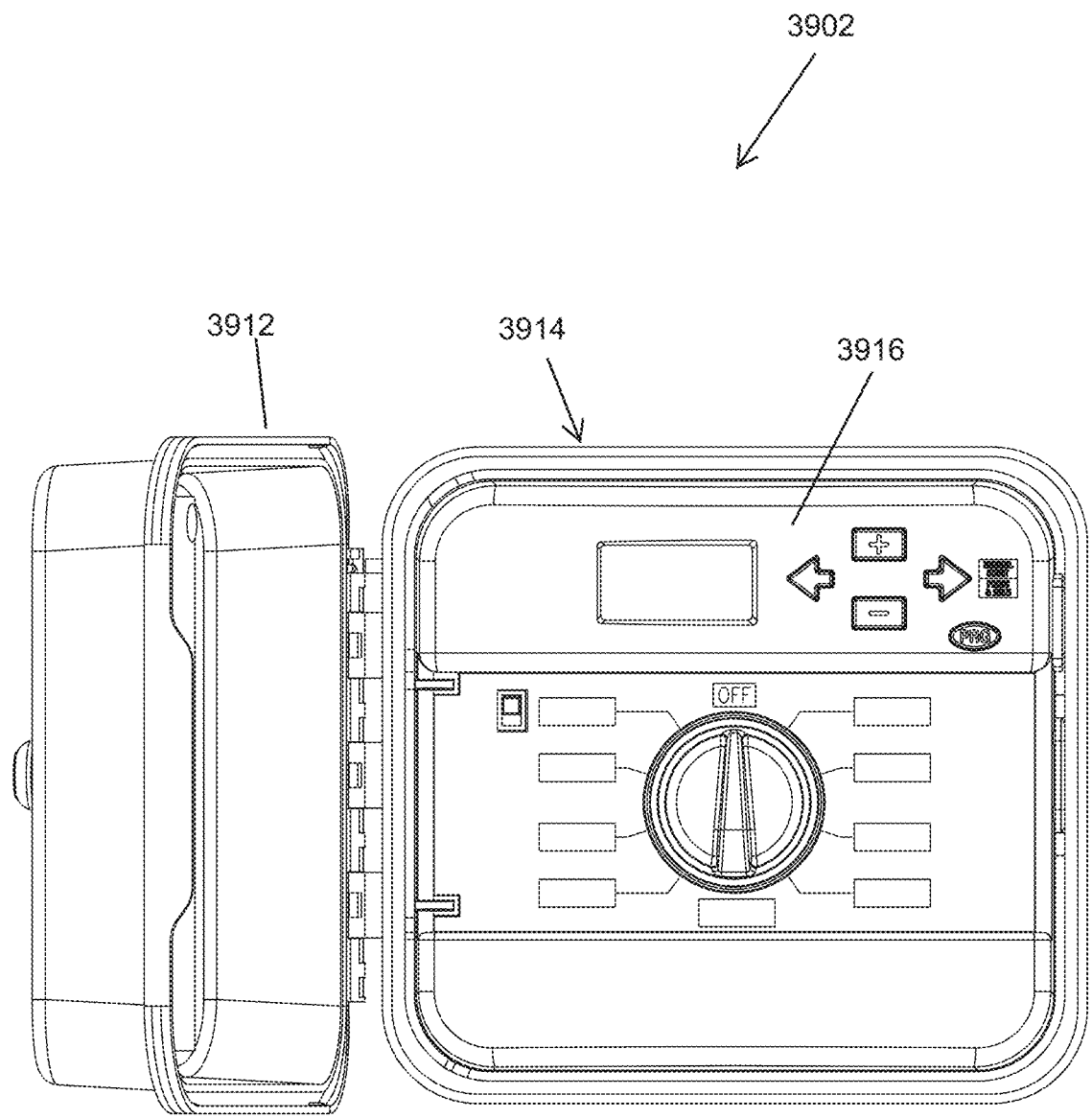
FIG. 39 illustrates an irrigation controller with its front door open to reveal its removable face plate, according to certain embodiments.
Figure 40:
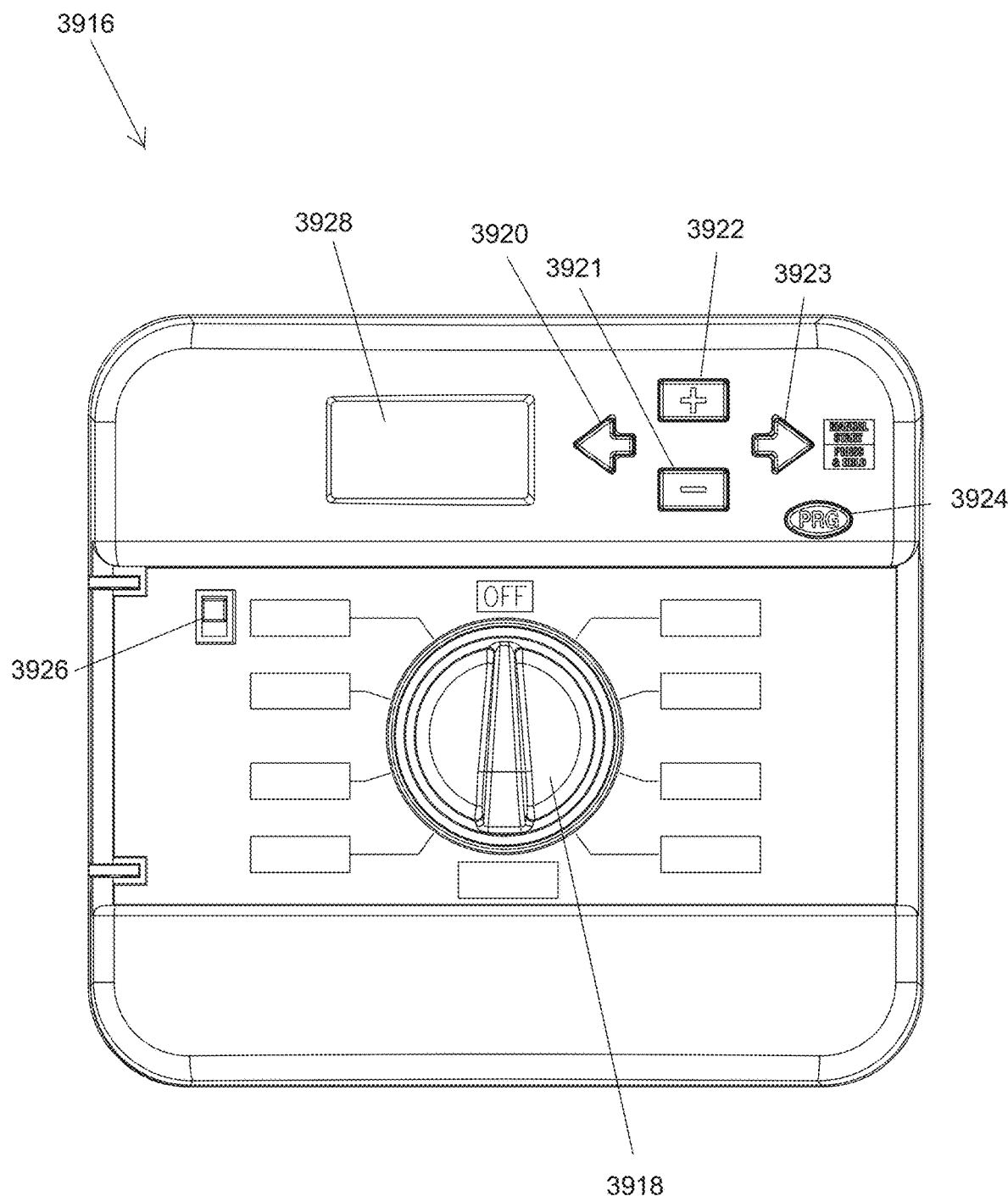
FIG. 40 is an enlarged plan view of the removable face plate of the irrigation controller of FIG. 39.
Figure 41:
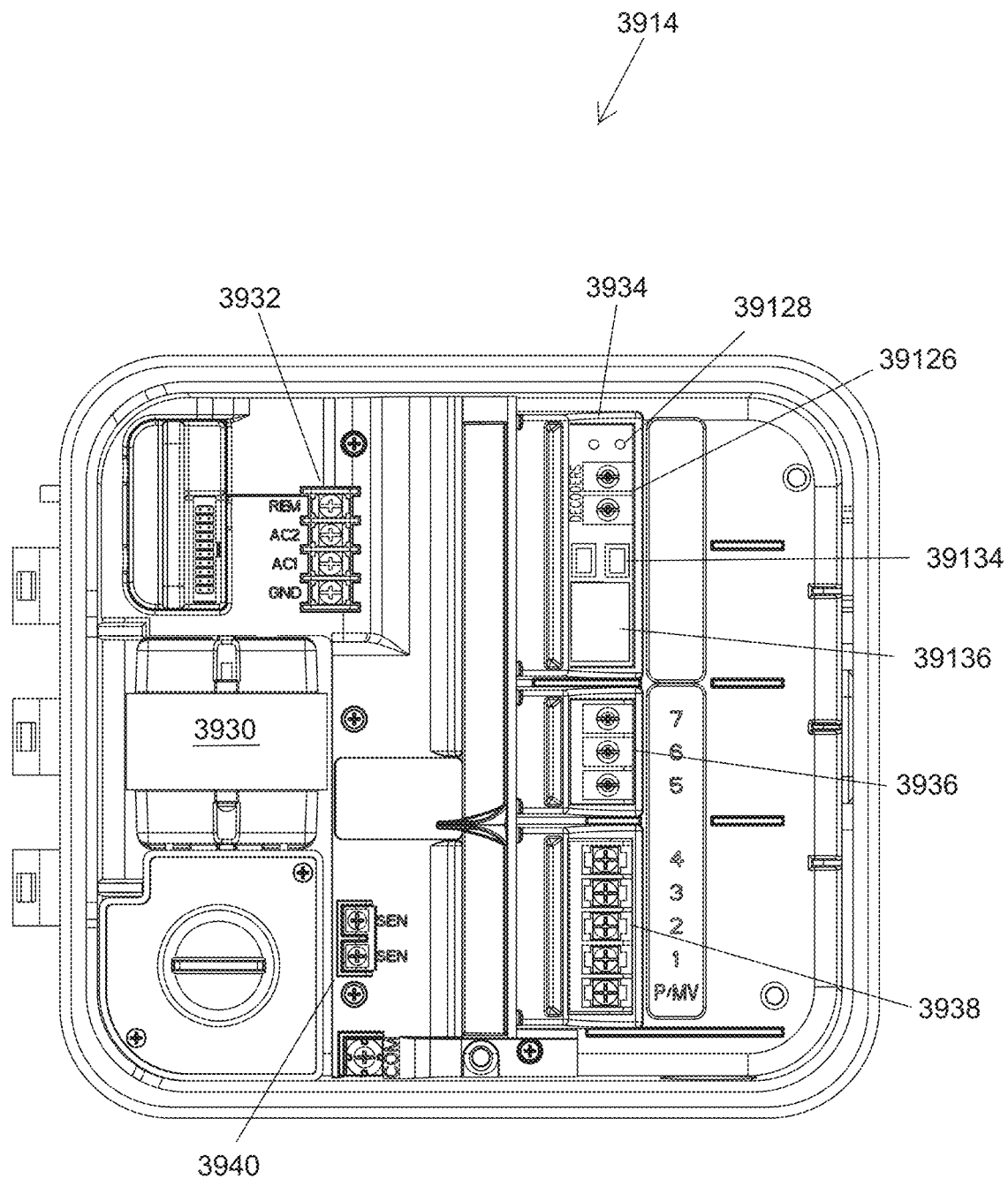
FIG. 41 is an enlarged plan view irrigation controller of FIG. 39 illustrating the components that are mounted in the back panel, which are accessible after the face plate has been removed.

In an embodiment, the controller 4702 comprises an irrigation controller, such as the irrigation controller illustrated in FIGS. 39-41, and the plurality of modules 4704 comprises a plurality of irrigation valves. In another embodiment, the controller 4702 comprises a lighting controller and the plurality of modules 4704 comprises a plurality of lighting fixtures. In a further embodiment, the controller 4702 comprises a landscape controller configured to control sprinkler valves and lighting fixtures and the plurality of modules 4704 comprise one or more sprinkler valves and/or one or more lighting fixtures.

In some embodiments, the system 4700 can further comprise a wireless module 4710, which electrically couples, via wire or other mediums, to the controller 4702. The wireless module 4710 communicates wirelessly to devices, such as a smartphone 4714, a laptop computer 4716, and other devices that have WiFi™ connection capability using a peer-to-peer communication mode such as ad hoc. In this communication mode, custom software, firmware, applications, programs, or the like, are written for both the wireless module 4710 and the communicating device 4714, 4716. In an embodiment, this proprietary communication approach is not constrained by conventional standards, such as the 802.11 standard and its versions, for example. In some embodiments, the controller 4702 receives one or more of user input from the operator interface located on a user-accessible location of the controller 4702 and user input via the module 4710.

The user can send commands from the smart phone 4714, the laptop computer 4716, or other communicating devices within the range of the wireless module 4710 to remotely control the system 4700. For example, the user can send commands to turn ON/OFF, adjust the irrigation schedule, adjust the run time, adjust the irrigation days of the week, adjust the lighting schedule, control the brightness, control the color and hue, and the like for the system 4700, a zone 4706, or a specific module 4704 from the remote device 4714, 4716. In an embodiment, the user views the web page being served by the wireless module 4710 by, for example, opening up the Internet Explorer® or other web browser on the smartphone 4714 or the laptop 4716. The user then interacts with the web page to control the system 4700. In another embodiment, the web page is served from the computer in the controller 4702, and the wireless module 4710 provides the RF connectivity.

The wireless module 4710 wirelessly receives the commands using the ad hoc or other peer to peer protocol, electrically converts the signal and sends the commands, via wire, to the controller 4702. In an embodiment, the module 4710 converts the signal to baseband. The controller 4702 receives the commands and sends the message to the addressed modules 4704 or the modules 4704 in the specified zones 4706 via the two-wire path.

In another embodiment, the system further comprises a wireless router 4708 and the wireless module 4710 is a WiFi™ enabled device. WiFi™ enabled wireless devices, such as laptops or computers 4716, 4720, smartphones 4714, WiFi™ enabled automobiles 4722, or the like, communicate with the router 4708 using a standard communication protocol, such as 802.11. In other embodiments, a device, such as a computer 4718 is electrically connected, via wire or a cable, to the router 4708. The user uses the devices 4714, 4716, 4718, 4720, 4722 to send commands to the system 4700. The devices 4714, 4716, 4718, 4720, 4722 send the commands through the router 4708 using a standard router protocol. The router 4708 connects to the World Wide Web 4712 using an Internet Service Provider (ISP) and an Internet connection. In another embodiment, a web-based application 4724 is hosted on a server on the World Wide Web 4712. In an embodiment, this application 4724 is larger/more complex than could be stored in the controller 4702 or the module 4710. The user interacts with this webpage 4724 using devices comprising a web browser and the application 4724 communicates with the controller 4702. In another embodiment, the smartphone 4714 communicates through the Internet using a general packet radio service (GPRS) protocol.

In one embodiment, the wireless module 4710 comprises the router 4708. In another embodiment, the controller 4702 comprises the router 4708.

The devices 4714, 4716, 4718, 4720, 4722 access the WiFi™ enabled wireless module 4710 through its Internet Protocol (IP) address. The module 4710 sends the commands to the controller 4702, where the controller 4702 sends the command to the modules 4704 through the two-wire path. In this manner, a user can access the system 4700 from anywhere there is an Internet connection.

In a further embodiment, the module 4710 comprises an Ethernet module for communication using an Ethernet protocol via an Ethernet cable between the controller 4702 and the router 4708 and/or between two controllers 4702.

Figure 20:
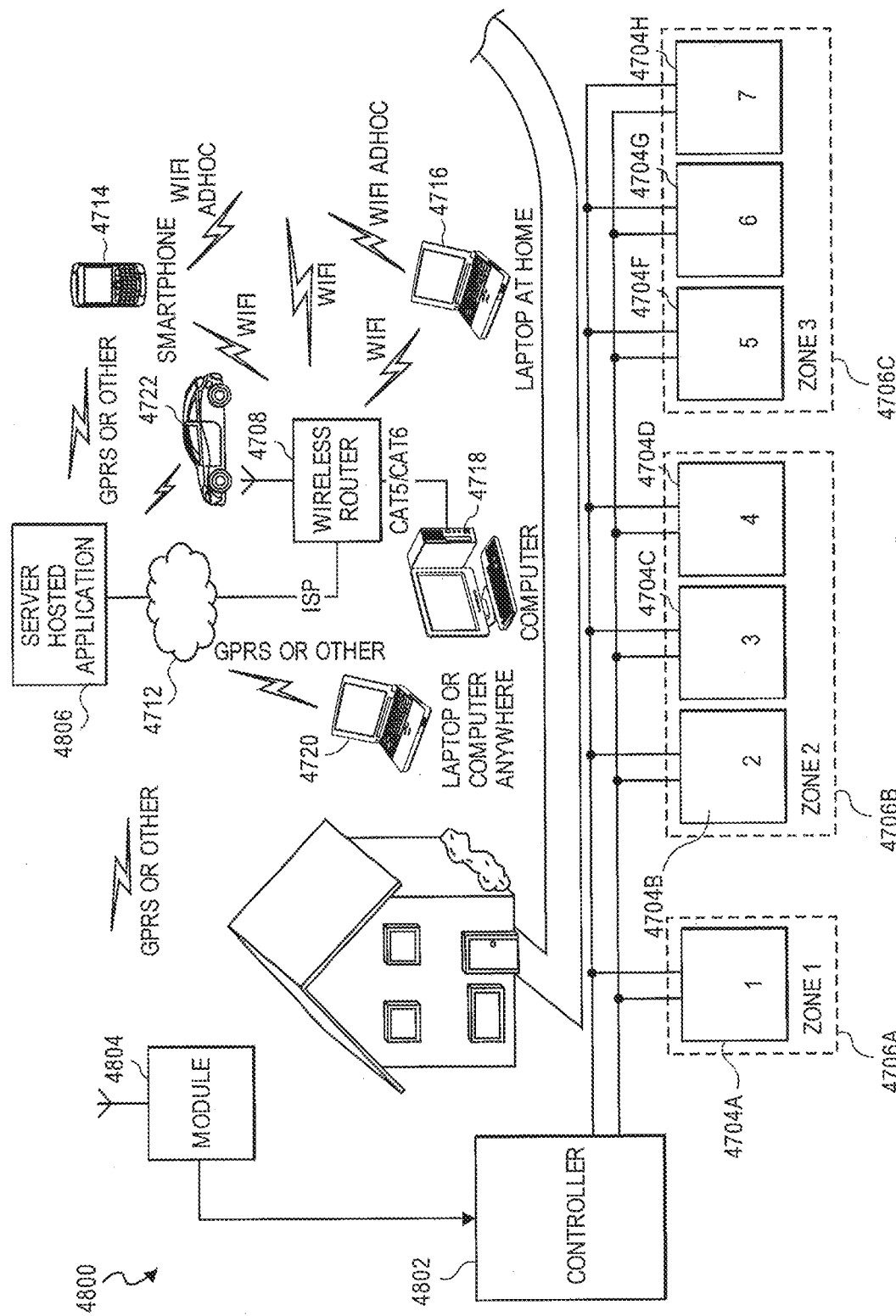
FIG. 20 illustrates an exemplary landscape system, controlled remotely, according to certain embodiments.

FIG. 20 illustrates another exemplary landscape system 4800 controlled remotely. The system 4800 comprises the plurality of modules 4704 configured in the one or more zones 4706 and the controller 4802. The controller 4802 sends the data encoded power waveform to the plurality of modules 4704 over the two-wire path.

In an embodiment, the controller 4802 comprises an irrigation controller, such as the irrigation controller illustrated in FIGS. 39-41, and the plurality of modules 4804 comprises a plurality of decoders connected to irrigation valves. In another embodiment, the controller 4802 comprises a lighting controller and the plurality of modules 4804 comprises a plurality of lighting fixtures. In a further embodiment, the controller 4802 comprises a landscape controller configured to control sprinkler valves and lighting fixtures and the plurality of modules 4804 comprise one or more decoders connected to sprinkler valves and/or one or more lighting fixtures.

In some embodiments, the system 4800 can further comprise a mobile carrier network module 4804, which electrically couples, via wire or other mediums, to the controller 4802. The module 4804 communicates to the World Wide Web (WWW) 4712 via a mobile carrier's network. Depending on the location and carrier, various standards, such as GPRS, GSM, and CDMA, and the like may apply. A suitable GPRS and GSM module, for example, is model number MTSMC-G-F4 available from Multitech Systems Inc. and the like. A suitable CDMA module, for example, is model MTSMC-C1-IP-N3 available from Multitech Systems Inc. In some embodiments, the controller 4802 receives one or more of user input from the operator interface located on a user-accessible location of the controller 4802 and user input via the module 4804.

The controller 4802 can be accessed by devices, such as laptops or computers 4720, smartphones 4714, web-enabled automobiles 4722, or the like, in communication with the WWW 4712 from any location. Further, the controller 4802 can be accessed by a wireless router 4708 in communication with the WWW 4712 via an Internet service provider (ISP). Local devices, such as laptops or computers 4716, typically in proximity to the wireless router 4708 and typically communicating with the router 2708 using a standard communication protocol, such as 802.11, can also access the controller 4802. In other embodiments, a device, such as the computer 4718 is electrically connected, via wire or a cable, to the router 4708. In one embodiment, the controller 4802 comprises the router 4708.

The user uses the devices 4714, 4716, 4718, 4720, 4722 to send commands to the system 4800. In a first embodiment, firmware either inside the controller 4802 or in the module 4804 serves up a webpage. As long as the module 4804 can be found on the World Wide Web 4712, that webpage could be accessed by devices with a web browser, thus allowing control of the controller 4802. This is similar to the control provided by the WI-FI module 4710 discussed herein with respect to FIG. 19.

In another embodiment, an application is provided for application-enabled devices, such as the control devices 4714, 4716, 4718, 4720, 4722. The user interacts with the application, and the application communications with the module 4804 via the World Wide Web 4712. In an embodiment, the application is written for various platforms, such as iPhone, Android, or the like.

In another embodiment, a web-based application 4806 is hosted on a server on the World Wide Web 4712. In an embodiment, this application 4806 is larger/more complex than could be stored in the controller 4802 or the module 4804. The user interacts with this webpage 4806 using devices comprising a web browser and the application 4806 communicates with the controller 4802.

There are some practical considerations when using mobile carrier networks. Most mobile carriers actually have far fewer IP addresses than they do subscribers. This is because at any given point in time, only a fraction of the subscribers is interacting with the web. Therefore, after some time of inactivity, a mobile device will typically lose its IP address. If the mobile device goes online again, the network will issue a new (different) IP address. Furthermore, many times the IP addresses used by mobile carriers are private, not public, meaning they cannot be reached using the World Wide Web 4712. The significance of this is that if a user wants to connect with a device on a carrier's network, they must know the IP address of that device.

Understanding that people desire to use their networks to communicate with and to control devices, most carriers have workarounds for this problem. For instance, they often allow companies to set up special servers that have access to the private IP address of the devices they sell. This sort of "proxy" server would itself have a fixed IP address and would be easily accessible from anyone on the WWW 4712. The server would use an authentication technique or password to allow a user in communication with it, to access only those remote (private IP) nodes associated with the users account. In a sense, the server is a "conduit" to reach the private IP device.

This approach may be combined with any of the embodiments described above. For some embodiments, the server may be the same device that hosts the application 4806.

Decoder Systems and Methods for Irrigation Control

General Description of Decoder Systems

In an embodiment, an irrigation system comprises an Internet connected controller, such as any of the controllers 202, 302, 402, 602, 702, 752, 802, 902, 1002. The controller comprises an encoder that receives a power signal and command and message data from the controller. The encoder encodes the command and message data onto the power signal to provide a data encoded power signal that is sent over a two-wire path. The irrigation system further comprises one or more decoders in communication with the two-wire path to receive the data encoded power signal and one or more irrigation valves in communication with the one or more decoders. In an embodiment, one or more of the decoders and the irrigation valves are addressable. The data encoded power signal provides power to the decoders. The decoders decode the command and message data from the data encoded power signal and control the irrigation valves according to the decoded command and message data.

In an embodiment, decoder systems provide a way to control multiple irrigation valves from a single pair of wires. This is cost effective and easier to install than running individual pairs of wires to each irrigation valve, especially for embodiments comprising a large numbers of irrigation valves that are a long distance from the irrigation controller.

Data is encoded onto the two wires, which also carry power from the irrigation controller to the field. In the field, "decoders" are installed along this pair of wires. These devices accept the data encoded power signal, and provide a drive signal to one or more solenoids, which control the flow of water through the irrigation valves. The individual station (solenoid) outputs of the decoder, would typically have an address in order to individually turn them on or off at the appropriate time using the encoded data.

In an embodiment, a message, which contains an ON command and a duration (to stay on) is sent, thus eliminating the OFF command. In another embodiment, the decoders energize devices other than irrigation valves. For instance, they could energize a relay, which could control the flow of electricity to a fountain pump, a light, etc. In a further embodiment, decoder irrigation systems comprise conventional outputs as described in U.S. Pat. No. 7,181,319B1, the entirety of which is incorporated herein by reference, in addition to comprising decoder outputs.

In a yet further embodiment, a decoder controller supports multiple wire paths to the field. This is useful when the irrigation controller is (geographically) centrally located, with irrigation valves on both sides of it. In some embodiments, decoder systems support bi-directional communication, while in other embodiments the communication is one-way from the irrigation controller to the decoder.

For communication from the decoder to the irrigation controller, embodiments of the decoder can actively encode data onto the two-wire path, or draw a modulated current, which can be sensed by the irrigation controller to communicate messages.

In other embodiments, decoder systems use a passive approach to achieving similar functionality to true bi-directional systems. For example, some systems will transmit a command to turn on a valve in the field and then monitor current. The decoder receives the command, and in response, turns on the valve. The valve then draws current from the two-wire path. This increased current is sensed by the irrigation controller and provides verification that the command was received by the decoder, and that the decoder successfully turned on the valve. However, the irrigation controller cannot verify which decoder/valve turned on.

Furthermore, in true two-way communications, diagnostic and other information can be sent to the controller. In other embodiments, decoders comprise RF circuitry to communicate with diagnostic equipment out in the field. This is disclosed in U.S. Pat. No. 7,248,945, the entirety of which is incorporated herein by reference.

General Architecture of Decoder System Embodiments

Figure 21:
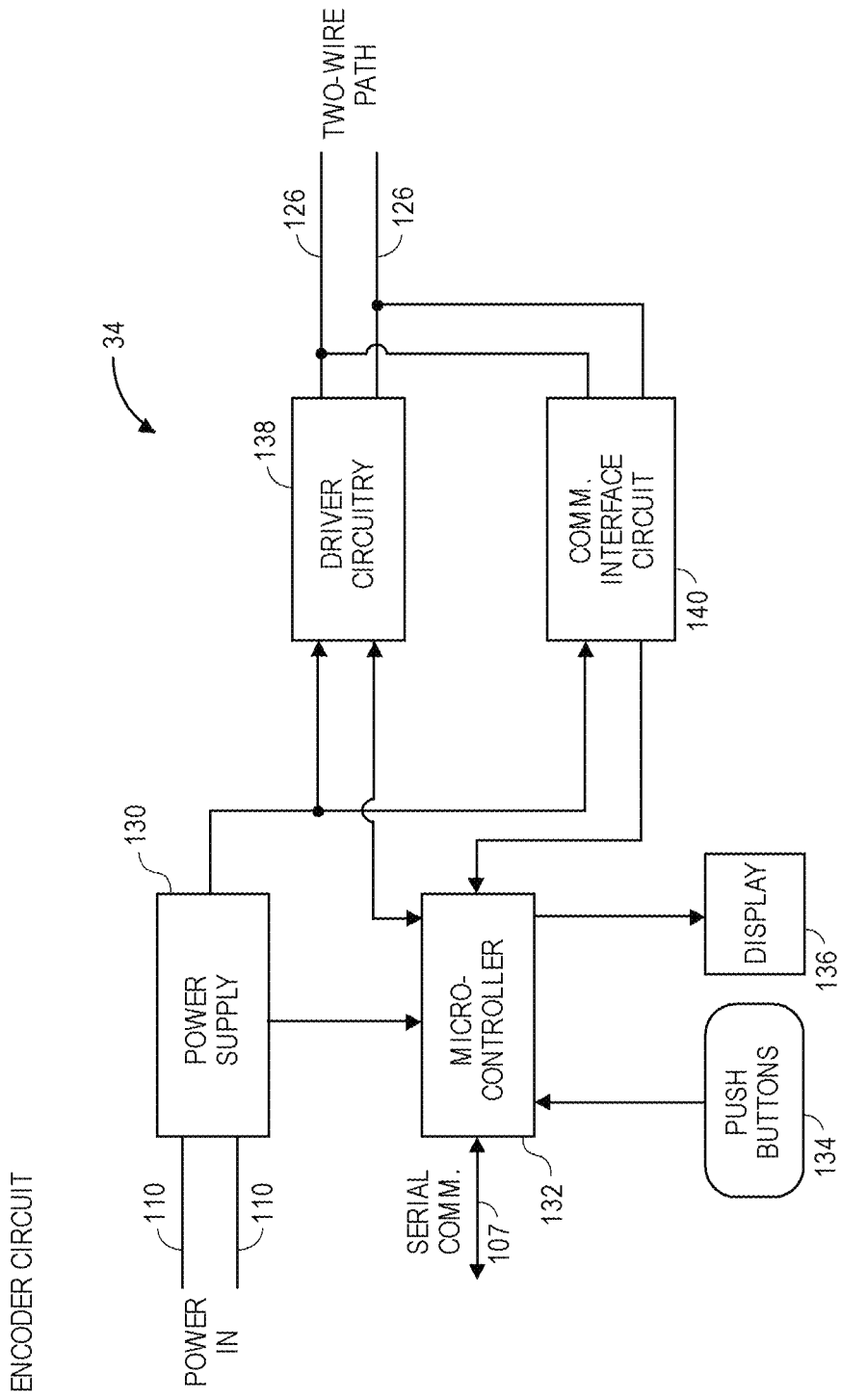
FIG. 21 illustrates an exemplary encoder circuit, according to certain embodiments.

FIG. 21 illustrates an embodiment of an encoder circuit 34, which is typically located in a controller. In an embodiment, the controller comprises an irrigation controller. The controller supplies the power in to the encoder circuit 34 on input lines 110. A power supply 130 supplies a DC signal to a micro-controller 132. The micro-controller 132 receives serial communications commands from the irrigation controller's processor via bus 107. Push buttons 134 and a display 136 are connected to the micro-controller 132 and are used to identify and program the decoder circuits. Driver circuitry 138 receives an AC power signal from the power supply 130 and command signals from the micro-controller 132. The driver circuitry 138 typically includes an H-bridge with current sensing which may be duplicated for driving more than one two-wire path 126. The driver circuitry 138 sends encoded signals and the AC power signal along the two-wire path 126. Optical isolation (not illustrated) may be provided between the bus 107 and the micro-controller 132.

Optionally, the encoder circuit 34 has a communications interface circuit 140 that is connected between the two-wire path 126 and the micro-controller 132 and provides the encoder circuit 34 with bi-directional communications capabilities. Therefore, when each of the far away irrigation valves is turned ON an acknowledgment signal can be sent back to the irrigation controller's processor. The bi-directional communication capability provided by the communications interface circuit 140 also enables sensor information, such as that obtained by a moisture sensor, rain sensor, flow rate sensor, temperature sensor, humidity sensor, etc. to be encoded and transmitted back to the processor of the irrigation controller through the encoder circuit 34.

The irrigation controller's processor executes the stored watering program and controls the encoder circuit 34 in accordance with the stored watering program. It should be noted that the functions done by the microcontroller in the encoder, and by the controller processor, can be done in the processor alone. In this case bus 107 becomes superfluous. The irrigation controller's processor can provide the encoded signals directly to the two-wire driver circuitry 138.

Figure 22:
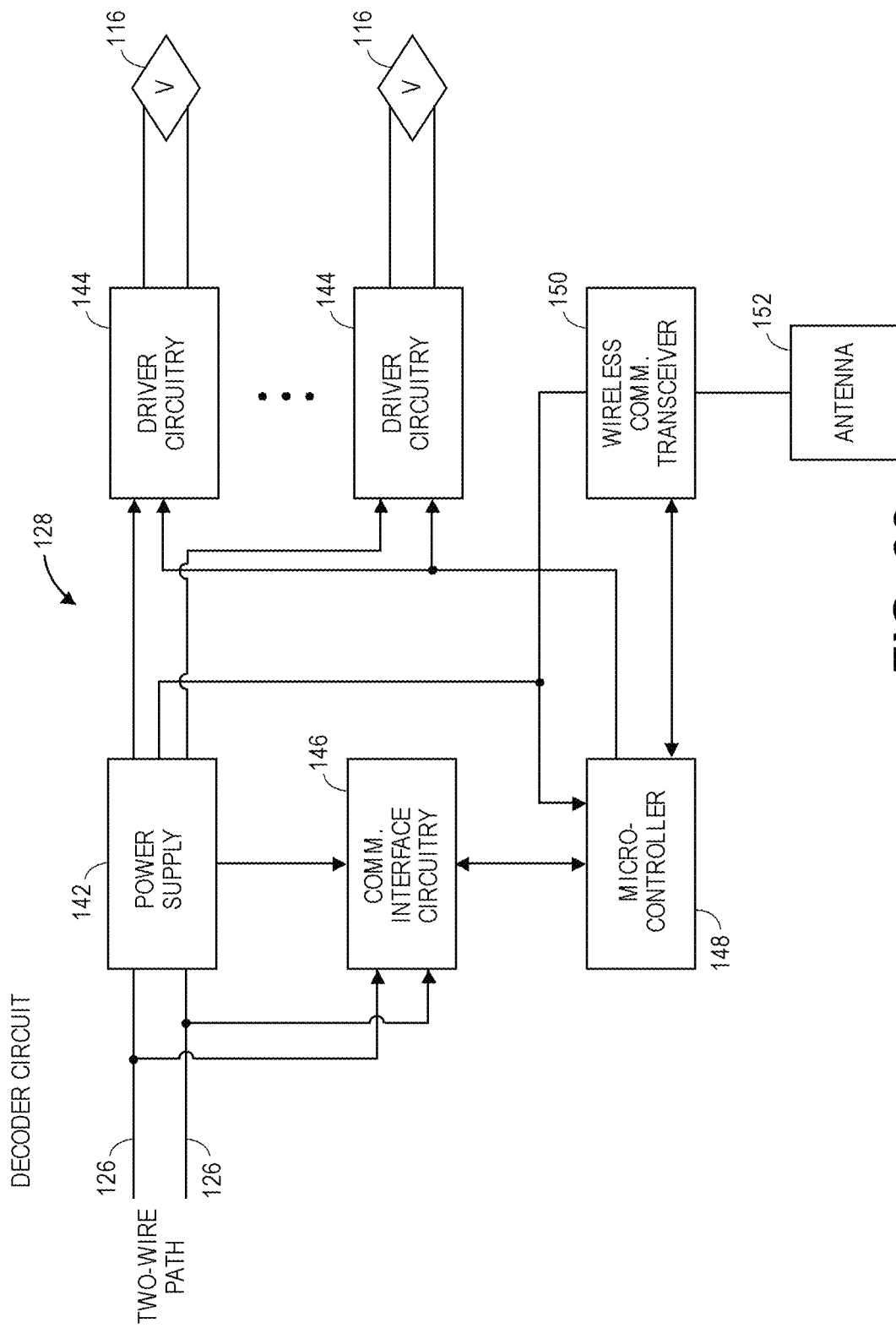
FIG. 22 illustrates an exemplary decoder circuit, according to certain embodiments.

FIG. 22 illustrates an embodiment of a decoder circuit 128. The two-wire path 126 is connected to a power supply 142 that supplies power to bi-polar or MOSFET driver circuitry 144 that opens and closes solenoids in irrigation valves 116. The driver circuitry 144 is duplicated several times for controlling more than one irrigation valve 116. Bi-directional communications interface circuitry 146 is connected to the two-wire path 126 and to a micro-controller 148. The power supply 142 supplies the DC power to the micro-controller 148 and to a wireless communications transceiver 150 having an antenna 152. In an embodiment, the wireless communications transceiver 150 and the antenna 152 are optional circuitry.

The two-wire path 126 that connects the encoder 34 with the decoders 128 in the field can carry non-sinusoidal power or sinusoidal power. Embodiments of the encoder's power supply 130 and the driver circuitry 138 for both the non-sinusoidal and the sinusoidal power scenarios are described herein. Likewise, embodiments of the decoder's power supply 142 and driver circuitry 144 for both the non-sinusoidal and the sinusoidal power scenarios are described herein.

Non-Sinusoidal Power (NSP)
Encoder Power Supply Circuit (NSP)

Consider the encoder block diagram of FIG. 21 for the non-sinusoidal power embodiment. The power that exists on the two-wire path 126 connecting the encoder 34 with the decoders 128 in the field comprises non-sinusoidal power. For this embodiment, the power supply 130 creates a DC output voltage. While this DC output voltage varies, it is typically in the range of approximately 12 VDC to approximately 40 VDC depending on the requirements of the system. A higher output voltage allows a greater voltage drop in field wiring, which translates to longer possible runs of wire. A lower output voltage would not have this benefit, but could comprise simpler, more economical components.

There are typically two scenarios in terms of non-sinusoidal power that are presented to the input of the power supply 130 on input lines 110. In a first embodiment, the input power comprises a DC voltage that is higher than the desired output voltage of the power supply 130. In a second embodiment, the input power comprises an AC voltage with an RMS value similar to the desired output of the power supply. This would likely be the case if the irrigation controller associated with the encoder 34 also had conventional outputs, which consist of approximately 24 VAC.

DC Input to Encoder Power Supply

Figure 23:
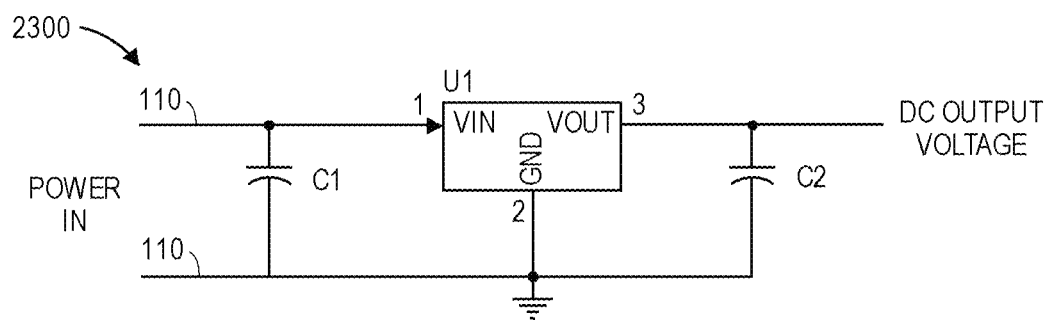
FIG. 23 illustrates an exemplary power supply circuit for an encoder receiving DC input power and transmitting a non-sinusoidal output signal on the two-wire path, according to certain embodiments.

If the input to the power supply 130 is a DC voltage, then one embodiment for the circuitry of the power supply 130 comprises a linear regulator 2300 shown in FIG. 23. The purpose of the linear regulator circuit is to take the input voltage, which is too high, and potentially fluctuating, and regulate it down to the desired steady DC output.

Figure 24:
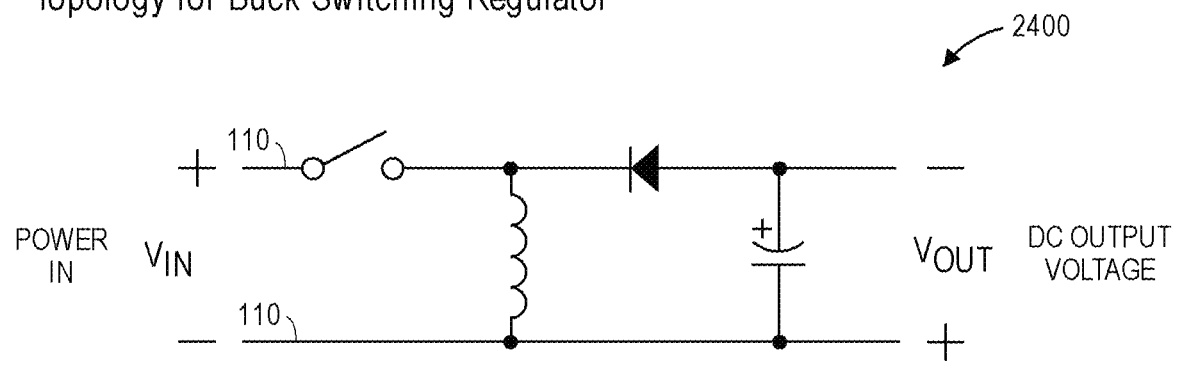
FIG. 24 illustrates another exemplary power supply circuit for an encoder receiving DC input power and transmitting a non-sinusoidal output signal on the two-wire path, according to certain embodiments.

In an embodiment, if the input voltage is much higher than the desired output voltage, then a buck switching regulator can be used. An exemplary topology of a buck switching regulator 2400 is shown in FIG. 24, and is more efficient than the linear regulator 2300 of FIG. 23 and generates less heat. For instance, if the unregulated voltage is approximately 25 VDC and the desired voltage is 5 VDC at a current draw of 100 mA, a linear regulator will dissipate the 100 mA times the drop across the regulator (20V in this case) or 2 W of power. For a switching regulator that is 90% efficient, the power dissipated would be the supplied power times (1−efficiency). In this case the supplied power is 5V×100 mA=0.5 W. The power dissipated in the switching regulator is then 0.5 W×(1−0.9)=0.05 W. This is 40 times less than the power dissipated in the linear regulator, and will therefore result in 40 times less heat.

Both linear and switching (buck) regulators 2300, 2400 are well understood and there are many integrated options available for each. One example of a linear regulator 2300 is the LM7824 available from Fairchild Semiconductor. Likewise, one example of a buck regulator 2400 is the LM2476 available from Texas Instruments.

AC Input to Encoder Power Supply

Figure 25:
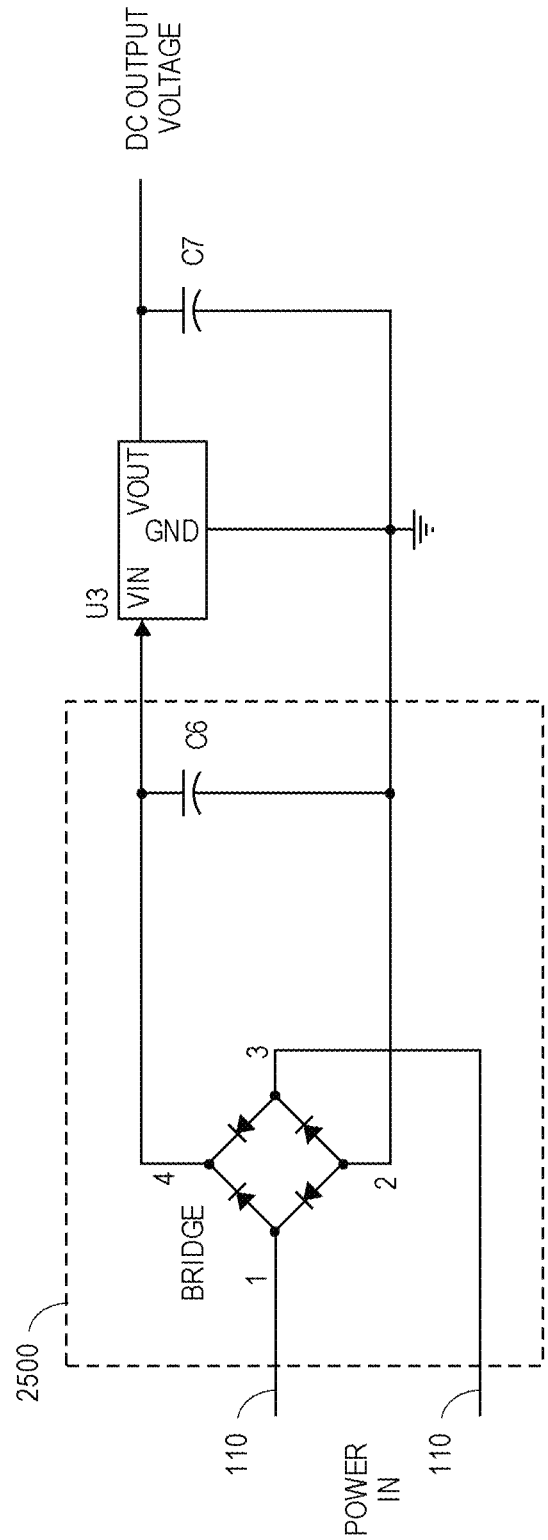
FIG. 25 illustrates an exemplary power supply circuit for an encoder receiving AC input power and transmitting a non-sinusoidal output signal on the two-wire path, according to certain embodiments.

In the embodiment where the input to the power supply 130 is an AC signal, such as approximately 24 VAC as is typically found in many irrigation controllers, the incoming power signal is first rectified and filtered before regulation. An exemplary full wave rectifier and filter circuit 2500 comprising a BRIDGE and filter capacitor C6 shown in FIG. 25 provides this function. The output of the full wave rectifier filter circuit 2500 is shown connected to a linear regulator U3. In other embodiments, the output could be connected to the buck regulator 2400 as described in FIG. 24, or not connected to a regulator if the input power is not expected to fluctuate and some ripple as acceptable.

Encoder Driver Circuit (NSP)

Figure 26:
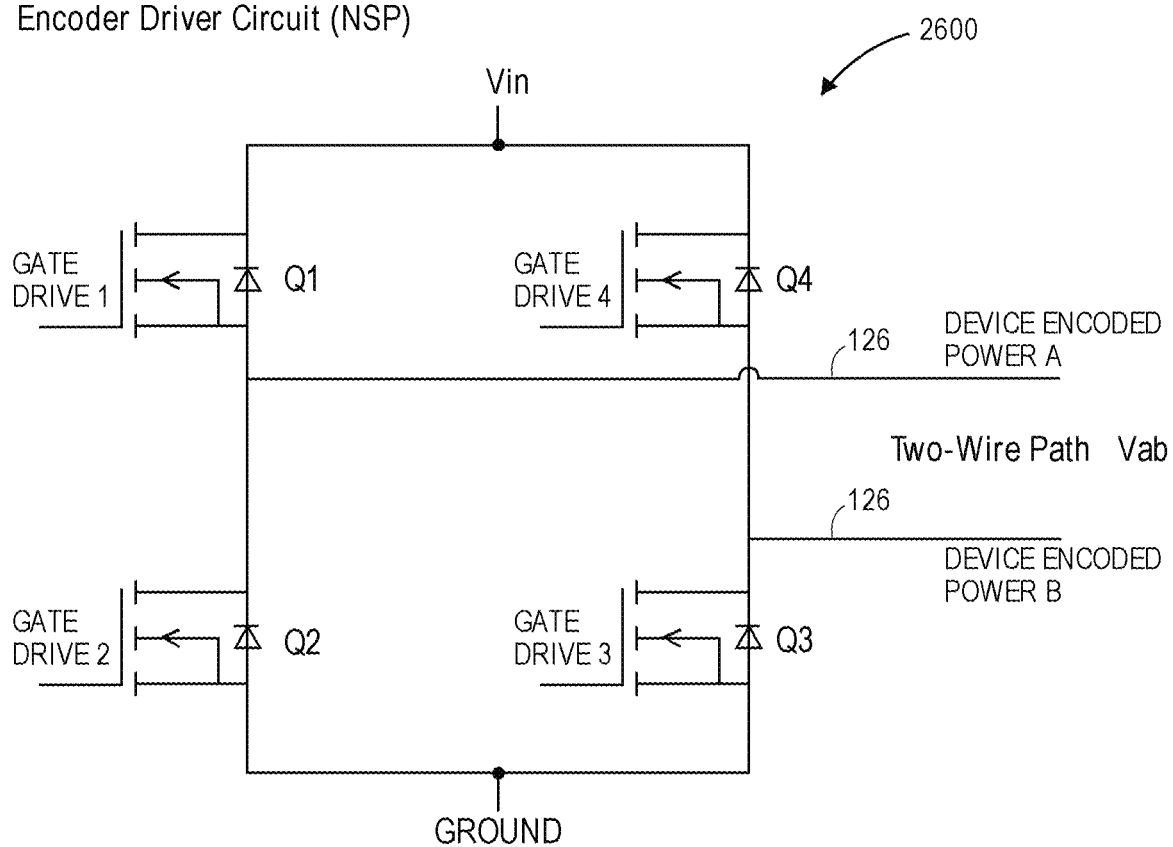
FIG. 26 illustrates exemplary driver circuitry for an encoder transmitting a non-sinusoidal output signal on the two-wire path, according to certain embodiments.

Next, consider the driver circuitry 138 for the non-sinusoidal power scenario. In general, the output waveform of the encoder driver circuit 138 for this embodiment represents a square wave with approximately zero DC components. Any DC component is undesirable because when a wire splice is subject to moisture, and a DC current exists, electrolysis occurs and, and because of the electrolysis, the wire disintegrates. One embodiment to create an approximately zero-DC square wave for a DC source is to use an exemplary H-bridge circuit 2600 as shown in FIG. 26.

The H-Bridge circuit 2600 operates by alternately turning on diagonal pairs of transistors Q1/Q3, Q2/Q4, which results in the incoming power being applied to the output terminals with one of two polarities. The signals GATE DRIVE 1, GATE DRIVE 2, GATE DRIVE 3, GATE DRIVE 4 turn ON and OFF transistors Q1, Q2, Q3, Q4, respectively and are provided by the micro-controller 132. For instance, turning transistors Q1 and Q3 ON results in an output voltage Vab that has a positive polarity. Similarly, turning transistors Q2 and Q4 ON results in the output voltage Vab having a negative polarity. A square wave output of any duty cycle can be generated by the micro-controller 132. But for zero or approximately zero DC at the output, the duty cycle should be approximately 50%.

Figure 27:
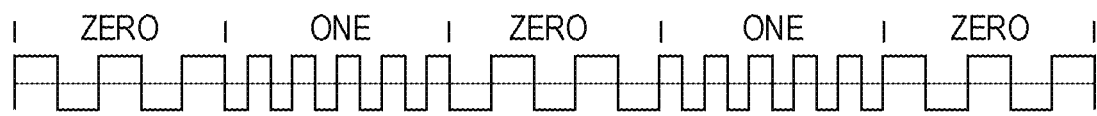
FIG. 27 illustrates a FSK example of data encoded onto the two-wire path using the encoder driver circuitry of FIG. 26.

There are various ways to encode data onto the two-wire path 126 using the H-bridge circuit 2600. In one example, the data is frequency shift keyed. FIG. 27 illustrates an exemplary waveform 2700 of frequency shift keyed data on the two-wire path 126.

Figure 28:
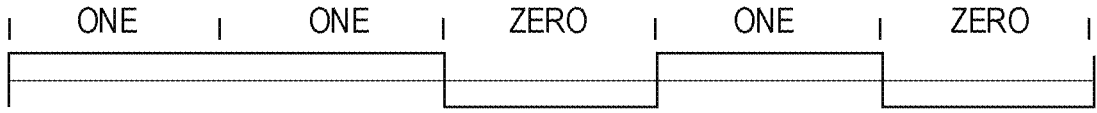
FIG. 28 illustrates an ASK example of data encoded onto the two-wire path using the encoder driver circuitry of FIG. 26.

In another embodiment, the data is amplitude shift keyed (ASK). FIG. 28 illustrates an exemplary waveform 2800 of amplitude shift keyed data on the two-wire path 126. If ASK modulation is used to encode the data, then, in an embodiment, the data should be sent using Manchester (or similar) encoding, which provides zero or approximately zero DC content.

Decoder Power Supply (NSP)

Figure 29:
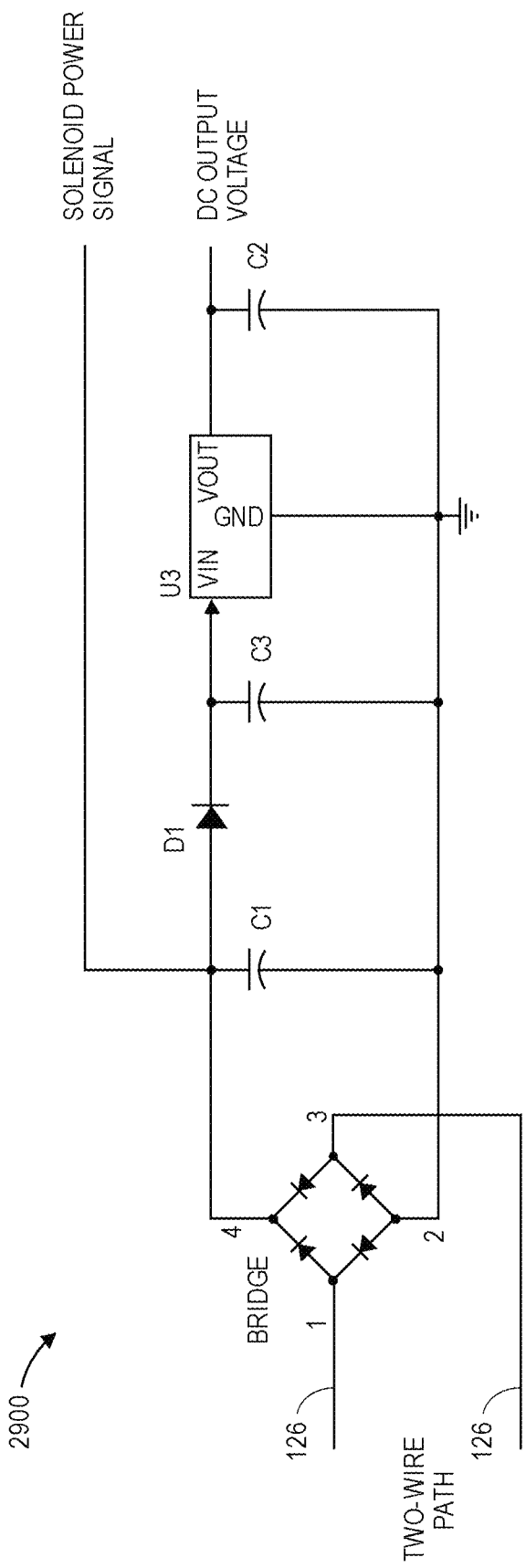
FIG. 29 illustrates an exemplary power supply circuit for a decoder receiving a non-sinusoidal input signal from the two-wire path, according to certain embodiments.

FIG. 29 illustrates an embodiment of the decoder power supply 142 for the non-sinusoidal power situation. For this scenario, the function of the power supply 142 is to turn the incoming data encoded power signal (square wave), such as exemplary waveforms 2700, 2800, into a DC voltage. In the embodiment shown in FIG. 29, this done by a bridge rectifier circuit 2900 comprising a bridge rectifier BRIDGE, diode D1, capacitors C2, C3, and linear regulator U3.

The bridge rectifier circuit 2900 further comprises a storage capacitor C1 at the output of the bridge rectifier BRIDGE for wire runs to the decoder 128 (from the irrigation controller) that may be thousands of feet, and therefore be highly inductive. This would result in poor transient response of the rectified output unless the storage capacitor C1 was used.

In addition, a logic power supply is also generated using the linear regulator U3, such as an LM7805 available from Fairchild Semiconductor.

Decoder Driver Circuit (NSP)

Figure 30:
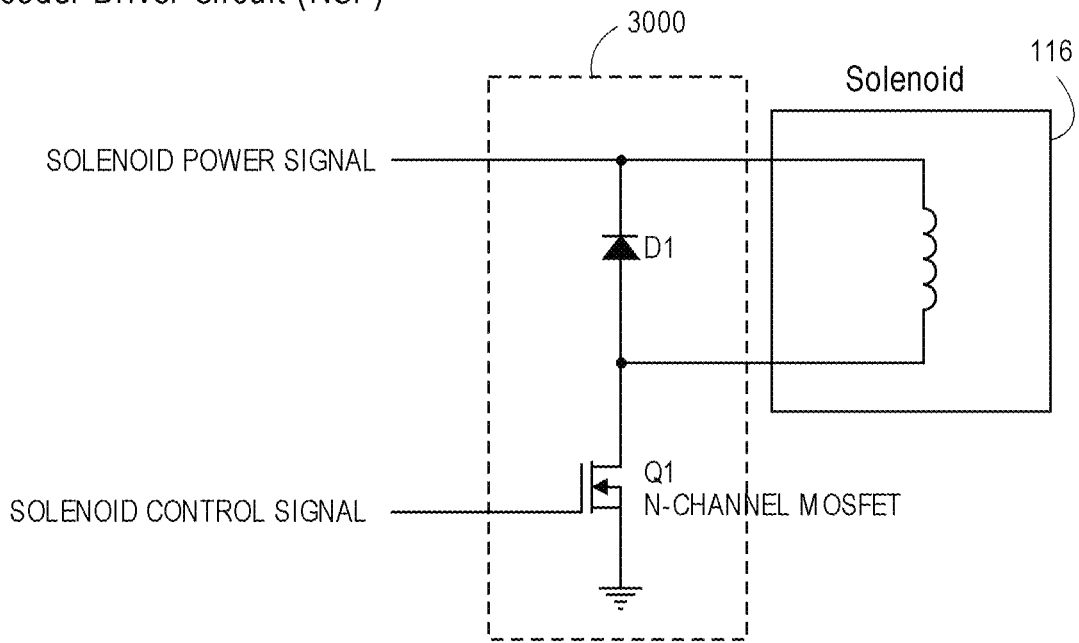
FIG. 30 illustrates exemplary driver circuitry for a decoder receiving a non-sinusoidal input signal or a sinusoidal input signal from the two-wire path, according to certain embodiments.

An embodiment 3000 of the decoder driver circuit 144 is shown in FIG. 30. The decoder driver circuit 144 drives the solenoid of the irrigation valve 116 with a PWM waveform that typically has a low duty cycle, and therefore some DC content. Since the connection between the decoder 128 and the solenoid is typically made within a valve box, and is a few feet long at most, there is less concern over the DC content.

In an exemplary operation, the SOLENOID CONTROL SIGNAL from the microcontroller 148 turns ON transistor Q1 for about 300 μS, then turns transistor Q1 OFF for about 700 μS. These are typical values. Other values can be based on the voltage at the decoder 128 and the characteristics of the solenoid. While transistor Q1 is OFF, diode D1 conducts the back EMF generated by the inductive coil inside the solenoid. Providing this function, diode D1 is known as a freewheeling diode.

Decoder Communication Interface Circuit (NSP/SP)

Figure 31:
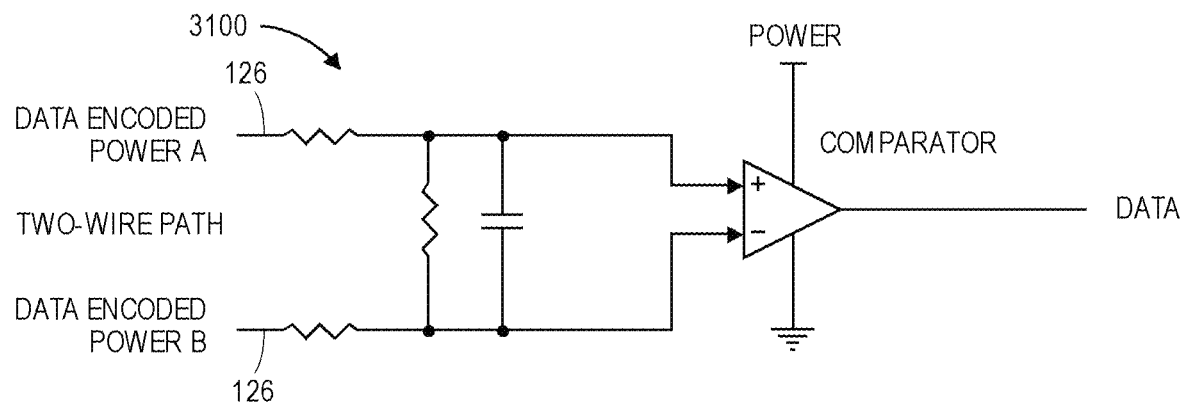
FIG. 31 illustrates an exemplary decoder communication interface circuit, according to certain embodiments.

The communication interface circuit 146 of the decoder 128 is responsible for taking the data encoded power signal, extracting the data portion, and presenting the data to the microcontroller 148. This function can be accomplished using a comparator to "slice" the incoming power signal after it has been conditioned by a low pass filter. FIG. 31 illustrates an embodiment 3100 of the decoder communication interface circuit 146 comprising a comparator COMPARATOR, a resistor and a capacitor. The output of the comparator is a logic level signal, which is presented to the microcontroller 148. An exemplary comparator is an LM393 available from Texas Instruments and the like.

In some embodiments, the microcontroller 148 comprises the comparator. Such is the case with the PIC16F1825 available from Microchip Technology.

Sinusoidal Power (SP)

Encoder Power Supply Circuit (SP)

Consider the encoder block diagram of FIG. 21 for the sinusoidal power embodiment. The power that exists on the two-wire path 126 connecting the encoder 34 with the decoders 128 in the field comprises sinusoidal power. For this scenario, the power supply 130 is typically fed with the output of a step-down transformer and, in some embodiments, can be a sinusoidal waveform of approximately 24 VAC. The purpose of the power supply circuitry 130 is to create a logic power supply of approximately 3 VDC to approximately 5 VDC for the microcontroller 132. Optionally, the power supply 130 may also comprise conditioning circuitry that prevents or reduces high frequency transients or surges from passing to the driver circuitry 138.

Figure 32:
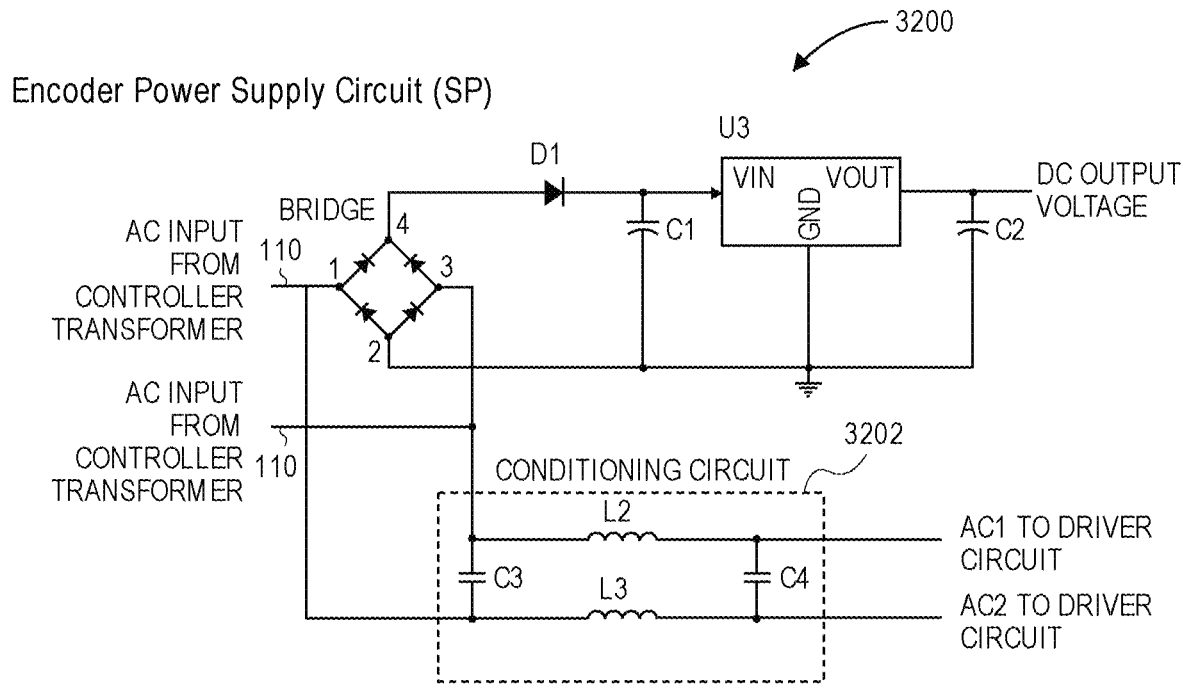
FIG. 32 illustrates an exemplary power supply circuit for an encoder transmitting a sinusoidal output signal on the two-wire path, according to certain embodiments.

In general, the voltage supplied by the power supply circuit 130 to the driver circuit 138 closely resembles the secondary output of the transformer. In an embodiment, the transformer comprises the transformer in the irrigation controller power supply. While many possibilities exist, one embodiment 3200 of an encoder power supply circuit 130 is shown in FIG. 32 and comprises a full-wave bridge BRIDGE, diode D1, capacitor C1, linear regulator U1, and conditioning circuitry 3202. The full wave bridge BRIDGE rectifies the incoming power, which is then filtered by the capacitor C1. The voltage regulator U1 provides an approximately 5 VDC logic supply for the microcontroller 132. The optional conditioning circuitry 3200 providing the conditioning function comprises capacitors C3, C4, and inductors L2, L3.

Encoder Driver Circuit (SP)

Figure 33:
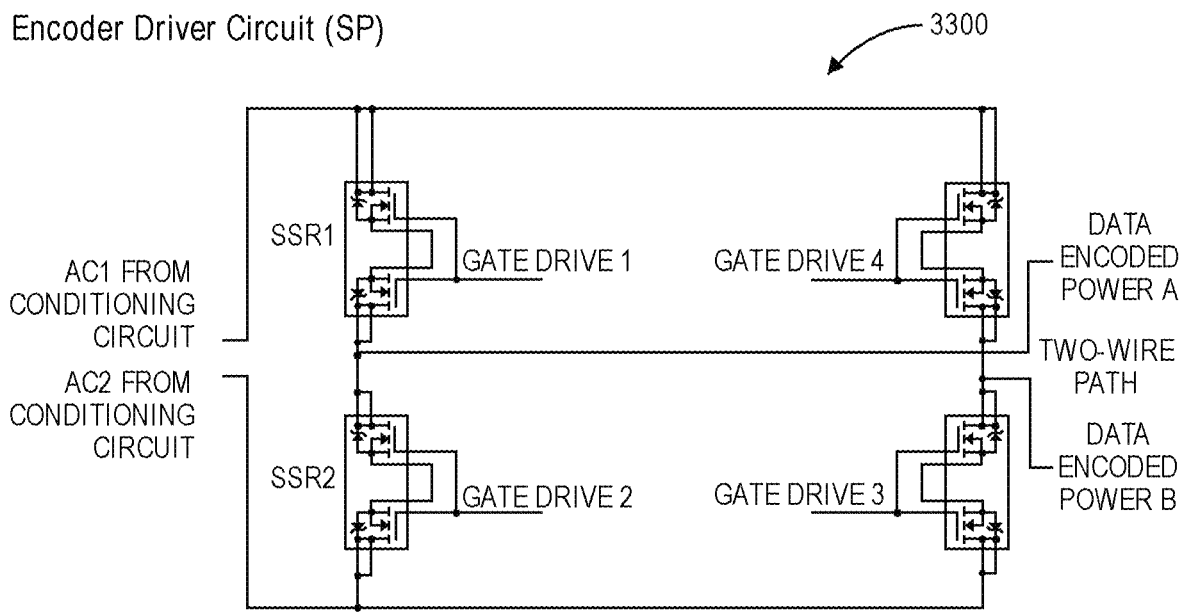
FIG. 33 illustrates exemplary driver circuitry for an encoder transmitting a sinusoidal output signal on the two-wire path, according to certain embodiments.

FIG. 33 illustrates an embodiment 3300 of the encoder driver circuitry 138 for the sinusoidal power scenario. The power between the encoder 34 and decoders 128 in the field is sinusoidal or approximately sinusoidal, which is what is supplied to the driver circuit 138 from the encoder power supply 3200 of FIG. 32. The function of the driver circuit 3300 is to apply the AC signal present at its input to its output either in-phase, or shifted by approximately 180 degrees (inverted). The microcontroller 132 determines which of these phases to apply, thereby encoding the data on the power signal.

In the embodiment 3300 illustrated in FIG. 33, the driver circuit 138 comprises an H-bridge comprised of four solid-state relays SSR1-SSR4. In the illustrated embodiment 3300, each of the solid-state relays SSR1-SSR4 comprise two series MOSFETs. The signals GATE DRIVE 1, GATE DRIVE 2, GATE DRIVE 3, GATE DRIVE 4 turn ON and OFF solid-state relays SSR1, SSR2, SSR3, SSR4, respectively, and are provided by the micro-controller 132. The solid-state relays SSR1-SSR4 are turned ON by the microcontroller 132 in diagonal pairs SSR1/SSR3, SSR2/SSR4 to apply either the in-phase signal or the shifted signal to the output. If solid-state relay SSR1 and solid-state relay SSR3 are ON, then the output is in phase with the input. If solid-state relay SSR2 and solid-state relay SSR4 are ON, then the output is out of phase with the input.

Figure 34:
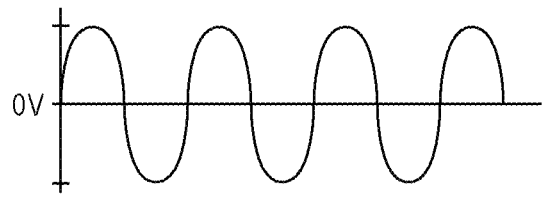
FIG. 34 illustrates an exemplary output signal of the driver circuitry of FIG. 33 when no data is being sent on the two-wire path.
Figure 35:
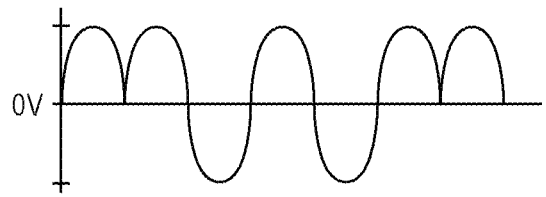
FIG. 35 illustrates an exemplary output signal of the driver circuitry of FIG. 33 when data is being sent on the two-wire path.

Data can be encoded onto the AC power going out to the decoders 128 on the two-wire path 126. FIG. 34 illustrates the output of the encoder driver circuit 138 when no data is being sent and FIG. 35 illustrates the output of the encoder driver circuit 138 when data 1, 1, 0, 1, 0, 1, 1 is being sent.

Decoder Power Supply Circuit (SP)

Figure 36:
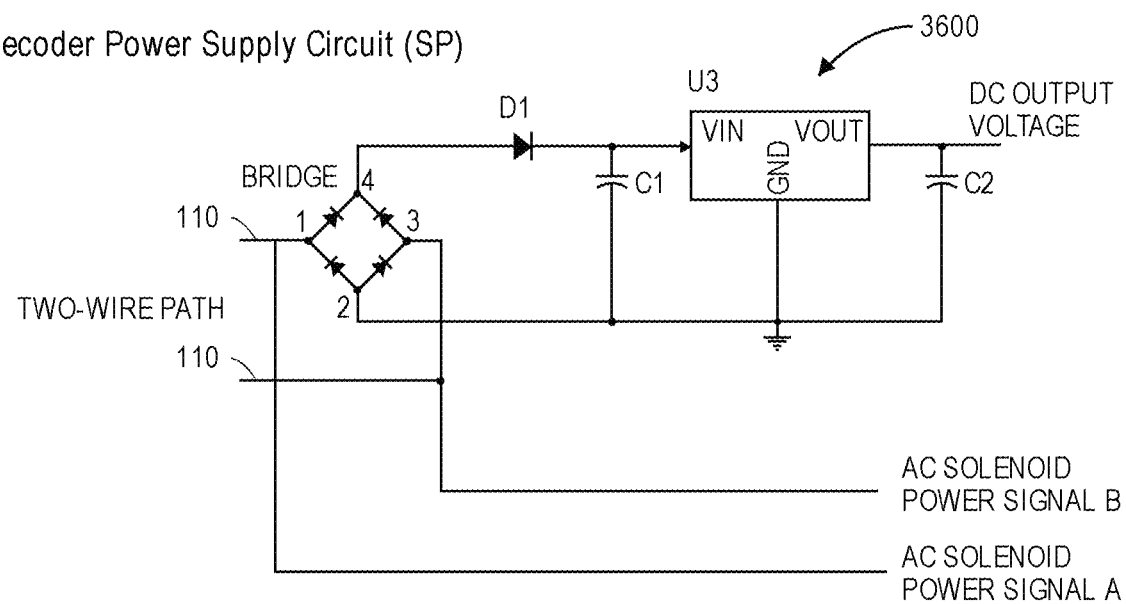
FIG. 36 illustrates an exemplary power supply circuit for a decoder receiving a sinusoidal input signal from the two-wire path, according to certain embodiments.

FIG. 36 illustrates an embodiment 3600 of the decoder power supply circuit 142 for the sinusoidal power scenario. The decoder power supply circuit 142 receives the incoming data encoded power signal from the two-wire path 126, which is sinusoidal in nature and creates an approximately 3 VDC to an approximately 5 VDC logic supply as described above with respect to FIG. 29. For the architecture illustrated in FIG. 36, there is no additional processing of the input signal before it is presented to the decoder driver circuit 144.

Decoder Driver Circuit (SP)

Because the data encoded power signal is sinusoidal, it can directly drive the solenoid of the irrigation valve 116. A switching device connects the incoming power to the solenoid. A SOLENOID CONTROL SIGNAL from the microcontroller 148 controls the switching of the switching device. FIG. 37 illustrates a first embodiment 3700 where the switching device comprises a triode for alternating current (triac) and FIG. 38 illustrates a second embodiment 3800 where the switching device comprises a MOSFET-based solid-state relay.

Each device has advantages and disadvantages. For the triac device embodiment 3700, some of the advantages are low cost and robustness, while some of the disadvantages are that it requires current to drive and has a voltage drop of approximately 1V. For the MOSFET-based solid-state relay embodiment 3800, some of the advantages are that it has little or no voltage drop and no current is required to drive the device, while some of the disadvantages are higher cost, and less robustness than the triac device embodiment 3700.

Decoder Communication Interface Circuit (SP)

Similar to the non-sinusoidal power scenario, the communication interface circuit 146 for the sinusoidal power case also extracts the communication signal from the power signal on the two-wire path 126. The embodiment 3100 shown in FIG. 31 can be used for both the non-sinusoidal and sinusoidal scenarios. The comparator "squares up" and scales the incoming signal and presents it to the microcontroller 148.

Further, in an embodiment, the decoder architecture described in the NSP embodiments 2900, 3000, 3100 of FIGS. 29-31, respectively, could receive the SP data encoded power waveform and function as long as the microcontroller 148 comprises the code to receive the communications. However, if a sinusoidal data encoded power (SP) waveform is present, then the decoder embodiments 3600, 3700, 3800 described in FIGS. 36-38, respectively, are advantageous since they are simpler, less expensive, and more robust.

Irrigation Controller

FIG. 39 illustrates an irrigation controller 3902 with its front door 3912 open to reveal its removable face plate 3916 according to an embodiment. Irrigation controller 3902 further includes a back panel 3914. FIG. 40 illustrates an enlarged plan view of the removable face plate 3916. The illustrated face plate 3916 includes controls 3918-3926 and a display 3928. FIG. 41 illustrates an enlarged plan view of the back panel 3914, which is accessible after the face plate 3916 has been opened or removed. The illustrated back panel 3914 comprises a power supply 3930, terminals 3932, modules 2934, 3936, 3938 mounted in receptacles, and at least one sensor connector 3940.

Referring to FIGS. 39 through 41, the irrigation controller 3902 comprises a wall-mounted structure including a generally box-shaped front door 3912 hinged along its right vertical edge to a generally box-shaped back panel 3914 (FIG. 41). In some embodiments, the irrigation controller 3902 can be the same as one of the controllers 202, 302, 402, 602, 702, 752, 802, 902, or 1002. A removable rectangular face plate 3916 (FIG. 40) is mounted over the back panel 3914 and is normally concealed by the front door 3912 when not being accessed for programming. The face plate 3916 has a plurality of manually actuable controls including rotary dial switch 3918 and push button switches 3920, 3921, 3922, 3923, and 3924, as well as slide switch 3926, which can be manipulated in conjunction with numbers, words or other symbols indicated on a liquid crystal display 3928 for entering or altering a watering program as is well known by one of skill in the art of electronic irrigation controllers.

The face plate 3916 supports a printed circuit board with a microprocessor for executing and implementing a stored watering program, and electrical connection is made between the face plate 3916 and the components in the back panel 3914 via ribbon cable (not illustrated). The circuitry inside the face plate 3916 can be powered by a battery to allow a person to remove the face plate 3916, unplug the ribbon cable, and walk around the lawn, garden area or golf course while entering a watering program or altering a pre-existing watering program.

Referring to FIG. 41, the back panel 3914 can include a power supply. The power supply can be a transformer 3930. In some embodiments, a communications interface can be electrically connected to at least one of the terminals 3932. In some embodiments, the communications interface can be a Sync-Port™.

The back panel 3914 can comprise one or more station control modules 3934, 3936. At least one of the station control modules can be an encoder module 3934 that can control individual decoder modules. The decoder modules can then cause an irrigation valve solenoid to turn ON or OFF based on the commands from the face plate 3916. In some embodiments, the encoder module 3934 can comprise the encoder circuit 34 illustrated in FIG. 21. The encoder module 3934 can comprise one or more of a display panel 39136 and push buttons 39134. Wires for the two-wire path 126 in communication with the decoders can be connected to terminals 39126. Additionally, the encoder module 3934 can comprise programing connectors 39128 where a decoder can be connected to assign an address or name to the decoder.

At least one of the station control modules 3936 can directly control individual irrigation valves as determined by a command from the face plate 3916 without the need for a decoder. In some embodiments, the irrigation controller 3902 may have a base module 3938 that provides outputs to provide power to additional solenoid operated irrigation valves. The irrigation controller 3902 can comprise at least one sensor connector 3940 to allow a user to connect a sensor to the irrigation controller 3902 to monitor weather conditions or irrigation functions at the site where the irrigation controller 3902 is installed.

While the irrigation controller 3902 is described, any compatible irrigation controller with or without user controls may be used. An irrigation controller with user inputs can include any combination of switches, buttons, or dials, to allow the user to input irrigation programs at the irrigation controller. In some instances, the irrigation controller can include a user readable screen. In some instances, an irrigation controller may incorporate a touchscreen to accept user inputs in combination with, or to replace any dials buttons, or switches. In some embodiments, the outputs terminals may be in modules that attach to the back plane in a vertical or horizontal orientation. In some embodiments, the output terminals can be a fixed integral part of the irrigation controller. In some cases, the output terminals may be used to wire individual irrigation valves. In some cases, the output terminals can be used to wire a decoder arrangement where multiple decoders are connected to a common set of wires and are addressed individually to operate in accordance with commands sent on one or more of the wires in the wire set. A decoder can turn a valve on or off in response to the commands.

Decoder with DC Latching Solenoid Drive

FIGS. 30, 37 and 38 show decoder drive circuits 3000, 3700, and 3800, respectively, for driving a 24 VAC solenoid 116. Other types of irrigation solenoids can be used in an irrigation system. For example, an irrigation system can comprise one or more DC latching solenoids.

Figure 42:
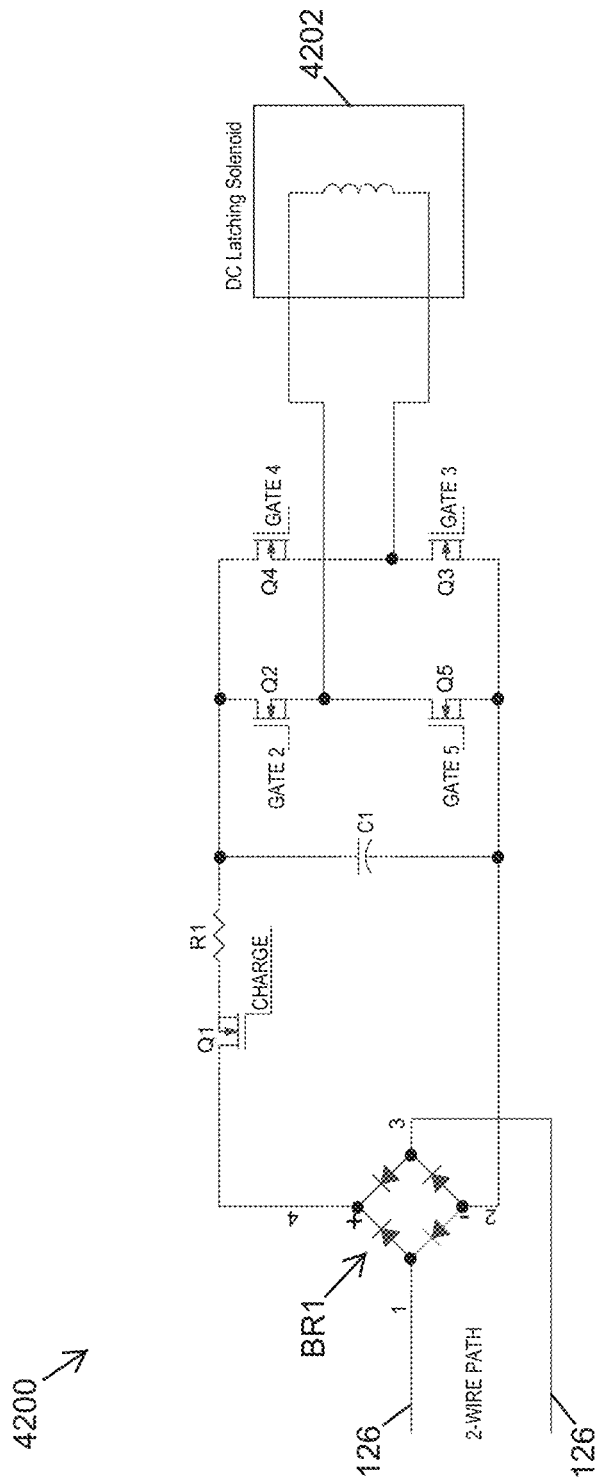
FIG. 42 illustrates driver circuitry for a decoder to drive a DC latching solenoid, according to certain embodiments.

FIG. 42 illustrates power supply and driver circuitry 4200 for the decoder 128 to drive a DC latching solenoid 4202 according to certain embodiments. The illustrated power supply and driver circuitry 4200 comprises a full-wave bridge BR1, transistor Q1, resistor R1, capacitor C1, and an H-bridge that includes transistors Q2-Q5. Transistors Q1-Q5 can be MOSFETs. The power supply and driver circuitry 4200 receives the approximately 24 VAC power signal from the two-wire path 126. The CHARGE signal from the microcontroller 148 turns transistor Q1 ON and OFF and the GATE 2-5 signals from the microcontroller 148 turn transistors Q2-Q5 ON and OFF, respectively.

The full-wave bridge BR1 rectifies the incoming AC power signal. The output of the full-wave bridge BR1 charges capacitor C1 when the microcontroller 148 turns ON transistor Q1. Resistor R1 can be used to limit the charge current, therefore extending the life of capacitor C1. The voltage across capacitor C1 can be measured using one of the analog to digital inputs of the microcontroller 148 in the decoder 128. When the voltage across capacitor C1 reaches a sufficient level, the microcontroller 148 stops charging capacitor C1 by turning OFF transistor Q1. At this point, the H-bridge comprising transistors Q2-Q5 delivers the charge stored in capacitor C1 into the DC latching solenoid 4202. Turning ON transistors Q2 and Q3 delivers the charge with a first polarity to actuate the DC latching solenoid 4202, and turning ON transistors Q4 and Q5 delivers the charge with a second polarity that is opposite from the first polarity to de-actuate the DC latching solenoid 4200.

The advantage that the DC latching solenoid 4202 has over the 24 VAC solenoid 116 is that the DC latching solenoid 4202 requires no power after it has been latched. As a result, the power supply used in the irrigation controller 3902 can be much less powerful and less costly. Further, because the DC latching solenoid 4202 requires no power after it has been latched, there is less current flowing in the two-wire path 126, which allows the two-wire path 126 to span greater distances with thinner and less costly wire.

Preferably, the decoder 128 with the DC latching solenoid drive circuitry 4200 would charge capacitor C1 immediately or soon after it turned the DC latching solenoid 4202 ON (enabled watering). This can provide a reservoir of energy to turn the DC latching solenoid 4202 OFF in the event power was prematurely removed from the two-wire path 126. This could occur, for example, but not limited to, if a user inadvertently removes power to the irrigation controller 3902 after it had turned ON the DC latching solenoid 4202, if a lightning strike damages the controller 3902 after it had turn ON the DC latching solenoid 4202, or if the two-wire path 126 is accidentally cut by a maintenance crew. In any of these instances, the decoder 128 would quickly realize that power is removed and use the energy stored in capacitor C1 to de-activate the DC latching solenoid 4202 and shut down watering.

Two-Wire Path Repeater

The sinusoidal communication approach to the irrigation system that employs the DC latching solenoids 4202 is extremely robust and can result in reliable communications from the irrigation controller 3902 to decoders 128 over tens of thousands of feet of wire. However, when 24 VAC solenoids 116 are used in the irrigation system, their current draw can result in a voltage drop along a lengthy two-wire path 126 that may prevent the 24 VAC solenoids 116 from actuating. In an aspect, an irrigation system that includes a two-wire path repeater overcomes this limitation.

Figure 43:
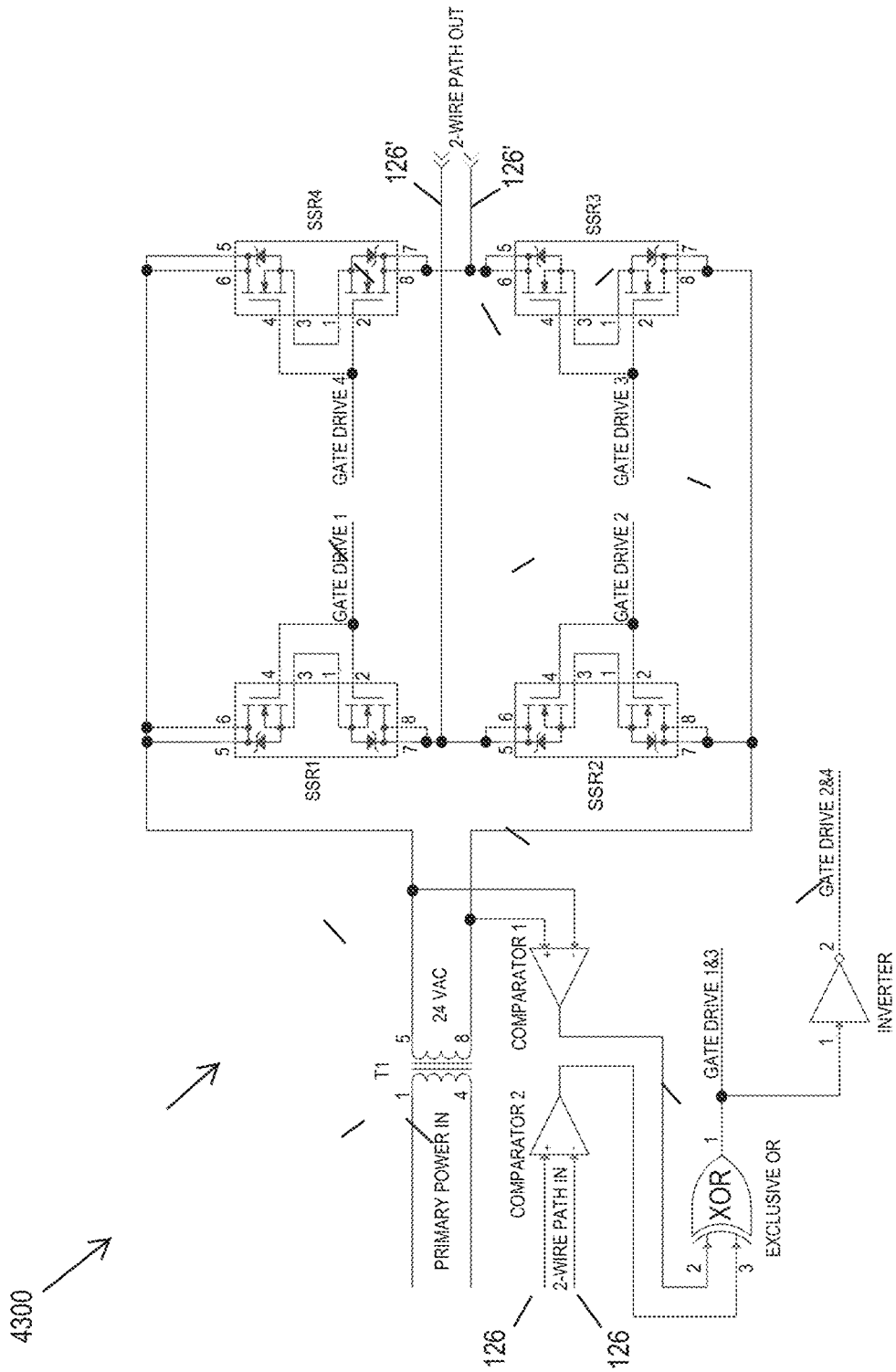
FIG. 43 illustrates two-wire path repeater circuitry, according to certain embodiments.

FIG. 43 illustrates two-wire path repeater circuitry 4300 according to certain embodiments. The illustrated two-wire path repeater circuitry 4300 includes a transformer T1, comparators COMPARATOR 1, COMPARATOR 2, logic circuits including an exclusive OR gate XOR, and an inverter INVERTER, and an H-bridge comprising four solid-state relays SSR1-SSR4. In the illustrated embodiment 4300, each of the solid-state relays SSR1-SSR4 comprise two series MOSFETs. The signals GATE DRIVE 1, GATE DRIVE 2, GATE DRIVE 3, GATE DRIVE 4 turn ON and OFF solid-state relays SSR1, SSR2, SSR3, SSR4, respectively, and are provided by the logic circuits.

The two-wire path repeater circuitry 4300 receives the two-wire path signal at the two-wire path 126 and creates an approximately identical, but power boosted signal at a two-wire path 126'. The two-wire path repeater circuitry 4300 derives power from the 24 VAC transformer T1 which transforms primary power to an approximately 24 VAC signal. The two comparators COMPARATOR 1, COMPARATOR 2 create a pair of square waves. COMPARATOR 1 receives the approximately 24 VAC signal from the transformer T1 and generates a first square wave that represents the phase of the 24 VAC signal from the transformer T1. COMPARATOR 2 receives the signal from the two-wire path 126 and generates a second square wave that represents the phase of the signal on the two-wire path 126. The first and second square waves are compared by the exclusive OR gate XOR. The output of the exclusive OR gate XOR forms the signals GATE DRIVE 1 and GATE DRIVE 3. The complement of the exclusive OR gate output, provided at the output of inverter INVERTER, forms the signals GATE DRIVE 2 and GATE DRIVE 4.

When the first and second square waves are in phase, the output of the exclusive OR gate XOR is low, the output of the inverter INVERTER is high, and solid state relays SSR2 and SSR4 are enabled. Enabling solid state relays SSR2 and SSR4 couples the output of the 24 VAC transformer T1 to the two-wire path 126' to provide the output of the 24 VAC transformer T1 to the two-wire path 126' with a first phase.

When data is sent on the two-wire path 126, the first and second square waves are out of phase. The output of the exclusive OR gate XOR is high and solid state relays SSR1 and SSR3 are enabled. Enabling solid state relays SSR1 and SSR3 couples the output of the 24 VAC transformer T1 to the two-wire path 126' to provide the output of the 24 VAC transformer T1 to the two-wire path 126' with a second phase that is approximately 180 degrees apart from the first phase.

The two-wire path repeater circuitry 4300 can further include additional circuits to buffer and level shift the logic levels of the gate drive signals GATE DRIVE1-4 to properly drive the solid state relays SSR1-4, respectively.

The two-wire path repeater circuitry 4300 effectively uses the phase information from the signal on the two-wire path 126 to reconstruct the signal and output the reconstructed signal on the two-wire path 126' using power from the 24 VAC transformer T1. In an aspect, there is no limit to the number of two-wire path repeaters 4300 that could be used to communicate the encoded data, address, and command information from the two-wire path 126 onto the two-wire path 126' in a lighting, irritation, and/or landscape system.

Decoder with LED for Optical Communication of Diagnostic Data

The decoder 128 in FIG. 22 illustrates an embodiment of a wireless communication transceiver, which can be used to communicate with a handheld diagnostic tool that can allow diagnostics to be performed without disconnecting the decoder 128 from the two-wire path 126, 126'. In another aspect, an LED could communicate diagnostics to a handheld diagnostic tool optically. This can provide a simple, economical alternative to the decoder 128. The optical communication may have less range than the RF transceiver 150, but can achieve the same level of diagnostics as with the RF transceiver 150, and still be done without disconnecting the decoder 128 from either the two-wire path 126, 126', or the solenoid 116, 4202.

Figure 44:
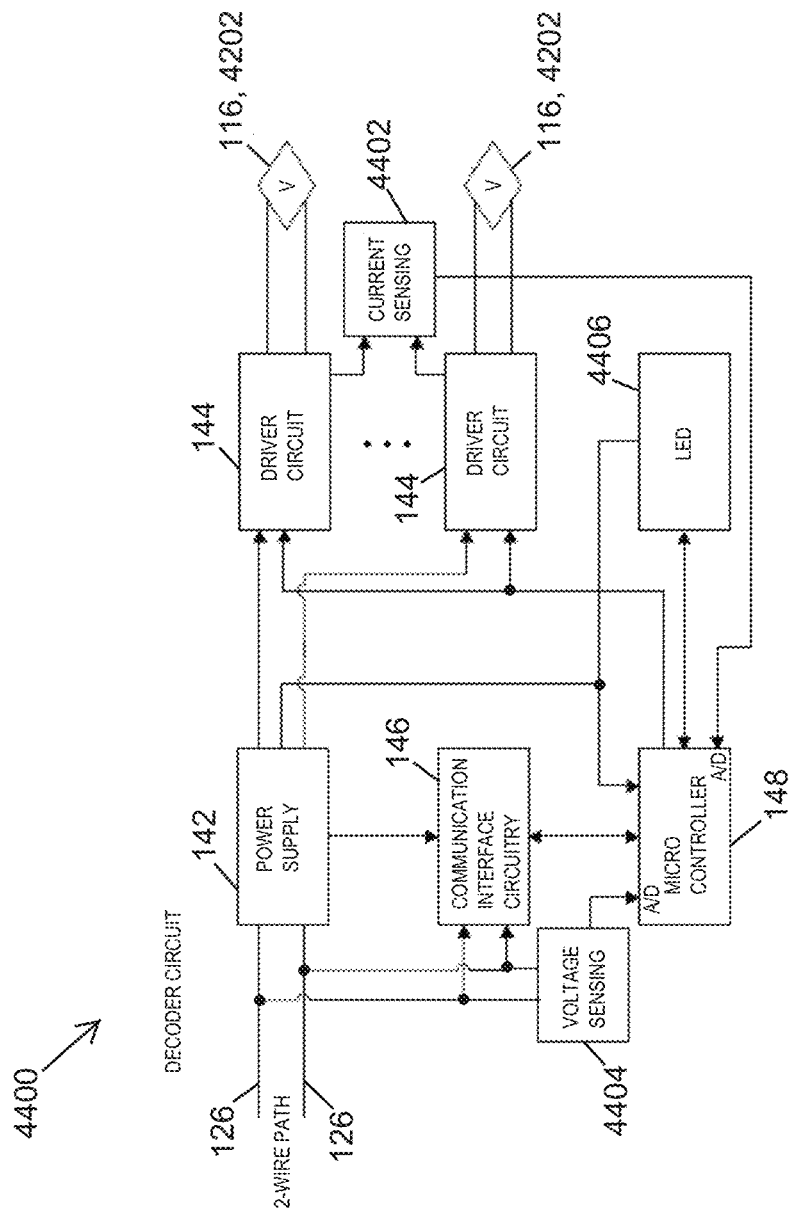
FIG. 44 illustrates a decoder circuit for optical communication of diagnostic data, according to certain embodiments.

FIG. 44 illustrates a decoder circuit 4400 for optical communication of diagnostic data according to certain embodiments. The illustrated decoder circuit 4400 includes the power supply 142, the driver circuitry 144, and the communication interface circuitry 146, which are described above with respect to FIG. 22. In place of the wireless communication transceiver 150 of decoder 128 (FIG. 22), the illustrated decoder 4400 includes a current sensing circuit 4402, a voltage sensing circuit 4404, and an light emitting diode (LED) 4406. The current sensing circuit 4402 can sense the solenoid current and sends the sensed current to the microprocessor 148 via one of the microcontroller's ND inputs. The voltage sensing circuit 4404 senses the input voltage of the two-wire path 126 and sends the sensed voltage to the microprocessor 148 via another of the microprocessor's ND inputs. The microprocessor 148 is in communication with the LED 4406 and communicates the sensed voltage and current to the LED 4406 to be transmitted optically to the diagnostic tool. The sensed voltage and current are two examples of information that can be conveyed via the LED optical communications. Other examples of information that can be conveyed through the LED optical communications are, but not limited to the operating state (which outputs are ON), firmware revision, hardware revision, programmed station number(s) and the like, associated with the decoder 4400.

In one aspect, the LED 406 can emit infrared light. In another aspect, the LED 4406 can emit visible light, such as a green or red, for example. Advantageously, a visible light emitting LED 4406 can provide feedback to the user in addition to being used for optical communications. Optical communications can modulate the light emitted from the LED 4406 at a frequency of between approximately 30 kHz and approximately 60 kHz although other frequencies can be used. This modulation allows a receiving device to filter ambient light out of the communication signal, resulting in more reliable communications over greater distances. An example of a receiving device that can receive a modulated signal from the LED 4406 is the IR remote receiver, part number TSOP38338, available from Vishay Semiconductor.

In one aspect, an LED, such as the LED 4406, can receive an optical signal as well as generate one. When exposed to light, LEDs can generate a small amount of current which can be amplified to receive data and create a two-way optical communication link for the decoder 4400. While most diagnostic data would be sent from the decoder 4400 to another device, there are applications where the decoder 4400 may receive data. For instance, but not limited to, the decoder 4400 could be instructed by a handheld device to enable/disable a particular station (solenoid 116, 4202); the decider 4400 could be assigned to a new station number; and the decoder 4400 could receive new firmware to load into the microcontroller 148.

TERMINOLOGY

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding whether these features, elements, and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A landscape system to selectively power and activate devices along a two-wire communication network using data encoded power waveforms, the landscape system comprising:
a landscape controller comprising:
a first processor configured to generate a control signal responsive to a sensor signal and user information, the control signal having a first state and a second state; and
a first power supply configured to receive an input power signal, provide an AC power signal, and output the data encoded power waveforms, wherein the AC power signal is approximately sinusoidal, the first power supply communicating with the first processor to receive the control signal, pass the AC power signal approximately in-phase when the control signal is in the first state and shift a phase of the AC power signal approximately by 180 degrees when the control signal is in the second state, the first power supply outputting the approximately in-phase AC power signal on the two-wire communication network when the control signal is in the first state and outputting the phase-shifted AC power signal on the two-wire communication network when the control signal is in the second state; and a local area network module configured to communicate with a cloud-server via the Internet and to communicate with the landscape controller via a local area network, the local area network module comprising:
a sensor interface configured to receive sensor data from at least one sensor and provide sensor information responsive to the sensor data;
a local area network interface configured to communicate with a user input device over the local area network to receive the user information, wherein the user input device is configured to accept user input from a user and output the user information responsive to the user input;
a second processor configured to communicate with the sensor interface to receive the sensor information and to communicate with the local area network interface to receive the user information, the second processor configured to communicate with a cloud-server to send the sensor information to the cloud-server and to receive a sensor signal from the cloud-server, wherein the sensor signal is responsive to the sensor information; and
a controller interface configured to communicate the sensor signal and the user information to the landscape controller.

2. The landscape system of claim 1, wherein the local area network module further comprises memory configured to store the sensor data.

3. The landscape system of claim 1, wherein the sensor information comprises one or more of flow rate, rain event, temperature, solar radiation, wind speed, relative humidity, motion, voltage, current, and soil moisture.

4. The landscape system of claim 1, wherein the landscape controller includes the local area network module.

5. The landscape system of claim 1, wherein the local area network module further comprises a connector that is configured to connect to a cable which connects to the local area network.

6. The landscape system of claim 1, wherein the local area network interface is an Ethernet interface and the local area network module is configured to communicate with the local area network using an Ethernet protocol.

7. The landscape system of claim 1, wherein the local area network module further is configured to connect to the local area network using Wi-Fi.

8. The landscape system of claim 1, wherein the landscape controller is configured to control sprinkler valves and/or lighting fixtures.

9. A local area network module for a landscape system that selectively powers and activates devices along a two-wire communication network using data encoded power waveforms, the local area network module comprising:
a sensor interface configured to receive sensor data from at least one sensor and provide sensor information responsive to the sensor data;
a local area network interface configured to communicate with a user input device over a local area network, wherein the user input device is configured to accept user input from a user and output user information responsive to the user input;
a processor configured to communicate with the sensor interface to receive the sensor information and to communicate with the local area network interface to receive the user information, the processor configured to communicate with a cloud-server to send the sensor information to the cloud-server and to receive a sensor signal from the cloud-server, wherein the sensor signal is responsive to the sensor information; and a controller interface configured to communicate with the processor to receive the sensor signal and the user information, the controller interface further configured to communicate the sensor signal and the user information to a landscape controller;

wherein the landscape controller is configured to generate a control signal responsive to the sensor signal and the user information, the control signal having a first state and a second state, the landscape controller further configured to provide an AC power signal that is approximately sinusoidal and output the data encoded power waveform, wherein the landscape controller passes the AC power signal approximately in-phase when the control signal is in the first state and shifts a phase of the AC power signal by approximately 180 degrees when the control signal is in the second state, the landscape controller further configured to output the approximately in-phase AC power signal on the two-wire communication network when the control signal is in the first state and output the phase-shifted AC power signal on the two-wire communication network when the control signal is in the second state.

10. The local area network module of claim 9 further comprising memory configured to store the sensor data.

11. The local area network module of claim 9, wherein the sensor information comprises one or more of flow rate, rain event, temperature, solar radiation, wind speed, relative humidity, motion, voltage, current, and soil moisture.

12. The local area network module of claim 9, wherein the landscape controller includes the local area network module.

13. The local area network module of claim 9 further comprising a connector that is configured to connect to a cable which connects to the local area network.

14. The local area network module of claim 9, wherein the local area network interface is an Ethernet interface.

15. The local area network module of claim 9, wherein the local area network interface further is configured to connect to the local area network using Wi-Fi.

16. The local area network module of claim 9, wherein the landscape controller is configured to control sprinkler valves and/or lighting fixtures.

17. A method to selectively power and activate landscape devices along a two-wire communication network using data encoded power waveforms, the method comprising:

receiving sensor data from at least one sensor and providing sensor information responsive to the sensor data;

receiving, over a local area network, user information responsive to user input from a user;

sending over the Internet to a cloud-server the sensor information;

generating at the cloud-server a sensor signal responsive to the sensor information;

receiving over the Internet from the cloud-server the sensor signal;

generating a control signal responsive to the sensor signal and user information, the control signal having a first state and a second state;

providing an AC power signal that is approximately sinusoidal;

generating the data encoded power waveforms by passing the AC power signal approximately in-phase when the control signal is in the first state and shifting a phase of the AC power signal approximately by 180 degrees when the control signal is in the second state; and outputting the approximately in-phase AC power signal on the two-wire communication network when the control signal is in the first state and outputting the phase-shifted AC power signal on the two-wire communication network when the control signal is in the second state.

18. The method of claim 17 further communicating with the local area network using an Ethernet protocol.

19. The method of claim 18, wherein the communication with the local area network is wireless.

20. The method of claim 17 further comprising storing the sensor data.

* * * * *